(12) United States Patent
Senoo et al.

(10) Patent No.: US 12,549,875 B2
(45) Date of Patent: Feb. 10, 2026

(54) OPTICAL COMMUNICATION SYSTEM, CONTROL APPARATUS AND QUALITY COMPENSATION METHOD

(71) Applicant: NTT, Inc., Tokyo (JP)

(72) Inventors: Yumiko Senoo, Musashino (JP); Junichi Kani, Musashino (JP); Kazutaka Hara, Musashino (JP); Shin Kaneko, Musashino (JP); Ryo Koma, Musashino (JP)

(73) Assignee: NTT, Inc., Tokyo (JP)

( * ) Notice: Subject to any disclaimer, the term of this patent is extended or adjusted under 35 U.S.C. 154(b) by 193 days.

(21) Appl. No.: 18/275,111

(22) PCT Filed: Aug. 26, 2021

(86) PCT No.: PCT/JP2021/031330
§ 371 (c)(1),
(2) Date: Jul. 31, 2023

(87) PCT Pub. No.: WO2022/168354
PCT Pub. Date: Aug. 11, 2022

(65) Prior Publication Data
US 2024/0056709 A1     Feb. 15, 2024

(30) Foreign Application Priority Data

Feb. 8, 2021 (WO) .................. PCT/JP2021/004550

(51) Int. Cl.
*H04B 10/2507* (2013.01)
*H04Q 11/00* (2006.01)

(52) U.S. Cl.
CPC . *H04Q 11/0062* (2013.01); *H04Q 2011/0084* (2013.01)

(58) Field of Classification Search
CPC .................................................. H04B 10/2507
See application file for complete search history.

(56) References Cited

U.S. PATENT DOCUMENTS

2002/0191891 A1    12/2002  Fukashiro et al.
2008/0056726 A1*   3/2008  Sugiya ............. H04B 10/25133
                                                          398/147
(Continued)

FOREIGN PATENT DOCUMENTS

JP       2003-008509 A     1/2003
JP       2008-060682 A     3/2008
(Continued)

OTHER PUBLICATIONS

"Cyber Physical Technology Development Efforts—Trends and Examples of Edge AI, AR/VR Technologies", NTT Data, NTT Technology Journal, vol. 31 No. 3, 2019, pp. 48-51.
(Continued)

*Primary Examiner* — Shi K Li
(74) *Attorney, Agent, or Firm* — Harness, Dickey & Pierce, P.L.C.

(57) ABSTRACT

An optical switch having a plurality of ports outputs an optical signal, which is input from one of the plurality of ports, from another port. A quality compensator perform quality compensation of the optical signal output from the optical switch, and input the quality-compensated optical signal to the optical switch. A controller selects, among the plurality of quality compensators, a quality compensator that performs quality compensation according to the degree of quality deterioration of the optical signal when the optical signal input from a predetermined port of the optical switch is transmitted through a transmission path. The controller controls the optical switch so that the optical signal, in which quality is compensated by the selected quality compensator through the optical signal input from the predetermined port being output to the selected quality compensator, is output from the port corresponding to a transmission destination of the optical signal.

15 Claims, 36 Drawing Sheets

(56) References Cited

U.S. PATENT DOCUMENTS

| | | | | |
|---|---|---|---|---|
| 2011/0103804 | A1* | 5/2011 | Uekama | H04B 10/25133 398/158 |
| 2012/0002963 | A1* | 1/2012 | Iwasawa | H04J 14/0258 398/37 |
| 2016/0261936 | A1* | 9/2016 | Nakatsugawa | H04L 45/123 |
| 2020/0403700 | A1* | 12/2020 | Tanehashi | H04B 10/2941 |

FOREIGN PATENT DOCUMENTS

| | | |
|---|---|---|
| JP | 2008-245179 A | 10/2008 |
| JP | 2016-165089 A | 9/2016 |
| WO | WO-2019/167735 A1 | 9/2019 |

OTHER PUBLICATIONS

"NTT Technology Report for Smart World: What's IOWN?" presentation, May 9, 2019 [online], [retrieved May 16, 2022], Internet, URL:https://group.ntt/jp/newsrelease/2019/05/09/190509b.html.

F. Koyama and K. Iga, "Frequency chirping in external modulators", in Journal of Lightwave Technology, vol. 6, No. 1, pp. 87-93, Jan. 1988.

"ITU-T G.989.2, 40-Gigabit-capable passive optical networks 2 (NG PON2): Physical media dependent (PMD) layer specification", Feb. 2019.; media dependent (PMD) layer specification, Feb. 2019.

Yuanqiu Luo et al., "Physical Layer Aspects of NG-PON2 Standards—Part 2: System Design and Technology Feasibility [Invited]", Journal of Optical Communications and Networking, vol. 8, No. 1, pp. 43-52, Jan. 2016.

Hiroki Kawahara et al., "Optical Full Mesh Network Construction Technology Supporting All-Photonics Network", Nippon Telegraph and Telephone Corporation, NTT Technical Journal, vol. 32, No. 3, 2020.

Takuya Kanai et al., "Photonic Gateway Supporting All-Photonics Network", The Institute of Electronics, Information and Communication Engineers General Conference, Communication Lecture Proceedings 2, B-8-20, p. 141, Mar. 2021.

S. Okamoto et al., "Field trial of distance-adaptive optical transmission with digital in band OSNR estimation", Optics Express, vol. 24, No. 20, pp. 22403-22412, 2016.

* cited by examiner

FIG. 2

| NUMBER | OPTICAL OUTPUT SUBSCRIBER DEVICE | OPTICAL INPUT SUBSCRIBER DEVICE | OPTICAL TRANSMISSION PATH | WAVELENGTH [nm] | CHROMATIC DISPERSION OF FIBER [ps/nm/km] | TRANSMISSION DISTANCE [km] | CUMULATIVE CHROMATIC DISPERSION [ps/nm] | MODULATION METHOD | BAUD RATE [dB] | ALLOWABLE DISPERSION AMOUNT [ps/nm] | DISPERSION COMPENSATOR INFORMATION |
|---|---|---|---|---|---|---|---|---|---|---|---|
| 1 | 120a-1 | 120b-1 | 150-1 | $\lambda 1u$ | | | | | | | 160-1 or 160-2 |
| 2 | 120b-1 | 120a-1 | 150-1 | $\lambda 1d$ | | | | | | | |
| 3 | 120a-2 | 120b-2 | 150-2 | $\lambda 2u$ | | | | | | | |
| 4 | 120b-2 | 120a-2 | 150-2 | $\lambda 2d$ | | | | | | | |
| ... | | | | | | | | | | | |

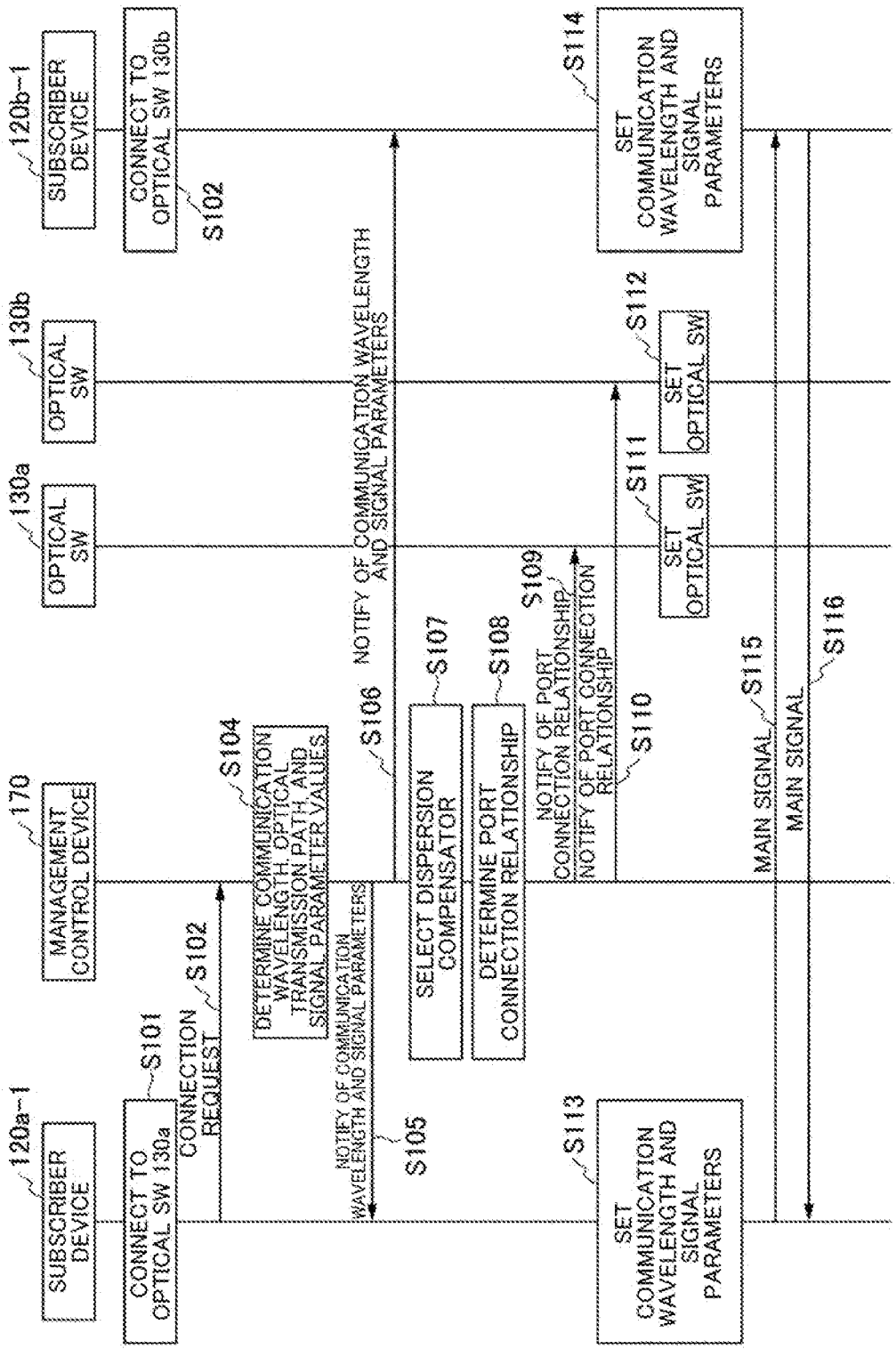

FIG. 8

| NUMBER | OPTICAL OUTPUT SUBSCRIBER DEVICE | OPTICAL INPUT SUBSCRIBER DEVICE | OPTICAL TRANSMISSION PATH | WAVELENGTH [nm] | TRANSMISSION LOSS [dB] | OPTICAL DEVICE LOSS [dB] | CUMULATIVE LOSS [dB] | MODULATION METHOD | BAUD RATE [dB] | MINIMUM RECEPTION SENSITIVITY [dBm] | TRANSMISSION LIGHT INTENSITY [dBm] | MAXIMUM ALLOWABLE LOSS [dB] | OPTICAL AMPLIFIER INFORMATION |
|---|---|---|---|---|---|---|---|---|---|---|---|---|---|
| 1 | 120a-1 | 120b-1 | 150-1 | λ1u | | | | | | | | | 580-1 or 580-2 |
| 2 | 120b-1 | 120a-1 | 150-1 | λ1d | | | | | | | | | |
| 3 | 120a-2 | 120b-2 | 150-2 | λ2u | | | | | | | | | |
| 4 | 120b-2 | 120a-2 | 150-2 | λ2d | | | | | | | | | |
| ... | | | | | | | | | | | | | |

OPTICAL COMMUNICATION SYSTEM, CONTROL APPARATUS AND QUALITY COMPENSATION METHOD

CROSS-REFERENCE TO RELATED APPLICATIONS

This application is a 371 National Stage of International Application No. PCT/JP2021/031330, filed on Aug. 26, 2021, which claims priority to Japanese Patent Application No. PCT/JP2021/004550, filed Feb. 8, 2021. The entire disclosures of the above applications are incorporated herein by reference.

TECHNICAL FIELD

The present invention relates to an optical communication system, a control apparatus, and a quality compensation method. This application claims priority to PCT/JP2021/004550 filed on Feb. 8, 2021, the content of which is hereby incorporated by reference.

BACKGROUND ART

ITU-T (International Telecommunication Union Telecommunication Standardization sector) G.989.2 Recommendation defines PtP (Point to Point) WDM (Wavelength Division Multiplexing)-PON (Passive Optical Network) (for example, see NPL 1). PtP WDM-PON is a PON system that performs wavelength multiplexing. In the PtP WDM-PON system, communication is performed using different optical wavelengths for each ONU in the uplink direction and the downlink direction. The uplink direction is the direction from an ONU to an OLT. The downlink direction is the direction from an OLT to an ONU.

As described in NPL 1, in a PtP WDM-PON system, it is defined that a management and control signal called AMCC (Auxiliary Management and Control Channel) is used as a signal for management and control used between an OLT and an ONU. An AMCC signal is a signal in which information to be transmitted is modulated by a predetermined method and then superimposed on the main signal and transmitted. Since the AMCC signal is superimposed on the main signal and transmitted, the OLT and the ONU can transmit signals for management and control within a wavelength range of an optical wavelength used in the main signal. That is, management and control are realized without using a dedicated optical wavelength range for management and control. A wavelength determination process in which an uplink optical wavelength and a downlink optical wavelength are determined is performed using an AMCC signal.

FIG. 31 is a diagram showing a configuration example of a PtP WDM-PON system. The figure shows a configuration related to superimposition of an AMCC signal. The OLT and ONU include a management control device. The AMCC signal is superimposed at an optical stage and separated at an electric stage. FIG. 32 shows an example of an optical signal transmitted from an ONU or OLT. The transmitted optical signal is a main signal on which the management control signal is superimposed. By superimposing the management control signal on the optical signal, intensity modulation is added to the envelope of the main signal as shown in FIG. 32. The main signal is a high-data-rate signal on the order of Gb/s (gigabits per second). On the other hand, the management control signal is expected to be a low-data-rate signal on the order of kb/s (kilobits per second) (for example, NPL 2).

All-photonics network (APN) is an innovative network based on photonics technology. Currently, development aimed at realizing APN is underway (see, for example, NPL 3). In the APN, optical nodes relay optical backbone networks and optical access networks to provide end-to-end optical paths for each service. For example, the optical node is assumed to be an optical SW (Switch) or the like.

FIG. 33 is a diagram showing the configuration of an optical communication system 910 in APN (see NPL 4, for example). The optical communication system 910 has a subscriber device 920, an optical SW 930, a wavelength multiplexer/demultiplexer 940, an optical transmission path 950 and a management control device 970. Two optical SWs 930 are described as optical SWs 930a and 930b. Two subscriber devices 920 connected to the optical SW 930a are described as subscriber devices 920a-1 and 920a-2, and two subscriber devices 920 connected to the optical SW 930b are described as subscriber devices 920b-1 and 920b-2. Two wavelength multiplexers/demultiplexers 940 connected to the optical SW 930a are described as wavelength multiplexers/demultiplexers 940a-1 and 940a-2, and two wavelength multiplexers/demultiplexers 940 connected to the optical SW 930b are described as wavelength multiplexers/demultiplexers 940b-1 and 940b-2. An optical transmission path 950 between the wavelength multiplexer/demultiplexer 940a-n (n=1, 2) and the wavelength multiplexer/demultiplexer 940b-n is described as an optical transmission path 950-n. Thus, the optical SW 930a and the optical SW 930b are connected by a plurality of optical transmission paths 950.

Here, a subscriber device 920a-n communicates with a subscriber device 920b-n. Optical signals output by the subscriber device 920a-n and received by the subscriber device 920b-n use a wavelength $\lambda$nu, and optical signals output by the subscriber device 920b-n and received by the subscriber device 920a-n use a wavelength $\lambda$nd. The opposing subscriber devices 920a-n and 920b-n are connected via the optical SWs 930a and 930b, the wavelength multiplexers/demultiplexers 940a-n and 940b-n, and the optical transmission path 950-n.

The optical SW 930 outputs light input from an input port 931 from an output port 932, and outputs light input from the output port 932 from the input port 931. The optical SW 930 can change the connection between the input port 931 and the output port 932. The wavelength multiplexer/demultiplexer 940 multiplexes optical signals of different wavelengths input from a plurality of separate ports, and outputs the multiplexed optical signal from a single port. The wavelength multiplexer/demultiplexer 940 demultiplexes optical signals of different wavelengths input from a single port, and outputs the demultiplexed optical signals from separate ports. For the wavelength multiplexer/demultiplexer 940, for example, an AWG (Arrayed Waveguide Grating) is used. By setting the connection relationship between the input port and the output port of the optical SW 930, the optical transmission path 950 through which the optical signal passes can be selected. The management control device 970 connected to the optical SW determines and instructs the transmission/reception wavelength of each subscriber device 920 and the relationship between the input port and the output port of the optical SW 930. As described above, the optical communication system 910 includes the optical SW 930 and the wavelength multiplexer/demultiplexer 940, so that the optical signal output from the subscriber device 920 can be transmitted using the selected optical transmission path 950.

If fiber lengths between the subscriber device 920a-1 and the optical SW 930a, between the optical SW 930b and the subscriber device 920b-1, and the optical transmission path 950-1 are all different, the optical communication system 910 changes the value of the signal parameter of the optical signal used between the subscriber devices 920a-1 and the subscriber devices 920b-1. The signal parameters represent, for example, a baud rate, a modulation method, an output light intensity, and the like. By changing the values of the baud rate, the modulation method and the output light intensity represented by the signal parameter, the subscriber device 920a-1 and the subscriber device 920b-1 can receive signals with good quality.

FIG. 34 is a sequence diagram showing the operations up to main signal conduction which is easily considered in the optical communication system 910 of FIG. 33. The subscriber device 920a-1 connects to the optical SW 930a (step S901). The subscriber device 920b-1 connects to the optical SW 930b (step S902). The subscriber device 920a-1 transmits a connection request to the subscriber device 920b-1 to the management control device 970 (step S903).

The management control device 970 determines a communication wavelength used between the subscriber device 920a-1 and the subscriber device 920b-1, the optical transmission path 950, and the value of a signal parameter (step S904). Thereafter, the management control device 970 notifies the subscriber device 920a-1 and the subscriber device 920b-1 of the communication wavelength and the signal parameter (steps S905 and S906). The management control device 970 sets the value determined in the step S904 to the signal parameter.

Furthermore, the management control device 970 determines the port connection relationship of the optical SW 930a and the optical SW 930b (step S907). A port connection relationship is the connection between the input port 931 and the output port 932. This port connection relationship is set so that a transmission signal from the subscriber device 920a-1 is output to the subscriber device 920b-1 through the selected optical transmission path 950-1. The management control device 970 notifies the optical SW 930a and the optical SW 930b of the determined port connection relationship (steps S908 and S909).

The optical SW 930a and the optical SW 930b set the connection between the input port 931 and the output port 932 according to the port connection relationship notified from the management control device 970 (steps S910, S911). The subscriber device 920a-1 and the subscriber device 920b-1 set the communication wavelength and the signal parameter notified from the management control device 970 (steps S912 and S913). After the optical SW 930a and the optical SW 930b set the port connection relationship, transmission of the main signal between the subscriber device 920a-1 and the subscriber device 920b-1 is started (steps S914 and S915).

In FIG. 34, the management control device 970 determines the communication wavelength, the optical transmission path 950, and the values of the signal parameter. However, the optical communication system 910 may operate as shown in FIG. 35. That is, after the processing of steps S901 to S903 in FIG. 34, the management control device 970 determines the communication wavelength and the optical transmission path 950 (step S931), and notifies the subscriber device 920a-1 and the subscriber device 920b-1 of the communication wavelength (steps S932 and S933). The optical communication system 910 performs the processing of steps S907 to S911 in FIG. 34. The subscriber device 920a-1 and the subscriber device 920b-1 set the notified communication wavelength (steps S934 and S935). The subscriber device 920a-1 and the subscriber device 920b-1 mutually transmit and receive control signals and the like to estimate the state of the optical transmission path (steps S936 and S937). The subscriber device 920a-1 and the subscriber device 920b-1 determine the value of the signal parameter based on the estimation result, and set the signal parameter of the determined value (steps S938 and S939). After that, transmission of the main signal between the subscriber device 920a-1 and the subscriber device 920b-1 is started (steps S914 and S915).

The optical communication system 910 may also operate as shown in FIG. 36. That is, the subscriber devices 920a-1 and 920b-1 use signal parameters of fixed values. Therefore, the optical communication system 910 does not perform the processing of steps S936 to S939 of FIG. 35 for determining the value of the signal parameter and setting the determined value of the signal parameter.

On the other hand, there has been proposed a distance-adaptive optical transmission system in which an optimum modulation format is selected by referring to estimation information of an optical signal-to-noise ratio (OSNR) transmitted from an opposing transceiver via a feedback channel (see, for example, NPL 5). In a part of the system, the amount of chromatic dispersion is estimated.

FIG. 37 is a diagram showing a distance-adaptive optical transmission system. The distance adaptive optical transmission system has two transceivers 980 facing each other. The two transceivers 980 are described as transceivers 980a and 980b, respectively. A transceiver 980x (x=a, b) has a transmitter (Tx) 981x and a receiver (Rx) 982x. A transmitter 981a of the transceiver 980a and a receiver 982b of the transceiver 980b are connected through a fiber 983-1, and a transmitter 981b of the transceiver 980b and a receiver 982a of the transceiver 980a are connected through a fiber 983-2.

First, a signal frame containing data and a pilot sequence (PS) is transmitted from the transmitter 981a to the receiver 982b via a fiber 983-1. The transceiver 980b compares the OSNR estimated by the receiver 982b with a reference OSNR threshold database to select a signal format suitable for the fiber 983-1. This OSNR threshold database is designed before transmission. The signal format information is then sent back from the transmitter 981b to the receiver 982a via a fiber 983-2 through a feedback channel. Then, the information is demodulated from the feedback channel at the receiver 982a and supplied to the transmitter 981a. Finally, the transceiver 980a sets an appropriate signal format for transmitting through the fiber 983-1 to the transmitter 981a.

The receiver 982b estimates the OSNR by using the PS. The signal power and the noise power are calculated from the spectrum of the data and the spectrum of the PS, respectively. FIG. 37 shows a frame structure of a transmission signal. The symbol PS is obtained by alternately arranging binary symbols of 0 and 1 whose complex amplitudes are S and −S of arbitrary values. FIG. 37 shows the spectrum of PS. Since the PS signal can be regarded as a signal subjected to BPSK (Binary Phase Shift Keying) modulation, two peak components including noise components exist in the spectrum. When there are four periods of PS, such as alternating S, S, −S, and −S, the peak component is ±Rs/4, where Rs is the baud rate.

The process of OSNR estimation is described below. First, the receiver 982b corrects chromatic dispersion (CD) by frequency domain equalization (FDE) after detecting the transmitted signal. The value of CD is estimated by calculating the delay time difference between PS spectra. The receiver 982b extracts PS from the received signal train and calculates noise power from frequency elements near DC. The receiver 982*b* obtains the signal power from the spectrum of the data stream extracted at another timing when no PS is present.

CITATION LIST

Non Patent Literature

[NPL 1] "ITU-T G.989.2, 40-Gigabit-capable passive optical networks 2 (NG PON2): Physical media dependent (PMD) layer specification," February 2019.
[NPL 2] Yuanqiu Luo, Hal Roberts, Klaus Grobe, Maurizio Valvo, Derek Nesset, Kota Asaka, Harald Rohde, Joe Smith, Jun Shan Wey, and Frank Effenberger, "Physical Layer Aspects of NG-PON2 Standards-Part 2: System Design and Technology Feasibility [Invited]," Journal of Optical Communications and Networking, Vol. 8, No. 1, pp. 43-52, January 2016.
[NPL 3] Hiroki Kawahara, and 15 others, "Optical Full Mesh Network Construction Technology Supporting All-Photonics Network", Nippon Telegraph and Telephone Corporation, NTT Technical Journal, Vol. 32, No. 3, 2020
[NPL 4] Takuya Kanai, Kazuaki Honda, Yasunari Tanaka, Shin Kaneko, Kazuki Hara, Junichi Kani, Tomoaki Yoshida, "Photonic Gateway Supporting All-Photonics Network", The Institute of Electronics, Information and Communication Engineers General Conference, Communication Lecture Proceedings 2, B-8-20, p. 141, March 2021
[NPL 5] S. Okamoto, F. Hamaoka, and Y. Kisaka, "Field trial of distance-adaptive optical transmission with digital in-band OSNR estimation," Optics Express, Vol. 24, No. 20, pp. 22403-22412, 2016.

SUMMARY OF INVENTION

Technical Problem

Optical fibers for transmission generally used today have a chromatic dispersion of about 17 ps/nm/km at a communication wavelength in the 1.55 μm band. Accumulation of this chromatic dispersion hinders high-speed transmission. Therefore, for high-speed transmission, it is necessary to compensate for the cumulative chromatic dispersion of the optical transmission path.

In order to obtain the desired reception sensitivity, it is necessary to compensate for the transmission loss and optical device loss. On the other hand, the allowable loss of light intensity differs depending on the modulation method, transmission speed, and output light intensity. Therefore, quality compensation according to the allowable loss of light intensity is required. However, existing technology provides quality compensation common to all subscriber devices. In APN, since the allowable loss is different for each subscriber device, if common quality compensation is performed as in the existing technology, there is a possibility that problems will occur in high-speed transmission.

In addition, in an APN that provides an end-to-end optical path, it is assumed that the subscriber device of the communication counterpart will change dynamically. Appropriate quality compensation differs depending on the opposing subscriber device.

In view of the above circumstances, an object of the present invention is to provide an optical communication system, a control apparatus, and a quality compensation method capable of flexibly compensating for the quality of an optical signal.

Solution to Problem

An optical communication system according to one aspect of the present invention includes: an optical switch having a plurality of ports and outputting an optical signal, which is input from one of the plurality of ports, from another port; a plurality of quality compensators that perform quality compensation of the optical signal output from the optical switch and input the quality-compensated optical signal to the optical switch; and a controller that performs processing of selecting, among the plurality of quality compensators, a quality compensator that performs quality compensation according to a degree of quality deterioration of the optical signal when the optical signal input from a predetermined port of the optical switch is transmitted through a transmission path, and processing of controlling the optical switch so that the optical signal, in which quality is compensated by the selected quality compensator through the optical signal input from the predetermined port being output to the selected quality compensator, is output from a port corresponding to a transmission destination of the optical signal.

A management control apparatus according to one aspect of the present invention includes: a selector that selects a quality compensator that performs quality compensation of an optical signal according to a degree of quality deterioration of the optical signal when the optical signal input from a predetermined port of the optical switch is transmitted through a transmission path, among a plurality of quality compensators connected to the optical switch that outputs the optical signal, which is input from one of a plurality of ports, from another port; and an instructor that instructs the optical switch so that the optical signal, in which quality is compensated by the selected quality compensator through the optical signal input from the predetermined port being output to the selected quality compensator, is output from a port corresponding to a transmission destination of the optical signal.

A quality compensation method according to one aspect of the present invention includes: a transmission step in which an optical switch having a plurality of ports outputs an optical signal, which is input from one of the plurality of ports, from another port; a quality compensating step in which a quality compensator performs quality compensation of the optical signal output from the optical switch and inputs the quality-compensated optical signal to the optical switch; and a control step in which a controller performs processing of selecting, among a plurality of the quality compensators connected to the optical switch, a quality compensator that performs quality compensation according to a degree of quality deterioration of the optical signal when the optical signal input from a predetermined port of the optical switch is transmitted through a transmission path, and processing of controlling the optical switch so that the optical signal, in which quality is compensated by the selected quality compensator through the optical signal input from the predetermined port being output to the selected quality compensator, is output to a port corresponding to a transmission destination of the optical signal.

A quality compensation method according to one aspect of the present invention includes: a selecting step of selecting a quality compensator that performs quality compensation according to the degree of quality deterioration of an optical signal when the optical signal input from a predetermined port of an optical switch is transmitted through a transmission path among a plurality of quality compensators connected to the optical switch that outputs an optical signal, which is input from one of a plurality of ports, from another port; and an instructing step of instructing the optical switch so that the optical signal, in which quality is compensated by the selected quality compensator through the optical signal input from the predetermined port being output to the selected quality compensator, is output from a port corresponding to a transmission destination of the optical signal.

Advantageous Effects of Invention

According to the present invention, it is possible to flexibly compensate for the quality of an optical signal in an optical communication system.

BRIEF DESCRIPTION OF DRAWINGS

FIG. 2 is a diagram showing a first parameter table according to the embodiment.

FIG. 3 is a sequence diagram showing the operation of the optical communication system according to the embodiment.

FIG. 8 is a diagram showing a second parameter table according to the embodiment.

DESCRIPTION OF EMBODIMENTS

Figure 1:
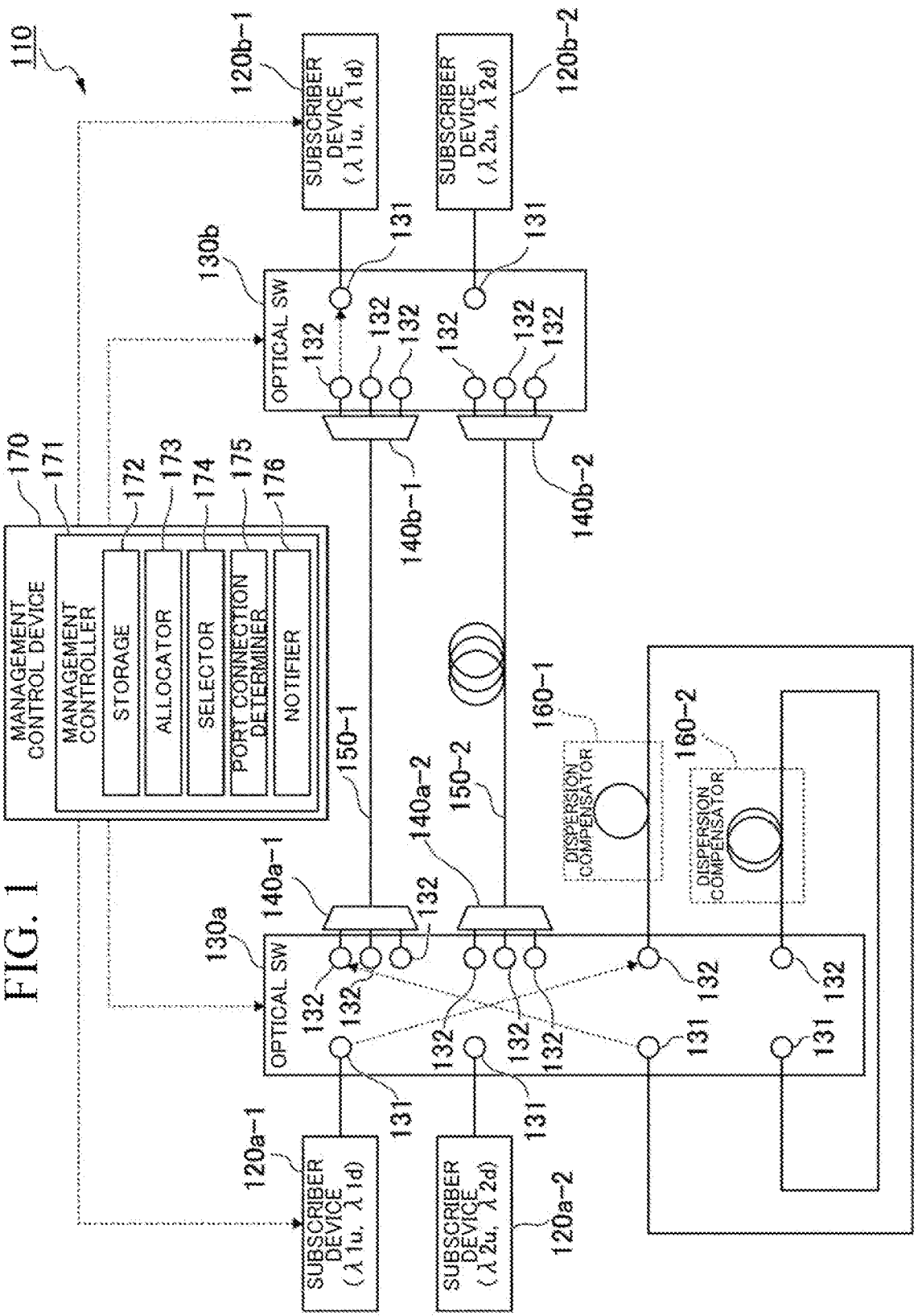
FIG. 1 is a diagram showing the configuration of an optical communication system according to a first embodiment of the present invention.

Hereinafter, embodiments of the present invention will be described in detail with reference to the drawings. In the description of the drawings, the same portions are designated by the same reference numerals, and the description thereof will be omitted.

First Embodiment

Figure 33:
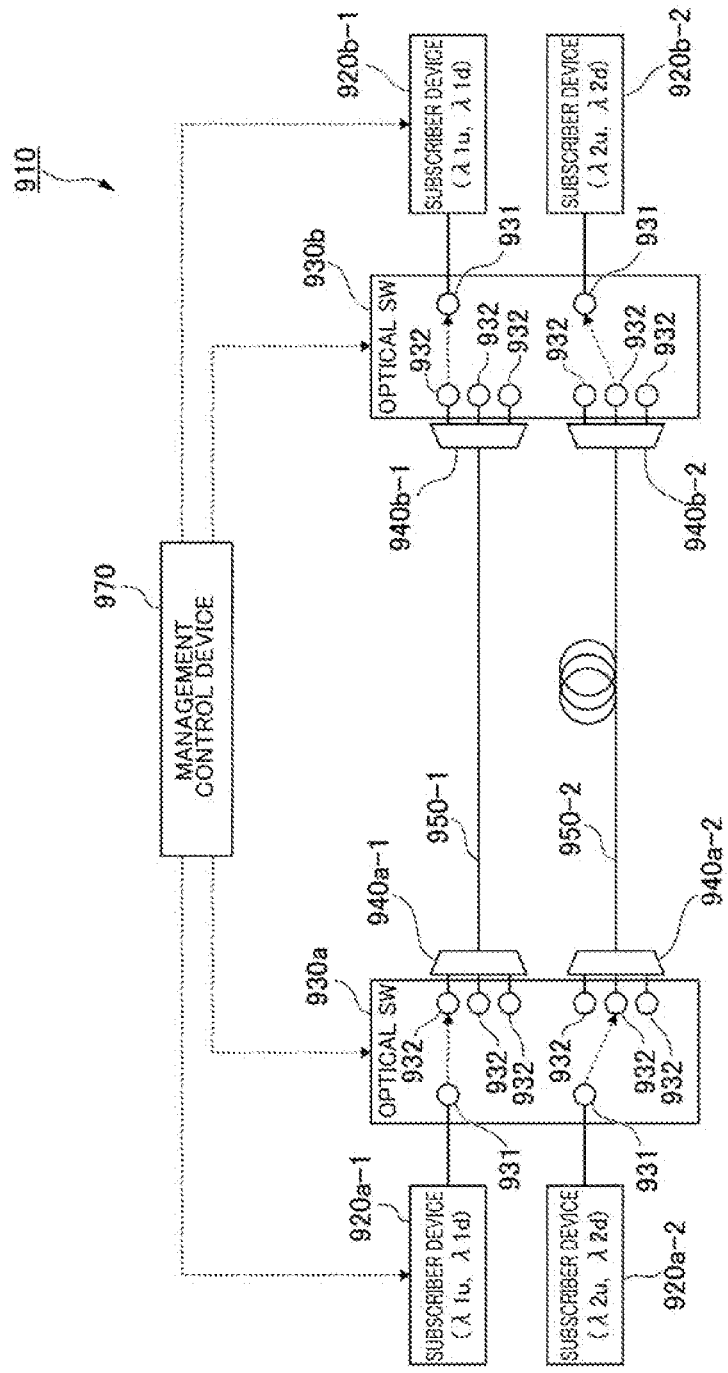
FIG. 33 is a diagram showing the configuration of a conventional optical communication system.

FIG. 1 is a diagram showing the configuration of an optical communication system 110 according to the first embodiment. The optical communication system 110 includes a subscriber device 120, an optical SW 130, a wavelength multiplexer/demultiplexer 140, an optical transmission path 150, a dispersion compensator 160, and a management control device 170. The subscriber device 920, the optical SW 930, the wavelength multiplexer/demultiplexer 940, and the optical transmission path 950 shown in FIG. 33 can be used as the subscriber device 120, the optical SW 130, the wavelength multiplexer/demultiplexer 140, and the optical transmission path 150, respectively.

The optical communication system 110 has plurality of optical SWs 130. In the present embodiment, a case where the optical communication system 110 has two optical SWs 130 will be described as an example. The two optical SWs 130 are described as optical SWs 130a and 130b. The subscriber device 120 connected to the optical SW 130a is described as the subscriber device 120a, and the subscriber device 120 connected to the optical SW 130b is described as the subscriber device 120b. Further, N (N is an integer of 1 or more) subscriber devices 120a are described as subscriber devices 120a-1, . . . , 120a-N, and M (M is an integer of 1 or more) subscriber devices 120b are described as subscriber devices 120b-1, . . . , 120b-M. J (J is an integer of 1 or more) wavelength multiplexers/demultiplexers 140 connected to the optical SW 130a are described as wavelength multiplexers/demultiplexers 140a-1, . . . , 140a-j, and J wavelength multiplexers/demultiplexers 140 connected to the optical SW 130b are described as wavelength multiplexers/demultiplexers 140b-1, . . . , 140b-J. The optical transmission path 150 between the wavelength multiplexer/demultiplexer 140a-j (j is an integer of 1 or more and J or less) and the wavelength multiplexer/demultiplexer 140b-j is described as an optical transmission path 150-j. K (K is an integer of 1 or more) dispersion compensators 160 are described as dispersion compensators 160-1, . . . , 160-K. FIG. 1 shows an example where N=2, M=2, J=2, and K=2.

In the following, a case where a subscriber device 120a-n (n=1, 2) communicates with a subscriber device 120b-n will be described as an example. Optical signals output by the subscriber device 120a-n and received by the subscriber device 120b-n use the wavelength λnu, and optical signals output by the subscriber device 120b-n and received by the subscriber device 120a-n use the wavelength λnd. The opposing subscriber devices 120a-n and 120b-n are connected via optical SWs 130a and 130b, wavelength multiplexers/demultiplexers 140a-n and 140b-n, and an optical transmission path 150-n.

The subscriber device 120 transmit and/or receive optical signals. The subscriber device 120 transmits and receives optical signals of wavelengths notified from the management control device 170. The subscriber device 120 transmits and receives an optical signal according to the value of the signal parameter notified from the management control device 170. Signal parameters determine characteristics of the signal. The signal parameters represent, for example, a baud rate, a modulation method, an output light intensity, and the like.

The optical SW 130 has a plurality of input ports 131 and a plurality of output ports 132. The optical SW 130 outputs the optical signal input from the input port 131 to the output port 132, and outputs the optical signal input from the output port 132 to the input port 131. The optical SW 130 can change the connection between the input port 131 and the output port 132. Some input ports 131 of the optical SW 130a are connected to the subscriber device 120a via optical transmission paths, and some output ports 132 of the optical SW 130a are connected to the wavelength multiplexer/demultiplexer 140a via an optical transmission path. Some of the input ports 131 and some of the output ports 132 of the optical SW 130a are connected to the dispersion compensator 160 via an optical transmission path. The input port 131 of the optical SW 130b is connected to the subscriber device 120b via an optical transmission path, and the output port 132 of the optical SW 130b is connected to the wavelength multiplexer/demultiplexer 140b via an optical transmission path.

The wavelength multiplexer/demultiplexer 140 has a plurality of first ports (not shown) and one second port (not shown). The plurality of first ports correspond to different wavelengths. The first ports are respectively connected to different output ports 132 of the optical SW 130. The second port is connected to the optical transmission path 150. The wavelength multiplexer/demultiplexer 140 has a function of multiplexing optical signals of different wavelengths input from the optical SW 130 by the plurality of first ports and outputting the multiplexed optical signals from the second port, and/or a function of demultiplexing the optical signals input from the second port into optical signals of different wavelengths and outputting the demultiplexed optical signals from the separate first ports. For example, the wavelength multiplexer/demultiplexer 140 is an AWG (Arrayed Waveguide Grating).

The optical transmission path 150 transmits optical signals. The optical transmission path 150 is, for example, an optical fiber. The dispersion compensator 160 is an example of a quality compensator that compensates for the quality of the optical signal. The dispersion compensator 160 compensates for the dispersion of the optical signal output from the output port 132 of the optical SW 130 and inputs the dispersion-compensated optical signal to the input port 131 of the optical SW 130. The amounts of dispersion that can be compensated by the dispersion compensators 160 are different. When K≥3, the amount of dispersion that can be compensated by some of the plurality of dispersion compensators 160 may be the same. Thus, the amount of dispersion compensated by the K dispersion compensators 160 is of a plurality of types. For the K dispersion compensators 160, for example, dispersion compensating fibers having different lengths can be used.

Note that the dispersion of one optical signal may be compensated by a plurality of dispersion compensators 160. For example, the optical SW 130a outputs an optical signal from an output port 132 connected to the dispersion compensator 160-1. The dispersion compensator 160-1 compensates for the dispersion of the optical signal output from the optical SW 130a, and inputs the dispersion-compensated optical signal to the input port 131 of the optical SW 130a. Subsequently, the optical SW 130a outputs the optical signal input from the input port 131 connected to the dispersion compensator 160-1 from the output port 132 connected to the dispersion compensator 160-2. The dispersion compensator 160-2 compensates for the dispersion of the optical signal output from the optical SW 130a, and inputs the dispersion-compensated optical signal to the input port 131 of the optical SW 130a. In this case, the combined dispersion compensation effect of the dispersion compensators 160-1 and 160-2 can be expected. Therefore, the types of dispersion compensators 160 can be reduced, and the number of dispersion compensators 160 can be reduced.

The management control device 170 is an example of a control device that controls an optical path within the optical SW 130 for optical signal quality compensation. The management control device 170 has a management controller 171. The management controller 171 has a storage 172, an allocator 173, a selector 174, a port connection determiner 175 and a notifier 176.

The storage 172 stores a first parameter table. The first parameter table is data in which optical output subscriber devices, optical input subscriber devices, resource information, signal parameter information, allowable quality deterioration information, and dispersion compensator information are associated with each other. An optical output subscriber device is a subscriber device 120 that outputs optical signals. An optical input subscriber device is a subscriber device 120 that receives optical signals.

The resource information indicates resources used for transmission of optical signals from optical output subscriber devices to optical input subscriber devices. The resource information may include information regarding the transmission quality of the resource in addition to or instead of the information identifying the resource. Resources include communication wavelengths and the optical transmission paths 150. The resource may include the optical SW 130 and the wavelength multiplexer/demultiplexer 140. The information on transmission quality indicates the amount of signal quality deterioration, or the amount used to calculate the amount of signal quality deterioration, among resource specifications and characteristics. For example, in the case of the optical transmission path 150, the information regarding the transmission quality is the length (transmission distance) of the optical transmission path 150, the chromatic dispersion of the optical fiber per unit distance, the cumulative chromatic dispersion, and the like.

The signaling parameter information indicates the value of the signaling parameter used by the subscriber device 120 or the settings represented by the value. The allowable quality deterioration information represents the degree of allowable quality deterioration. In the present embodiment, the allowable quality deterioration information indicates the allowable dispersion amount. The quality compensator information indicates available quality compensators. The available quality compensator is a quality compensator that compensates for quality so that the degree of quality deterioration is an allowed degree according to the degree of quality deterioration of an optical signal generated when the optical signal is transmitted through a transmission path. In the present embodiment, the quality compensator is the dispersion compensator 160.

The allocator 173 allocates resources to be used for optical paths between the subscriber devices 120 and determines values of signal parameters. Any conventional technique can be used for allocation of resources and determination of values of signal parameters. Note that another device connected to the management control device 170 may have the allocator 173.

The selector 174 reads quality compensator information corresponding to a search condition indicated by the subscriber device 120 that outputs an optical signal, the subscriber device 120 that receives the optical signal, and the signal parameter information used for the optical signal between the subscriber devices 120 from the first parameter table. The signal parameter information indicates the value of the signal parameter determined by the allocator 173, or the setting content represented by the value of the signal parameter. The search condition may further include used resource information. The used resource information includes at least part of the resources allocated by allocator 173 and the information on the transmission quality of the resources. The selector 174 selects a quality compensator to be used from the quality compensators indicated by the read quality compensator information. The number of quality compensators to be selected may be one, or two or more. That is, the optical path between the subscriber devices 120 passes through one or more quality compensators.

The port connection determiner 175 determines the port connection relationship within the optical SW 130 for passing through the quality compensator selected by the selector 174 between the subscriber devices 120 on the optical path between the subscriber devices 120. The port connection relationship indicates the connection relationship between the input port 131 and the output port 132.

The notifier 176 notifies the subscriber device 120 that outputs the optical signal and the subscriber device 120 that receives the optical signal of the resources and signal parameter values determined by the allocator 173. In addition, the notifier 176 notifies the optical SW 130 of the port connection relationship determined by the port connection determiner 175.

FIG. 2 is a diagram showing an example of a first parameter table. The first parameter table is information in which a number, an optical output subscriber device, an optical input subscriber device, an optical transmission path, a wavelength, a chromatic dispersion of a fiber, a transmission distance, an cumulative chromatic dispersion, a modulation method, a baud rate, an allowable dispersion amount, and dispersion compensator information are associated with each other. The optical transmission path, wavelength, chromatic dispersion of fiber, transmission distance and cumulative chromatic dispersion are resource information. The modulation method and baud rate are signal parameter information. The dispersion compensator information is an example of quality compensator information. The dispersion compensator information indicates available dispersion compensators 160. In this way, the management controller 171 grasps the items from the optical output subscriber device to the allowable dispersion amount, and selects the dispersion compensator 160 based on the search conditions.

An example of selection of the dispersion compensator 160 is shown. In the currently commonly used transmission optical fibers (Standard Single-Mode Fiber: SSMF), the communication wavelength in the 1550 nm band has a chromatic dispersion of approximately 17 ps/nm/km. Therefore, the cumulative chromatic dispersion is 1700 ps/nm when the transmission distance is 100 km. When the modulation methods are different, the allowable dispersion values are different due to the difference in the spectrum spread. Furthermore, the allowable dispersion value decreases in inverse proportion to the square of the transmission speed. For example, the allowable dispersion value for a 40 Gbps signal whose modulation method is NRZ (Non return to Zero) is about 100 ps/nm (see Reference 1, for example). In this case, the dispersion compensator 160 having a dispersion compensation function that can reduce the cumulative chromatic dispersion amount from 1700 ps/nm to 100 ps/nm or less should be selected. The selected dispersion compensator 160 is set in the first parameter table.

(Reference 1) Aikawa et al., "Dispersion Compensating Fiber Module", Fujikura Technical Report, No. 119, Vol. 2, 2010, p. 7-16

FIG. 3 is a sequence diagram showing the operation up to main signal conduction in the optical communication system 110. FIG. 3 shows an example in which the subscriber device 120a-1 communicates with the subscriber device 120b-1. Further, here, a case where an optical signal passes through one quality compensator will be described as an example.

The subscriber device 120a-1 connects to the optical SW 130a (step S101). The subscriber device 120b-1 connects to the optical SW 130b (step S102). The subscriber device 120a-1 transmits a connection request to the management control device 170 (step S103). Information indicating that the subscriber device 120b-1 is the connection destination is set in the connection request.

The allocator 173 of the management control device 170 determines the communication wavelength and the optical transmission path 150 used for the optical signal between the subscriber device 120a-1 and the subscriber device 120b-1, and the signal parameter value (step S104).

For example, the allocator 173 determines an optical path so that the optical signal transmitted from the subscriber device 120a-1 is output to the subscriber device 120b-1 via the optical SW 130a, the wavelength multiplexer/demultiplexer 140a-1, the optical transmission path 150-1, the wavelength multiplexer/demultiplexer 140b-1, and the SW 130b. The allocator 173 allocates a wavelength λ1u used in this optical path. Similarly, the allocator 173 determines an optical path from the subscriber device 120b-1 to the subscriber device 120a-1 and allocates a wavelength λ1d. The allocator 173 determines the value of the signal parameter used for this optical path. Note that the optical signal from the subscriber device 120b-1 to the subscriber device 120a-1 will be explained in the second to fourth embodiments, so detailed description will be omitted in the present embodiment.

Further, the allocator 173 determines the baud rate, modulation method, output light intensity, and the like to be used for the optical path, and determines signal parameter values corresponding to the determined baud rate, modulation method, output light intensity, and the like. For example, when the fiber lengths between the subscriber device 120a-1 and the optical SW 130a, between the optical SW 130b and the subscriber device 120b-1, and the optical transmission path 150-1 are different, the allocator 173 changes the value of the signal parameter for the optical signal used between the subscriber devices 120a-1 and 120b-1. As a specific example, the allocator 173 determines the baud rate so that communication is performed at a high baud rate when the fiber length of the optical transmission path 150 through which the optical signal passes is short, and conversely, communication is performed at a low baud rate when the fiber length of the optical transmission path 150 through which the optical signal passes is long. The allocator 173 changes the baud rate according to the state of the optical transmission path 150 through which the optical signal passes. This allows the subscriber device 120a-1 and the subscriber device 120b-1 to receive optical signals accurately.

The notifier 176 notifies the subscriber device 120a-1 and the subscriber device 120b-1 of the allocated communication wavelength and the determined signal parameter value (steps S105 and S106).

The selector 174 reads dispersion compensator information from the first parameter table stored in the storage 172 using, as a search condition, a combination of the optical output subscriber device indicating the subscriber device 120a-1, the optical input subscriber device indicating the subscriber device 120b-1, the resource information of the resources allocated in step S104, and the communication parameter information representing the communication parameter value determined in step S104. If the resource used is fixed depending on the combination of the optical output subscriber device and the optical input subscriber device, the search condition may not include resource information. If the communication parameter value used is fixed depending on the combination of the optical output subscriber device and the optical input subscriber device, the search condition may not include the communication parameter information. The selector 174 selects the dispersion compensator 160-1 to be used for the optical signal from the subscriber device 120a-1 to the subscriber device 120b-1 among the dispersion compensators 160 indicated by the dispersion compensator information (step S107). The selector 174 similarly selects the dispersion compensator 160 to be used for the optical signal from the subscriber device 120b-1 to the subscriber device 120a-1.

The port connection determiner 175 identifies the optical SW 130a and the optical SW 130b through which the optical path between the subscriber device 120a-1 and the subscriber device 120b-1 passes. The port connection determiner 175 determines the port connection relationship of the optical SW 130a and the optical SW 130b (step S108). The port connection determiner 175 determines the port connection relationship between the input port 131 and the output port 132 so that the optical path between the subscriber device 120a-1 and the subscriber device 120b-1 passes through the dispersion compensator 160 selected by the selector 174.

Specifically, the optical signal from the subscriber device 120a-1 to the subscriber device 120b-1 uses the dispersion compensator 160-1. Therefore, the port connection determiner 175 connects the input port 131 and the output port 132 in the optical SW 130a connected to the dispersion compensator 160-1 so that the optical signal input from the input port 131 connected to the subscriber device 120a-1 passes through the dispersion compensator 160-1 until the optical signal is output from the output port 132 connected to the wavelength multiplexer/demultiplexer 140a-1. In other words, the port connection determiner 175 determines the port connection of the optical SW 130a so that the optical signal input from the input port 131 connected to the subscriber device 120a-1 is output to the output port 132 connected to the dispersion compensator 160-1. Further, the port connection determiner 175 determines the port connection relationship of the optical SW 130a so that the optical signal input from the input port 131 connected to the dispersion compensator 160-1 is output to the output port 132 connected to the first port corresponding to the wavelength λ1u of the wavelength multiplexer/demultiplexer 140a-1. In addition, for the optical SW 130b, the port connection determiner 175 determines the port connection relationship so that the optical signal input from the output port 132 connected to the first port corresponding to the wavelength λ1u of the wavelength multiplexer/demultiplexer 140b-1 is output to the input port 131 connected to the subscriber device 120b-1.

The notifier 176 notifies the optical SW 130a of the port connection relationship of the optical SW 130a determined by the port connection determiner 175 (step S109). Similarly, the notifier 176 notifies the optical SW 130b of the port connection relationship of the optical SW 130b determined by the port connection determiner 175 (step S110). The optical SW 130a connects the input port 131 and the output port 132 according to the port connection relationship notified in step S109 (step S111). Similarly, the optical SW 130b connects the input port 131 and the output port 132 according to the port connection relationship notified in step S110 (step S112).

On the other hand, the subscriber device 120a-1 sets the communication wavelength and signal parameters notified in step S105 (step S113). Similarly, the subscriber device 120b-1 sets the communication wavelength and signal parameters notified in step S106 (step S114).

The subscriber device 120a-1 transmits a main signal of the wavelength λ1u. The optical SW 130a and the optical SW 130b relay the main signal transmitted from the subscriber device 120a-1 according to the set port connection relationship. The subscriber device 120b-1 receives the main signal transmitted from the subscriber device 120a-1 (step S115). The subscriber device 120b-1 transmits a main signal of the wavelength λ1d. The optical SW 130b and the optical SW 130a relay the main signal according to the set port connection relationship. The subscriber device 120a-1 receives the main signal transmitted from the subscriber device 120b-1 (step S116).

As described above, the optical signal transmitted from the subscriber device 120a-1 passes through the optical SW 130a, the dispersion compensator 160-1, and the optical SW 130a in this order, and then the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

Further, the optical communication system 110 performs the same processing as described above between the subscriber device 120a-2 and the subscriber device 120b-2. The allocator 173 of the management control device 170 determines the optical path so that the optical signal transmitted from the subscriber device 120a-2 is input to the subscriber device 120b-2 via the optical SW 130a, the wavelength multiplexer/demultiplexer 140a-2, the optical transmission path 150-2, the wavelength multiplexer/demultiplexer 140b-2, and the optical SW 130b. The allocator 173 allocates the wavelength λ2u to the optical signal from the subscriber device 120a-2 to the subscriber device 120b-2 and determines the signal parameter value. The selector 174 determines that the dispersion compensator 160-2 is used for the optical signal from the subscriber device 120a-2 to the subscriber device 120b-2. As a result, the optical signal transmitted from the subscriber device 120a-2 passes through the optical SW 130a, the dispersion compensator 160-2, and the optical SW 130a in order, and then, the optical signal is input to the optical transmission path 150-2 via the wavelength multiplexer/demultiplexer 140a-2. The optical signal input from the optical transmission path 150-2 to the optical SW 130b via the wavelength multiplexer/demultiplexer 140b-2 is output to the subscriber device 120b-2.

The optical signal between the subscriber devices 120 may also pass through a plurality of dispersion compensators 160. In this case, the combination of dispersion compensators 160 to be used is set in the dispersion compensator information of the first parameter table. Thus, for example, in step S107, the selector 174 selects the dispersion compensators 160-1 and 160-2 for the optical signal from the subscriber device 120a-1 to the subscriber device 120b-1. The selector 174 determines the order in which the selected dispersion compensators 160-1 and 160-2 are used according to a predetermined rule. Alternatively, the dispersion compensator information may include information on the order in which the dispersion compensators 160-1 and 160-2 are used. Here, the selector 174 determines the dispersion compensator 160-1 to be used first.

In this case, in step S108, the port connection determiner 175 determines the port connection of the optical SW 130a so that the optical signal input from the input port 131 connected to the subscriber device 120a-1 is output to the output port 132 connected to the dispersion compensator 160-1. Further, the port connection determiner 175 determines the port connection of the optical SW 130a so that the optical signal input from the input port 131 connected to the dispersion compensator 160-1 is output to the output port 132 connected to the dispersion compensator 160-2. Furthermore, the port connection determiner 175 determines the port connection relationship of the optical SW 130a so that the optical signal input from the input port 131 connected to the dispersion compensator 160-2 is output to the output port 132 connected to the first port corresponding to the wavelength λ1u of the wavelength multiplexer/demultiplexer 140a-1.

The port connection determiner 175 controls the connection relationship between the input port 131 and the output port 132 of the optical SW 130 so that the same quality compensator is not used in a loop. This is because the path of the optical SW 130 requires to be changed in order to extract the main signal from the loop. The path change may cause a loss of the main signal.

As described above, the optical communication system 110 can select the dispersion compensator 160 through which the optical signal passes. The optical communication system 110 may connect the input port 131 and the output port 132 of the optical SW 130a so as not to pass through the dispersion compensator 160 depending on the state of the optical transmission path 150 and the signal parameter value.

Figure 34:
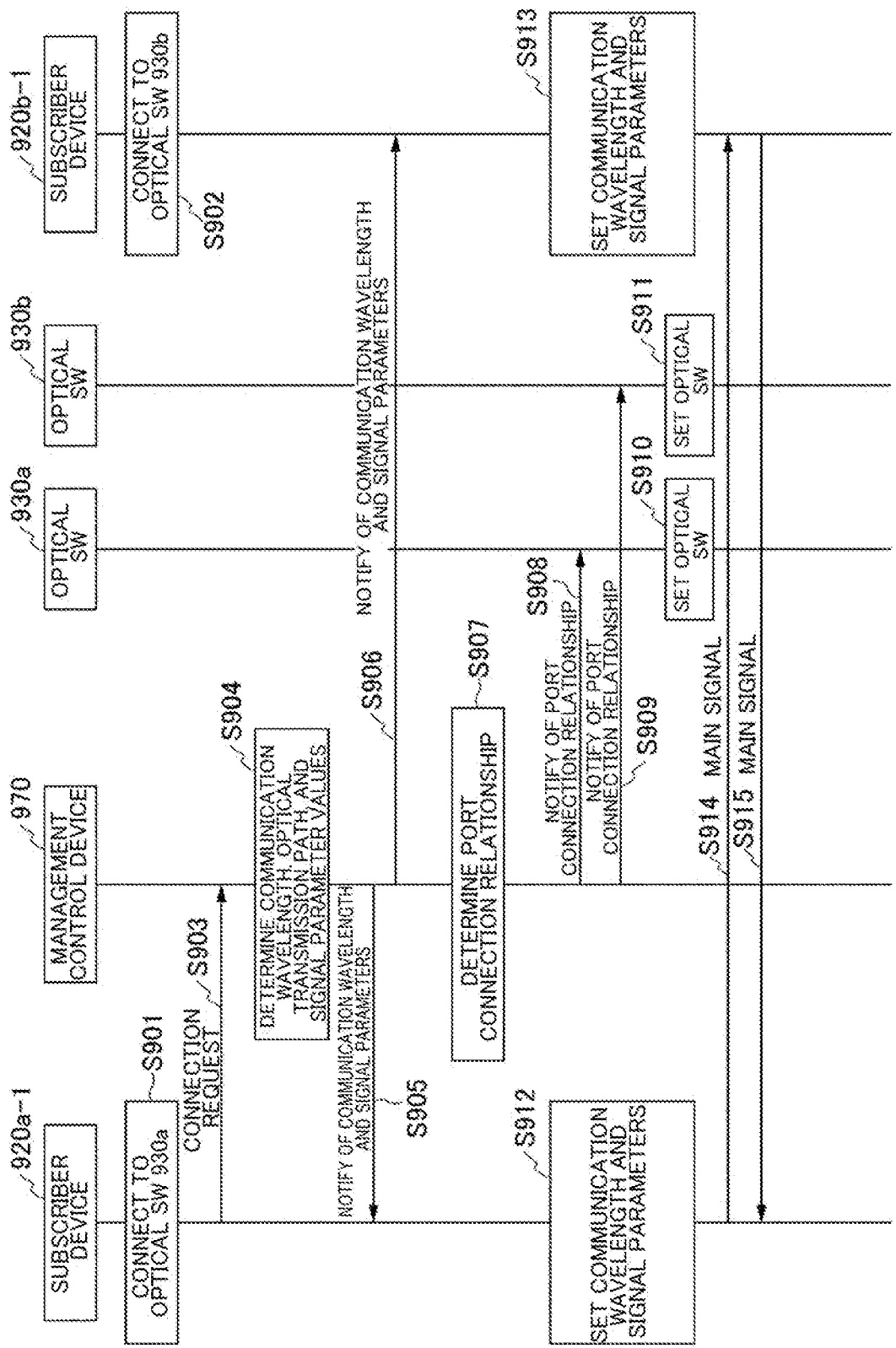
FIG. 34 is a sequence diagram showing the operation of a conventional optical communication system.
Figure 35:
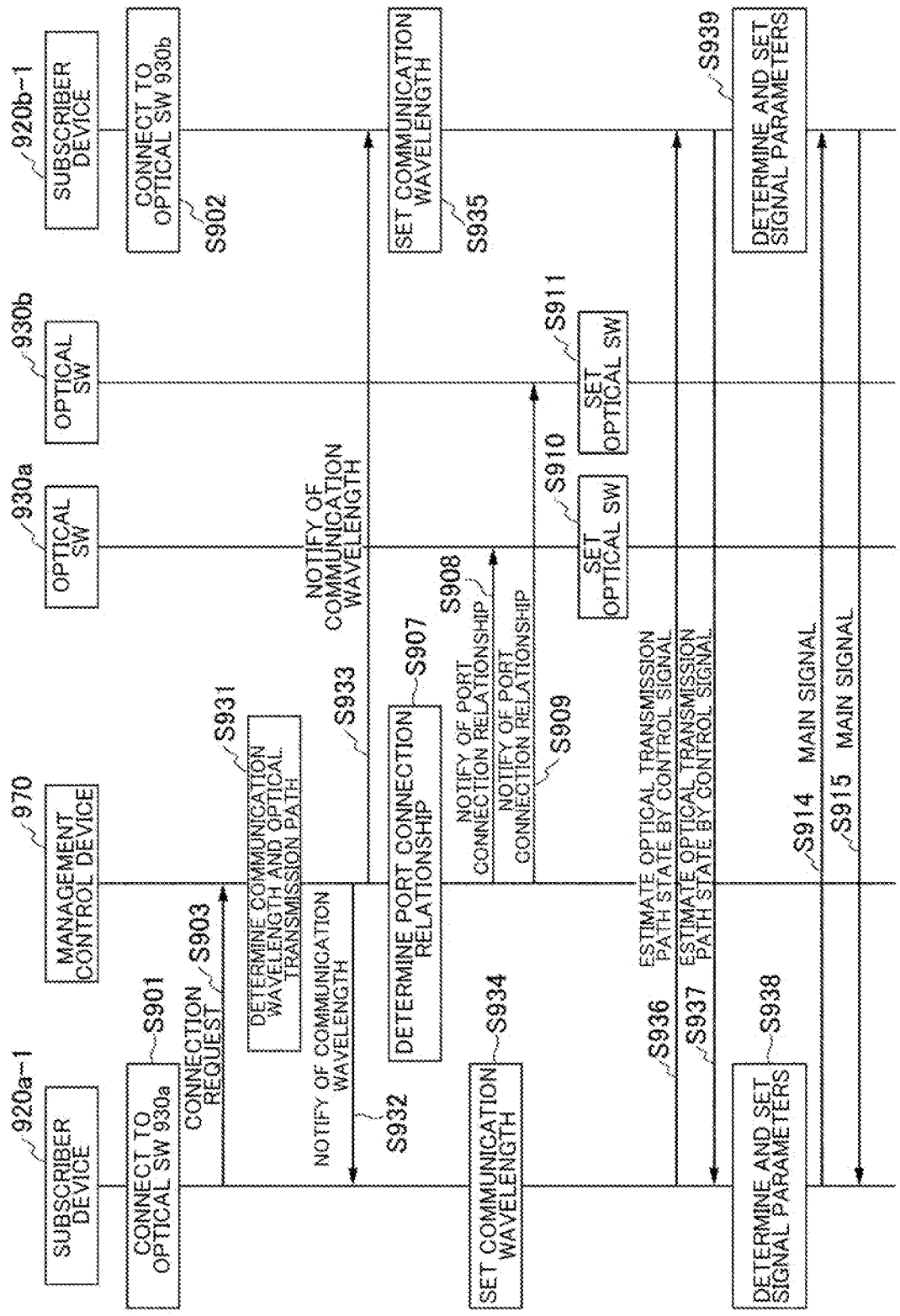
FIG. 35 is a sequence diagram showing the operation of a conventional optical communication system.
Figure 36:
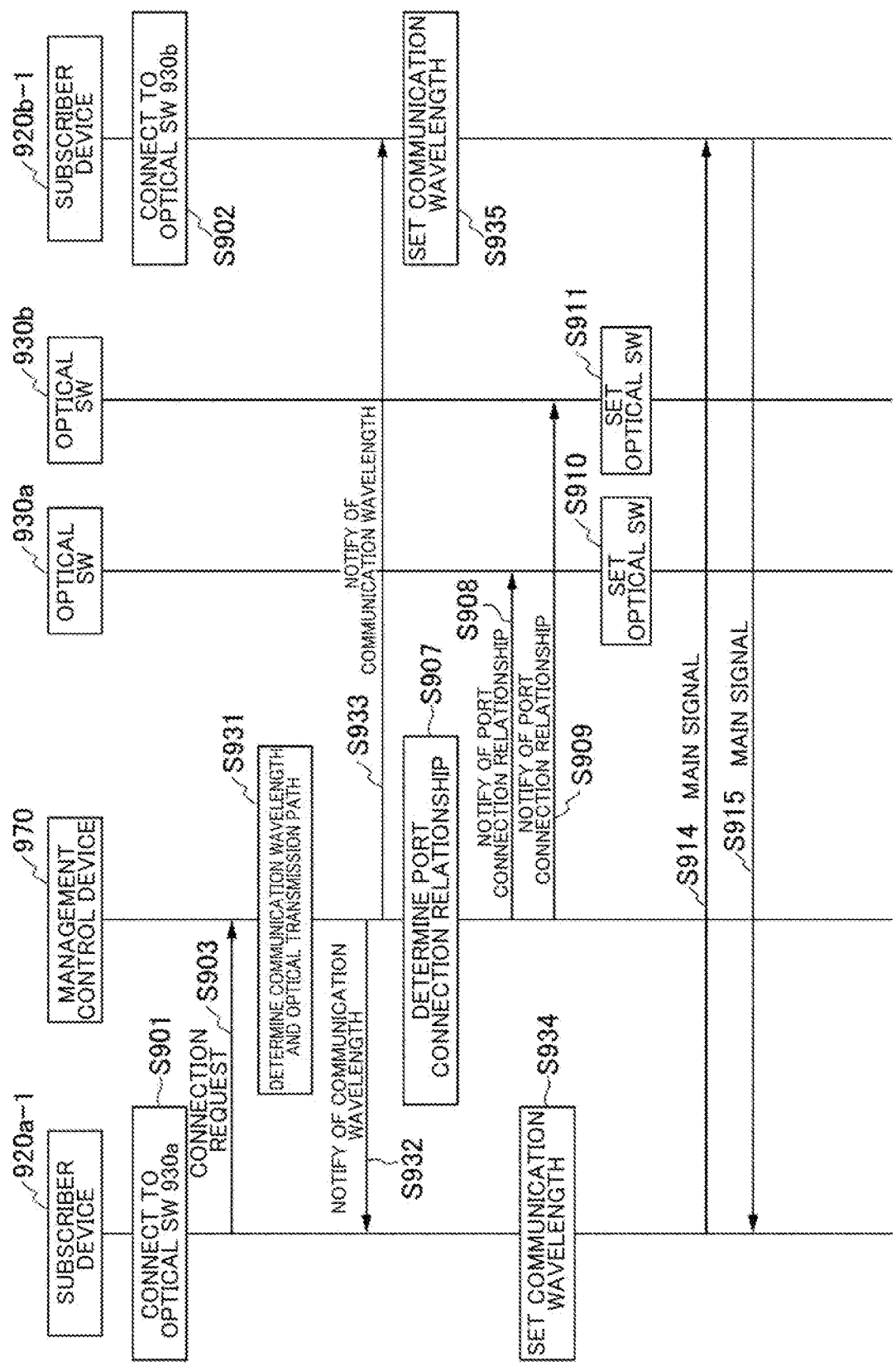
FIG. 36 is a sequence diagram showing the operation of a conventional optical communication system.

The sequence of the present embodiment shown in FIG. 3 corresponds to the conventional sequence shown in FIG. 34 in which a process (step S107) of the selector 174 selecting the dispersion compensator 160 is added before the management control device 170 notifies the optical SW 130 of the port connection relationship and the process of step S108 is performed instead of the process of step S907. Similarly, the optical communication system 110 may perform an operation in which the process of step S107 is added before the port connection relationship determination process (step S907) in the conventional sequence shown in FIGS. 35 and 36. The port connection determiner 175 performs the process of step S108 of determining the port connection relationship in the optical SW 130 connected to the selected dispersion compensator 160 so as to pass through the dispersion compensator 160 instead of the process of step S908.

The optical communication system 110 of the present embodiment selects the dispersion compensator 160 according to the cumulative chromatic dispersion amount and an allowable dispersion amount in the optical path through which the optical signal is transmitted, and controls the optical path in the optical SW 130 so that the selected dispersion compensator 160 passes through the optical path. As a result, even in an optical communication system in which a plurality of types of optical transmission path states and signal parameter values can be selected, desired reception sensitivity can be obtained by performing appropriate dispersion compensation.

Second Embodiment

In the first embodiment, the optical signal from the subscriber device 120a to the subscriber device 120b in FIG. 1 passes through the dispersion compensator 160. In the present embodiment, the optical signal from the subscriber device 120b to the subscriber device 120b also passes through the dispersion compensator 160. The present embodiment will be described focusing on differences from the first embodiment.

Figure 4:
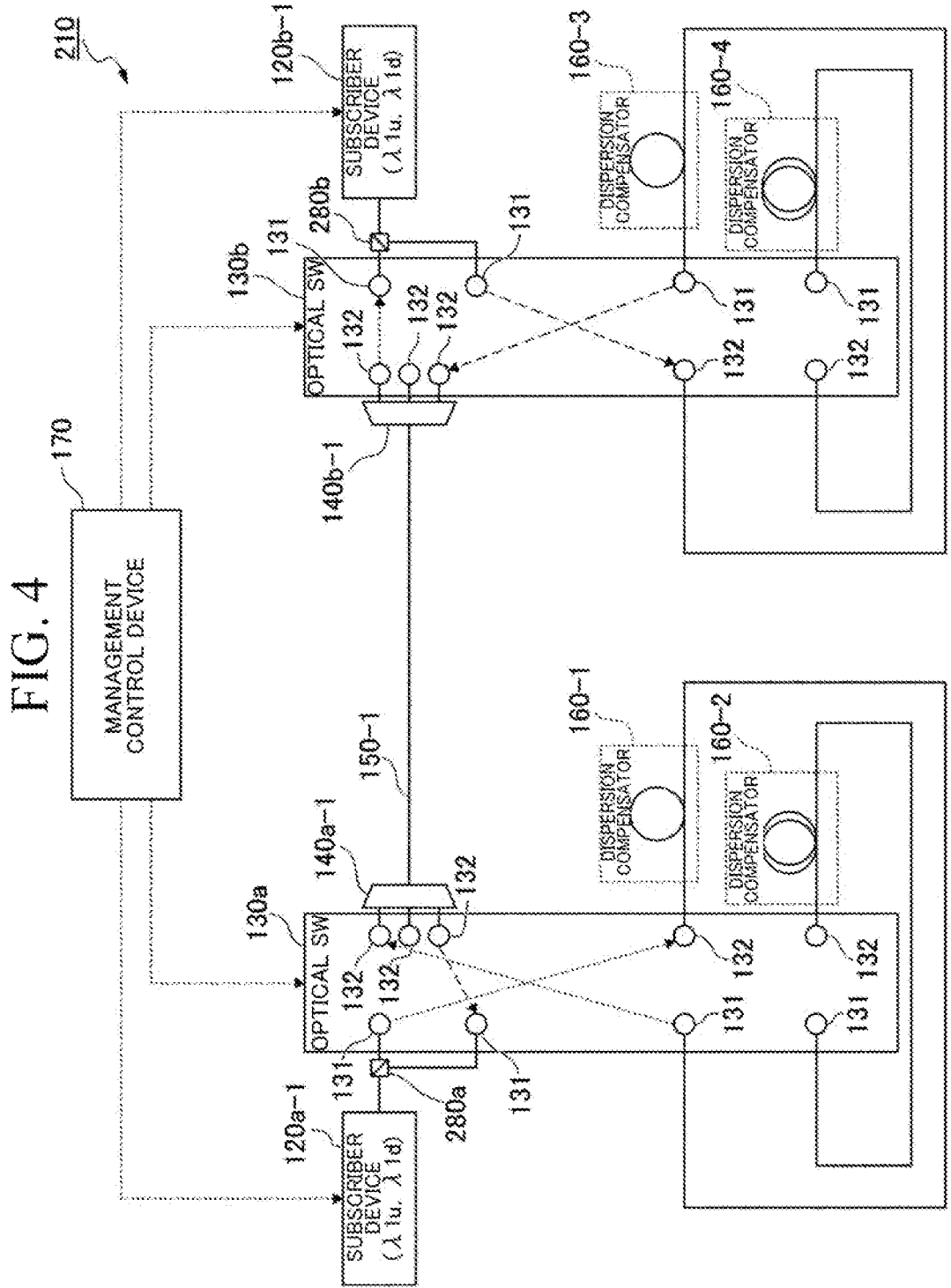
FIG. 4 is a diagram showing the configuration of an optical communication system according to a second embodiment.

FIG. 4 is a diagram showing the configuration of an optical communication system 210 according to the second embodiment. The optical communication system 210 shown in FIG. 4 is different from the optical communication system 110 of the first embodiment shown in FIG. 1 in that a wavelength separation filter 280 is provided between the subscriber device 120 and the optical SW 130, and the optical SW 130b is connected to the dispersion compensator 160. Descriptions of the subscriber devices 120a-2 and 120b-2, the wavelength multiplexer/demultiplexer 140a-2, and the optical transmission path 150-2 are omitted. The wavelength separation filter 280 between the subscriber device 120a-1 and the optical SW 130a is described as a wavelength separation filter 280a, and the wavelength separation filter 280 between the subscriber device 120b-1 and optical SW 130b is described as a wavelength separation filter 280b. The wavelength separation filters 280a and 280b separate a wavelength λ1u and a wavelength λ1d. Two dispersion compensators 160 connected to the optical SW 130b are described as dispersion compensators 160-3 and 160-4.

The format of the first parameter table stored by the management control device 170 is the same as in the first embodiment. However, in the first parameter table of the first embodiment shown in FIG. 2, the dispersion compensator 160-3 is set in the dispersion compensator information in the row number 2.

The optical communication system 210 performs the same processing as in the sequence diagram of the optical communication system 110 of the first embodiment shown in FIG. 3, except for the following.

That is, in step S104, the allocator 173 determines the optical path from the subscriber device 120b-1 to the subscriber device 120a-1 as an optical path in the reverse direction to the optical path from the subscriber device 120a-1 to the subscriber device 120b-1. In step S107, the selector 174 further selects the dispersion compensator 160 to be used for the optical signal from the subscriber device 120b-1 to the subscriber device 120a-1. Therefore, the selector 174 reads the dispersion compensator information from the first parameter table using, as the search condition, a combination of the optical output subscriber device indicating the subscriber device 120b-1, the optical input subscriber device indicating the subscriber device 120a-1, the resource information of the resources allocated in step S104, and the communication parameter information representing the communication parameter value determined in S104. The selector 174 selects the dispersion compensator 160-3 to be used for the optical signal from the subscriber device 120b-1 to the subscriber device 120a-1 among the dispersion compensators 160 indicated by the read dispersion compensator information.

In step S108, the port connection determiner 175 determines the port connection relationship for optical signals from the subscriber device 120a-1 to the subscriber device 120b-1, as in the first embodiment. Furthermore, the port connection determiner 175 determines the port connection relationship for optical signals from the subscriber device 120b-1 to the subscriber device 120a-1 as follows.

The port connection determiner 175 determines that the selected dispersion compensator 160-3 is connected to the optical SW 130b. The port connection determiner 175 connects the input port 131 and the output port 132 in the optical SW 130b, so that the optical signal input from the input port 131 connected to the subscriber device 120b-1 passes through the dispersion compensator 160-3 until the optical signal is output from the output port 132 connected to the wavelength multiplexer/demultiplexer 140b-1. In other words, the port connection determiner 175 determines the port connection relationship of the optical SW 130b so that the optical signal input from the input port 131 connected to the subscriber device 120b-1 is output to the output port 132 connected to the dispersion compensator 160-3.

Further, the port connection determiner 175 determines the port connection relationship of the optical SW 130b so that the optical signal input from the input port 131 connected to the dispersion compensator 160-3 is output to the output port 132 connected to the first port corresponding to the wavelength λ1u of the wavelength multiplexer/demultiplexer 140b-1. Further, for the optical SW 130a, the port connection determiner 175 determines the port connection relationship so that the optical signal input from the output port 132 connected to the first port corresponding to the wavelength λ1d of the wavelength multiplexer/demultiplexer 140a-1 is output to the input port 131 connected to the subscriber device 120a-1.

In step S115, the subscriber device 120a-1 transmits the main signal of the wavelength λ1u. The main signal transmitted from the subscriber device 120a-1 passes via the wavelength separation filter 280a, the optical SW 130a, the dispersion compensator 160-1, and the optical SW 130a in order, and then, the main signal is input to the optical transmission path 150-1 via the wavelength multiplexer/demultiplexer 140a-1. The main signal input from the optical transmission path 150-1 to the optical SW 130b via the wavelength multiplexer/demultiplexer 140b-1 is output to the subscriber device 120b-1 via the wavelength separation filter 280b.

In step S116, the subscriber device 120b-1 transmits the main signal of the wavelength λ1d. The main signal transmitted from the subscriber device 120b-1 passes via the wavelength separation filter 280b, the optical SW 130b, the dispersion compensator 160-3, and the optical SW 130b in order, and then, the main signal is input to the optical transmission path 150-1 via the wavelength multiplexer/demultiplexer 140b-1. The main signal input to the optical SW 130a from the optical transmission path 150-1 via the wavelength multiplexer/demultiplexer 140a-1 is output to the subscriber device 120a-1 via the wavelength separation filter 280a.

The optical signal from the subscriber device 120b-1 to the subscriber device 120a-1 may pass through a plurality of dispersion compensators 160. For example, in step S107, the selector 174 selects the dispersion compensator 160-3 and the dispersion compensator 160-4 for the optical signal from the subscriber device 120b-1 to the subscriber device 120a-1. The selector 174 determines that the dispersion compensator 160-3 is to be used first based on a predetermined rule or the order information set in the dispersion compensator information.

In this case, in step S108, the port connection determiner 175 determines the port connection of the optical SW 130b so that the optical signal input from the input port 131 connected to the subscriber device 120b-1 is output to the output port 132 connected to the dispersion compensator 160-3. Further, the port connection determiner 175 determines the port connection of the optical SW 130b so that the optical signal input from the input port 131 connected to the dispersion compensator 160-3 is output to the output port 132 connected to the dispersion compensator 160-4. Furthermore, the port connection determiner 175 determines the port connection relationship of the optical SW 130b so that the optical signal input from the input port 131 connected to the dispersion compensator 160-4 is output to the output port 132 connected to the first port corresponding to the wavelength λ1d of the wavelength multiplexer/demultiplexer 140b-1.

The optical communication system 210 of the second embodiment can compensate for the dispersion of the optical signal output from the subscriber devices 120a-n and received by the subscriber devices 120*b-n* and the optical signal output from the subscriber devices 120*b-n* and received by the subscriber devices 120*a* using different dispersion compensators 160.

Third Embodiment

In the optical communication system of the second embodiment, the optical SW closest to the subscriber device that performs optical transmission performs dispersion compensation. However, regardless of this configuration, for example, dispersion compensation of an optical signal output from a subscriber device may be performed by a dispersion compensator connected to an optical SW different from the optical SW connected to the subscriber device. The present embodiment will be described focusing on differences from the first and second embodiments.

Figure 5:
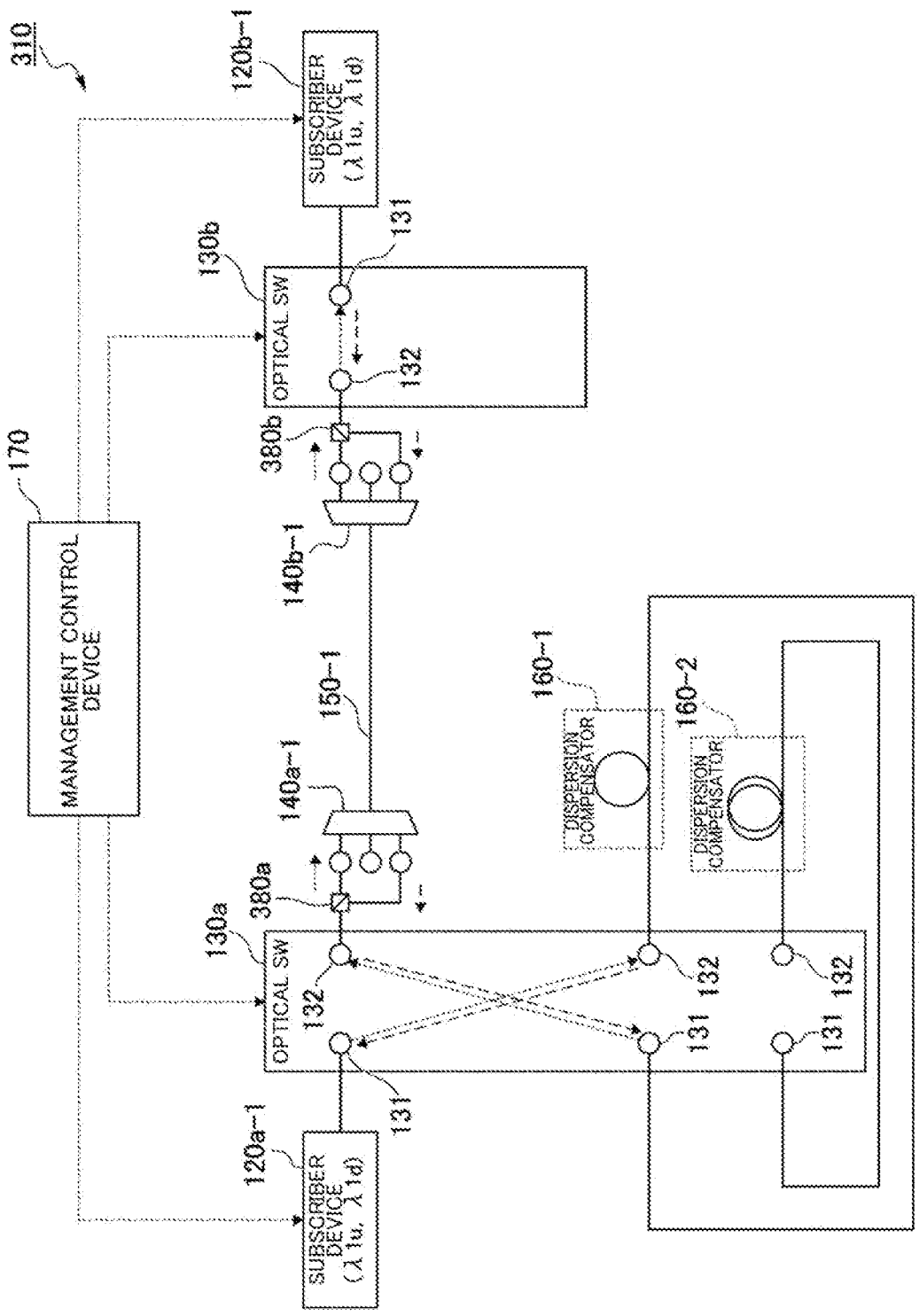
FIG. 5 is a diagram showing the configuration of an optical communication system according to a third embodiment.

FIG. 5 is a diagram showing the configuration of an optical communication system 310 according to the third embodiment. The optical communication system 310 shown in FIG. 5 is different from the optical communication system 110 of the first embodiment shown in FIG. 1 in that a wavelength separation filter 380 is provided between the optical SW 130 and the wavelength multiplexer/demultiplexer 140. Thus, the optical SW 130 is connected to the wavelength multiplexer/demultiplexer 140 via the wavelength separation filter 380 by one output port 132. The wavelength separation filter 380 between the optical SW 130*a* and the wavelength multiplexer/demultiplexer 140*a*-1 is described as a wavelength separation filter 380*a*, and the wavelength separation filter 380 between the optical SW 130*b* and the wavelength multiplexer/demultiplexer 140*b*-1 is described as a wavelength separation filter 380*b*.

The wavelength separation filter 380*a* and the wavelength separation filter 380*b* separate the wavelength λ1u and the wavelength λ1d. The wavelength separation filter 380*a* outputs the optical signal of the wavelength λ1u input from the output port 132 of the optical SW 130*a* to the first port corresponding to the wavelength λ1u of the wavelength multiplexer/demultiplexer 140*a*-1, and outputs the optical signal of the wavelength λ1d output from the first port of the wavelength multiplexer/demultiplexer 140*a*-1 to the output port 132 of the optical SW 130*a*. The wavelength separation filter 380*b* outputs the optical signal of the wavelength λ1d input from the output port 132 of the optical SW 130*b* to the first port corresponding to the wavelength λ1d of the wavelength multiplexer/demultiplexer 140*b*-1, and outputs the optical signal of the wavelength λ1u output from the first port of the wavelength multiplexer/demultiplexer 140*b*-1 to the output port 132 of the optical SW 130*b*.

The format of the first parameter table stored by the management control device 170 is the same as in the first embodiment. However, in the first parameter table of the first embodiment shown in FIG. 2, the dispersion compensator 160-1 is set in the dispersion compensator information in the row number 2.

The optical communication system 310 performs the same processing as in the sequence diagram of the optical communication system 110 of the first embodiment shown in FIG. 3, except for the following.

That is, in step S104, the allocator 173 determines the optical path from the subscriber device 120*b*-1 to the subscriber device 120*a*-1 as an optical path in the reverse direction to the optical path from the subscriber device 120*a*-1 to the subscriber device 120*b*-1. In step S107, the selector 174 selects the dispersion compensator 160-1 to be used for the optical signal from the subscriber device 120*b*-1 to the subscriber device 120*a*-1 by the same processing as in the second embodiment.

In step S108, the port connection determiner 175 determines the port connection relationship for optical signals from the subscriber device 120*a*-1 to the subscriber device 120*b*-1, as in the first embodiment. Furthermore, for the optical signal from the subscriber device 120*b*-1 to the subscriber device 120*a*-1, the port connection relationship is determined as follows.

The port connection determiner 175 determines that the selected dispersion compensator 160-1 is connected to the optical SW 130*a*. For the optical SW 130*b*, the port connection determiner 175 determines the port connection relationship so that the optical signal input from the input port 131 connected to the subscriber device 120*b*-1 is output to the output port 132 connected to the wavelength multiplexer/demultiplexer 140*b*-1. In addition, the port connection determiner 175 determines the port connection relationship in the optical SW 130*a* so that the optical signal input from the output port 132 connected to the wavelength multiplexer/demultiplexer 140*a*-1 is output to the input port 131 connected to the dispersion compensator 160-1. Further, the port connection determiner 175 determines the port connection relationship of the optical SW 130*a* so that the optical signal input from the output port 132 connected to the dispersion compensator 160-1 is output to the input port 131 connected to the subscriber device 120*a*-1.

In step S115, the subscriber device 120*a*-1 transmits the main signal of the wavelength λ1u. The main signal transmitted from the subscriber device 120*a*-1 passes through the optical SW 130*a*, the dispersion compensator 160-1, and the optical SW 130*a* in this order, and then, the main signal is input to the optical transmission path 150-1 via the wavelength separation filter 380*a* and the wavelength multiplexer/demultiplexer 140*a*-1. The optical signal input from the optical transmission path 150-1 to the optical SW 130*b* via the wavelength multiplexer/demultiplexer 140*b*-1 and the wavelength separation filter 380*a* is output to the subscriber device 120*b*-1.

In step S116, the subscriber device 120*b*-1 transmits the main signal of the wavelength λ1d. The main signal transmitted from the subscriber device 120*b*-1 is input to the optical transmission path 150-1 via the optical SW 130*b*, the wavelength separation filter 380*b* and the wavelength multiplexer/demultiplexer 140*b*-1. The main signal input to the optical SW 130*a* from the optical transmission path 150-1 via the wavelength multiplexer/demultiplexer 140*a*-1 and the wavelength separation filter 380*a* is output to the subscriber device 120*a*-1 via the dispersion compensator 160-1 and the optical SW 130*a*.

The optical signal between the subscriber devices 120 may also pass through a plurality of dispersion compensators 160. For example, in step S107, the selector 174 selects the dispersion compensators 160-1 and 160-2 for the optical signal from the subscriber device 120*a*-1 to the subscriber device 120*b*-1. In this case, in step S108, the port connection determiner 175 determines the port connection relationship of the optical SW 130*a* so that the optical signal transmitted from the subscriber device 120*a*-1 passes through the optical SW 130*a*, the dispersion compensator 160-1, the optical SW 130*a*, the dispersion compensator 160-2 and the optical SW 130*a* in this order as in the first embodiment.

Further, for example, in step S107, the selector 174 selects the dispersion compensators 160-1 and 160-2 for the optical signal from the subscriber device 120*b*-1 to the subscriber device 120*a*-1. The selector 174 determines that the dispersion compensator 160-1 is to be used first, based on a predetermined rule or the order information set in the dispersion compensator information. In this case, in step S108, the port connection determiner 175 determines the port connection relationship in the optical SW 130a so that the optical signal input from the output port 132 connected to the wavelength multiplexer/demultiplexer 140a-1 is output to the input port 131 connected to the dispersion compensator 160-1. Further, the port connection determiner 175 determines the port connection relationship of the optical SW 130a so that the optical signal input from the output port 132 connected to the dispersion compensator 160-1 is output to the input port 131 connected to the dispersion compensator 160-2. Further, the port connection determiner 175 determines the port connection relationship of the optical SW 130a so that the optical signal input from the output port 132 connected to the dispersion compensator 160-2 is output to the input port 131 connected to the subscriber device 120a-1.

In the present embodiment, the dispersion of the optical signal output from the subscriber devices 120a-n and received by the subscriber devices 120b-n and the optical signal output from the subscriber devices 120b-n and received by the subscriber devices 120a-n can be compensated using the same dispersion compensator 160. Although there are such restrictions, the number of ports of the optical SW 130 can be reduced as compared to the second embodiment.

Fourth Embodiment

In the present embodiment, a wavelength multiplexer/demultiplexer is inserted between the optical SW and the dispersion compensator. As a result, the optical communication system of the present embodiment collectively performs dispersion compensation for optical signals of different wavelengths. The present embodiment will be described focusing on differences from the first embodiment.

Figure 6:
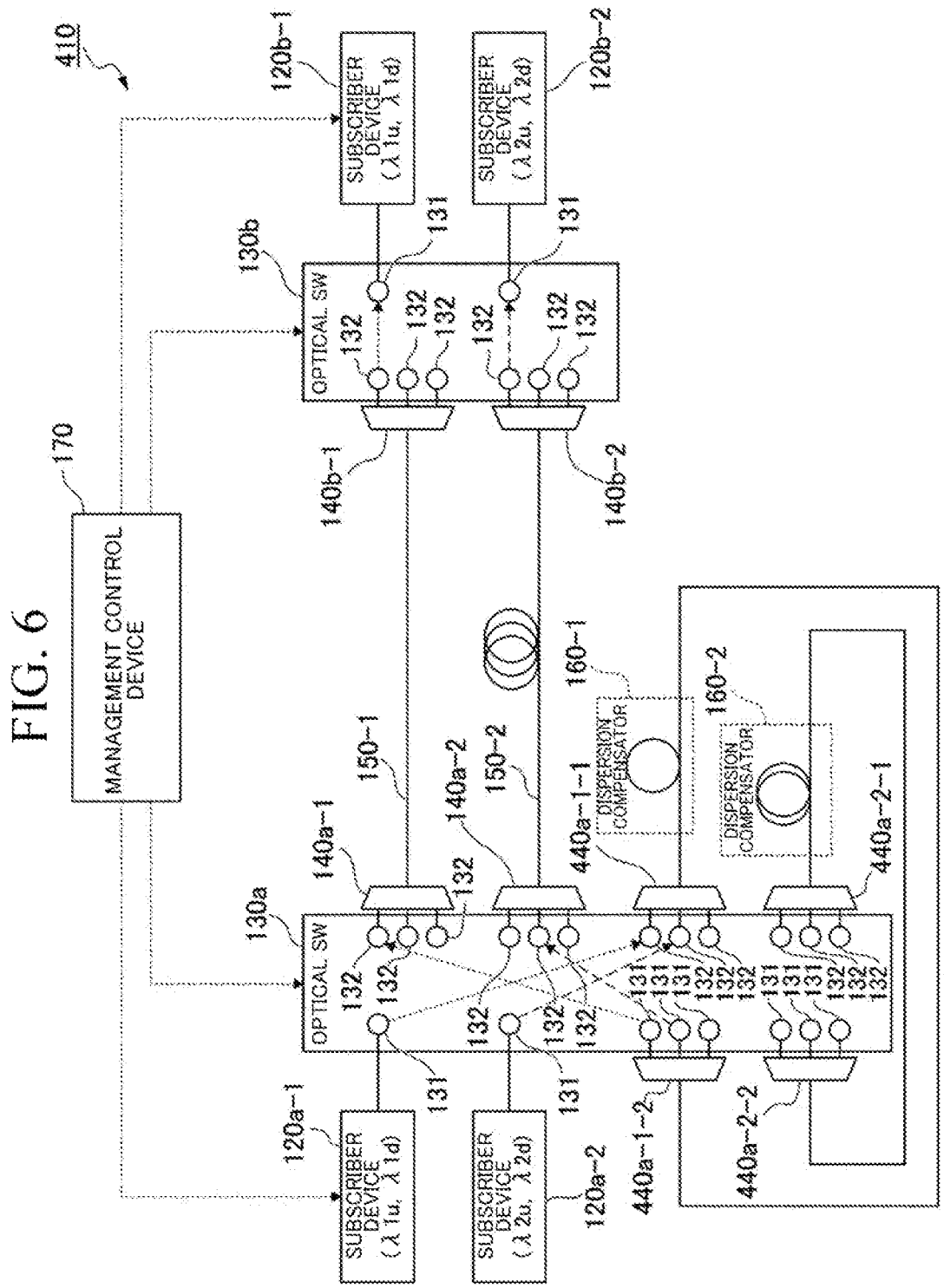
FIG. 6 is a diagram showing the configuration of an optical communication system according to a fourth embodiment.

FIG. 6 is a diagram showing the configuration of an optical communication system 410 according to the fourth embodiment. The optical communication system 410 shown in FIG. 6 is different from the optical communication system 110 of the first embodiment shown in FIG. 1 in that a wavelength multiplexer/demultiplexer 440 is provided between the optical SW 130a and the dispersion compensator 160. Thus, the optical SW 130a is connected to the dispersion compensator 160 via the wavelength multiplexer/demultiplexer 440. A device similar to the wavelength multiplexer/demultiplexer 140 can be used as the wavelength multiplexer/demultiplexer 440. The wavelength multiplexer/demultiplexer 440 connected to a plurality of output ports 132 of the optical SW 130a and the dispersion compensator 160-$k$ ($k$=1, 2 in FIG. 6) is described as a wavelength multiplexer/demultiplexer 440a-$k$-1, and the wavelength multiplexer/demultiplexer 440 connected to the dispersion compensator 160-$k$ and the plurality of input ports 131 of the optical SW 130a is described as a wavelength multiplexer/demultiplexer 440a-$k$-2.

The wavelength multiplexer/demultiplexer 440 has a plurality of first ports (not shown) and one second port (not shown). The plurality of first ports correspond to different wavelengths. The wavelength multiplexer/demultiplexer 440 has a function of multiplexing optical signals of different wavelengths input from the plurality of first ports and outputting the multiplexed optical signals from the second port, and/or a function of demultiplexing the optical signals input from the second port into optical signals of different wavelengths and outputting the demultiplexed optical signals from the separate first ports. The first ports of the wavelength multiplexer/demultiplexer 440a-$k$-1 are respectively connected to different output ports 132 of the optical SW 130a. The second port of the wavelength multiplexer/demultiplexer 440a-$k$-1 is connected to an optical transmission path between the wavelength multiplexer/demultiplexer and the dispersion compensator 160-$k$. The first ports of the wavelength multiplexer/demultiplexer 440a-$k$-2 are respectively connected to different input ports 131 of the optical SW 130a. The second port of the wavelength multiplexer/demultiplexer 440a-$k$-2 is connected to an optical transmission path between the wavelength multiplexer/demultiplexer and the dispersion compensator 160-$k$.

The optical communication system 410 performs the same processing as in the sequence diagram of the optical communication system 110 of the first embodiment shown in FIG. 3, except for the following.

That is, in step S108, the port connection determiner 175 of the management control device 170 determines that the dispersion compensator 160-1 selected in step S107 is connected to the optical SW 130a via the wavelength multiplexer/demultiplexer 440a-1-1 and the wavelength multiplexer/demultiplexer 440a-1-2. The port connection determiner 175 determines the port connection relationship of the optical SW 130a so that the optical signal input from the input port 131 connected to the subscriber device 120a-1 is output to the output port 132 connected to the first port corresponding to the wavelength $\lambda1u$ of the wavelength multiplexer/demultiplexer 440a-1-1. Furthermore, the port connection determiner 175 determines the port connection relationship of the optical SW 130a so that the optical signal input from the input port 131 connected to the first port corresponding to the wavelength $\lambda1u$ of the wavelength multiplexer/demultiplexer 440a-1-2 is output to the output port 132 connected to the first port corresponding to the wavelength $\lambda1u$ of the wavelength multiplexer/demultiplexer 140a-1.

As a result, the optical signal of the wavelength $\lambda1u$ transmitted from the subscriber device 120a-1 passes through the optical SW 130a, the wavelength multiplexer/demultiplexer 440a-1-1, the dispersion compensator 160-1, the wavelength multiplexer/demultiplexer 440a-1-2, and the optical SW 130a in order, and the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

On the other hand, by the same processing as above, it is assumed that the allocator 173 of the management control device 170 allocates the wavelength $\lambda2u$ to the optical signal from the subscriber device 120a-2 to the subscriber device 120b-2, and the selector 174 determines that the dispersion compensator 160-1 is to be used for the optical signal. In this case, the port connection determiner 175 determines the port connection relationship of the optical SW 130a so that the optical signal input from the input port 131 connected to the subscriber device 120a-2 is output to the output port 132 connected to the first port corresponding to the wavelength $\lambda2u$ of the wavelength multiplexer/demultiplexer 440a-1-1.

Further, the port connection determiner 175 determines the port connection relationship of the optical SW 130a so that the optical signal input from the input port 131 connected to the first port corresponding to the wavelength $\lambda2u$ of the wavelength multiplexer/demultiplexer 440a-1-2 is output to the output port 132 connected to the first port corresponding to the wavelength λ2u of the wavelength multiplexer/demultiplexer 140a-2. As a result, the optical signal of the wavelength λ2u transmitted from the subscriber device 120a-2 passes through the optical SW 130a, the wavelength multiplexer/demultiplexer 440a-1-1, the dispersion compensator 160-1, the wavelength multiplexer/demultiplexer 440a-1-2, and the optical SW 130a in order, and the optical signal is input to the optical transmission path 150-2 via the wavelength multiplexer/demultiplexer 140a-2. The optical signal input to the optical SW 130b from the optical transmission path 150-2 via the wavelength multiplexer/demultiplexer 140b-2 is output to the subscriber device 120b-2.

The wavelength multiplexer/demultiplexer 440a-1-1 multiplexes the optical signal of the wavelength λ1u and the optical signal of the wavelength λ2u input from the optical SW 130a, and outputs the multiplexed signal to the dispersion compensator 160-1, and the wavelength multiplexer/demultiplexer 440a-1-2 demultiplexes the optical signal of the wavelength λ1u and the optical signal of the wavelength λ2u from the optical signal dispersion-compensated by the dispersion compensator 160-1, and outputs the optical signals to the optical SW 130a. In this way, the wavelength multiplexer/demultiplexer 440 multiplexes optical signals of a plurality of wavelengths and inputs the multiplexed optical signal to the dispersion compensator 160, whereby the dispersion of optical signals of a plurality of wavelengths can be compensated collectively using the same dispersion compensator 160. Therefore, the number of dispersion compensators 160 can be reduced.

The signal between subscriber devices 120 may also pass through a plurality of dispersion compensators 160. For example, in step S107, the selector 174 selects the dispersion compensators 160-1 and 160-2 for the optical signal from the subscriber device 120a-1 to the subscriber device 120b-1 and determines that the compensator 160-1 is to be used first. In this case, in step S108, the port connection determiner 175 determines the port connection relationship of the optical SW 130a so that the optical signal input from the input port 131 connected to the subscriber device 120a-1 is output to the output port 132 connected to the first port corresponding to the wavelength λ1u of the wavelength multiplexer/demultiplexer 440a-1-1. Furthermore, the port connection determiner 175 selects the optical signal input from the input port 131 connected to the first port corresponding to the wavelength λ1u of the wavelength multiplexer/demultiplexer 440a-1-2 as the wavelength multiplexer/demultiplexer 440a—The port connection relationship of the optical SW 130a is determined so as to output to the output port 132 connected to the first port corresponding to the wavelength λ1u of 2-1. Furthermore, the port connection determiner 175 determines the port connection relationship of the optical SW 130a so that the optical signal input from the input port 131 connected to the first port corresponding to the wavelength λ1u of the wavelength multiplexer/demultiplexer 440a-2-2 is output to the output port 132 connected to the first port corresponding to the wavelength λ1u of the wavelength multiplexer/demultiplexer 140a-1. In this case, the combined dispersion compensation effect of the dispersion compensators 160-1 and 160-2 can be expected. Therefore, when optical signals pass through a plurality of dispersion compensators 160, the number of types of dispersion compensators 160 can be reduced, and the number of dispersion compensators 160 can be further reduced.

Fifth Embodiment

In the first embodiment, the dispersion compensator is used as the quality compensator. In the fifth embodiment, an optical amplifier is used as the quality compensator. The present embodiment will be described focusing on differences from the first embodiment.

Figure 7:
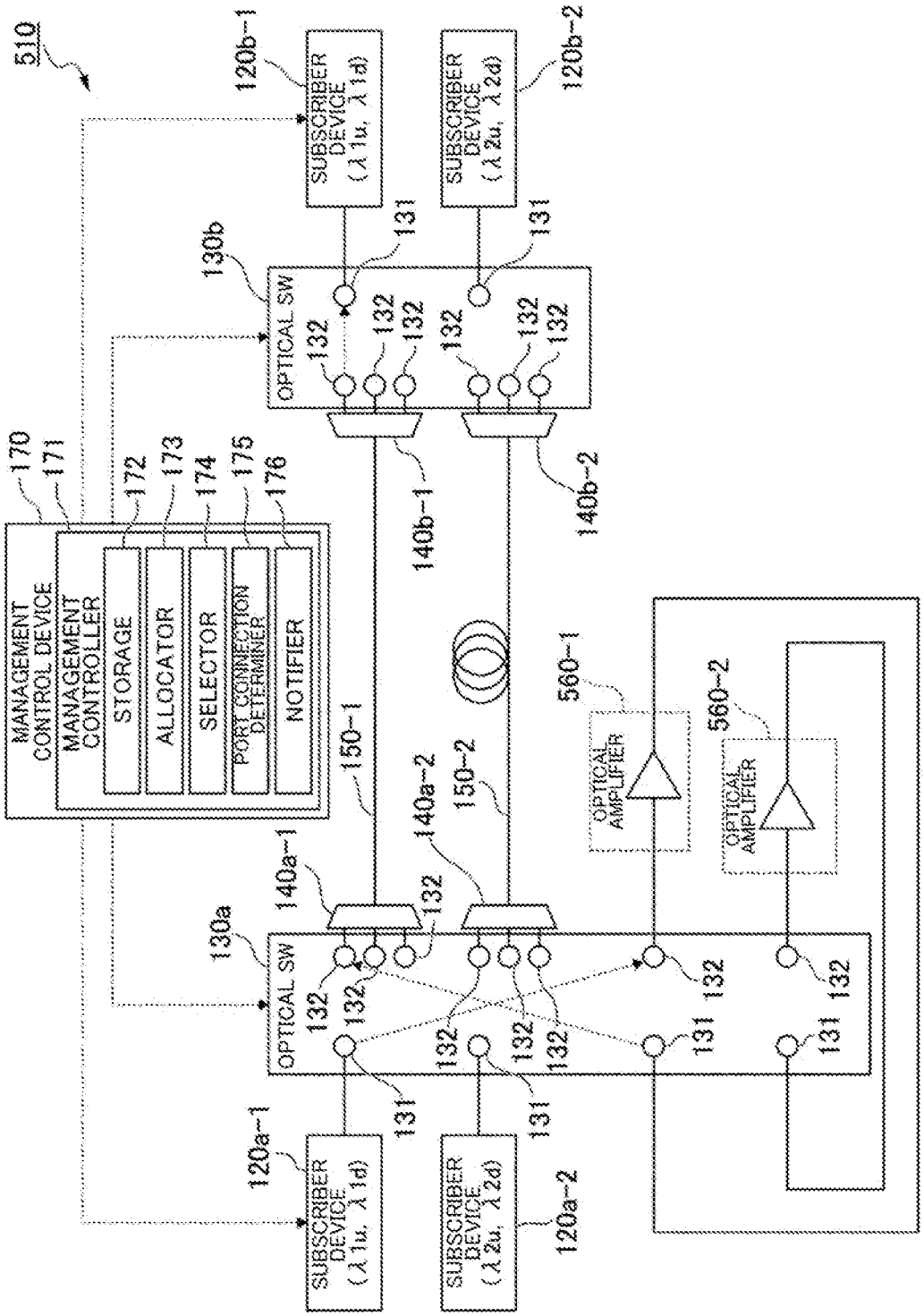
FIG. 7 is a diagram showing the configuration of an optical communication system according to a fifth embodiment.

FIG. 7 is a diagram showing the configuration of an optical communication system 510 according to the fifth embodiment. The optical communication system 510 shown in FIG. 7 is different from the optical communication system 110 shown in FIG. 1 in that an optical amplifier 560 is provided instead of the dispersion compensator 160. K (K is an integer of 1 or more) optical amplifiers 560 are described as optical amplifiers 560-1, . . . , 560-K. FIG. 7 shows the case of K=2 as an example.

The optical amplifier 560 amplifies the optical signal output from the output port 132 of the optical SW 130 and inputs the amplified optical signal to the input port 131 of the optical SW 130. The optical amplifiers 560 have different gains. If K≥3, some of the plurality of optical amplifiers 560 may have the same gain. Thus, the K optical amplifiers 560 have a plurality of types of gain.

Note that one optical signal may be amplified by a plurality of optical amplifiers 560. For example, the optical SW 130a outputs an optical signal from the output port 132 connected to the optical amplifier 560-1. The optical amplifier 560-1 amplifies the optical signal output from the optical SW 130a and inputs the amplified optical signal to the input port 131 of the optical SW 130a. Subsequently, the optical SW 130a outputs the optical signal input from the input port 131 connected to the optical amplifier 560-1 from the output port 132 connected to the optical amplifier 560-2. The optical amplifier 560-2 amplifies the optical signal output from the optical SW 130a and inputs the amplified optical signal to the input port 131 of the optical SW 130a. In this case, it is possible to expect the combined amplification effect of the optical amplifiers 560-1 and 560-2. Therefore, the number of types of optical amplifiers 560 can be reduced, and the number of optical amplifiers 560 can be reduced.

FIG. 8 is a diagram showing an example of a second parameter table of the present embodiment. The storage 172 of the management control device 170 stores a second parameter table shown in FIG. 8 instead of the first parameter table shown in FIG. 2. The second parameter table is information in which a number, an optical output subscriber device, an optical input subscriber device, an optical transmission path, a wavelength, a transmission loss, an optical device loss, a cumulative loss, a modulation method, a baud rate, a minimum reception sensitivity, a transmission light intensity, a maximum allowable loss and optical amplifier information are associated with each other. The optical transmission path, wavelength, transmission loss, optical device loss and cumulative loss are resource information. The transmission loss represents the transmission loss of the optical transmission path 150, and the optical device loss represents the loss of the optical SW 130 and the wavelength multiplexer/demultiplexer 140. The cumulative loss is the sum of transmission loss and optical device loss. The optical amplifier information indicates available optical amplifiers 560. In this way, the management controller 171 grasps the items from the optical output subscriber device to the maximum allowable loss, and selects the optical amplifier 560 based on the search condition indicated by the optical output subscriber device, the optical input subscriber device, the used resource information, and the signal parameter information. The number of selected optical amplifiers 560 may be one, or two or more.

An example of selection of the optical amplifier 560 is shown. In the currently commonly used transmission optical fibers, a communication wavelength in the 1550 nm band has a transmission loss of approximately 0.25 dB/km. Therefore, the transmission loss is 25 dB when the transmission distance is 100 km. Assume that the optical loss of the AWG used as the wavelength multiplexer/demultiplexer 140 is 3 dB, and the loss of the optical SW 130 is 5 dB (see Reference 2, for example). In this case, the optical device loss through two AWGs and two optical SWs 130 is 16 dB. Therefore, the total cumulative loss of transmission loss and optical device loss is 41 dB. Further, the reception sensitivity for obtaining a desired bit error rate differs depending on the modulation method, baud rate, and configuration of the receiver. When the transmission light intensity is different, the maximum allowable loss for obtaining the desired reception sensitivity is different. For example, when signals with a modulation method of NRZ 10 Gbps are received by IMDD (Intensity-modulation and Direct-detection), the minimum reception sensitivity is −16 dBm with a bit error rate of $10^{-3}$. The maximum allowable loss for a signal with a transmission light intensity of +4 dBm is about 20 dB. In this case, an optical amplifier 560 that can reduce the cumulative loss from 41 dB to 20 dB or less, that is, has a gain of 21 dB or more, should be selected. The selected optical amplifier 560 is set in the second parameter table.

(Reference 2) Yuko Kawajiri, Naru Nemoto, Koichi Hadama, Yuzo Ishii, Mitsuhiro Makihara, Joji Yamaguchi, Tsuyoshi Yamamoto, "512×512 Port 3D MEMS Optical Switch Module with Toroidal Concave Mirror", NTT Technical Review, Vol. 10, No. 11, November 2012.

Figure 9:
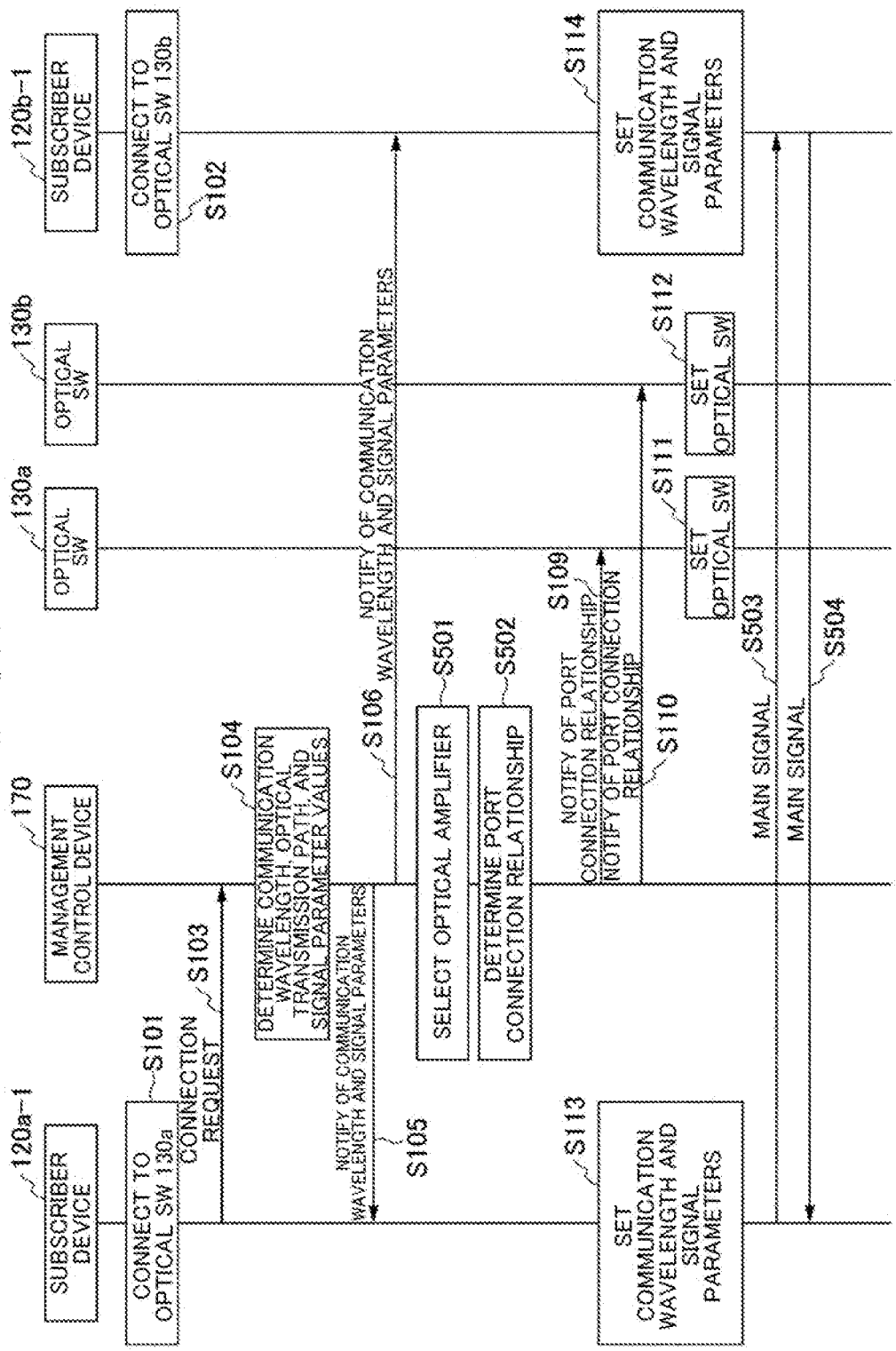
FIG. 9 is a sequence diagram showing the operation of the optical communication system according to the embodiment.

FIG. 9 is a sequence diagram showing operations up to main signal conduction in the optical communication system 510. Here, an example is shown in which the subscriber device 120a-1 communicates with the subscriber device 120b-1. In FIG. 9, the same reference numerals are assigned to the same processes as in the optical communication system 110 according to the first embodiment shown in FIG. 3.

The optical communication system 510 performs the same processing as steps S101 to S106 in FIG. 3. The selector 174 of the management control device 170 reads the optical amplifier information from the second parameter table stored in the storage 172 using the same search condition as in step S107 of the first embodiment for the optical signal from the subscriber device 120a-1 to the subscriber device 120b-1. The selector 174 selects the optical amplifier 560-1 to be used for the optical signal from the subscriber device 120a-1 to the subscriber device 120b-1 among the optical amplifiers 560 indicated by the optical amplifier information (step S501). Further, the selector 174 selects the optical amplifier 560 to be used for the optical signal from the subscriber device 120b-1 to the subscriber device 120a-1.

The port connection determiner 175 determines the port connection relationship for connecting the input port 131 and the output port 132 so that the optical path between the subscriber device 120a-1 and the subscriber device 120b-1 passes through the optical amplifier 560 selected by the selector 174 (step S502).

Specifically, the port connection determiner 175 determines the port connection relationship of the optical SW 130a so that the optical signal input from the input port 131 connected to the subscriber device 120a-1 is output to the output port 132 connected to the optical amplifier 560-1. Further, the port connection determiner 175 determines the port connection relationship of the optical SW 130a so that the optical signal input from the input port 131 connected to the optical amplifier 560-1 is output to the output port 132 connected to the first port corresponding to the wavelength λ1u of the wavelength multiplexer/demultiplexer 140a-1. In addition, for the optical SW 130b, the port connection determiner 175 determines the port connection relationship so that the optical signal input from the output port 132 connected to the first port corresponding to the wavelength λ1u of the wavelength multiplexer/demultiplexer 140b-1 is output to the input port 131 connected to the subscriber device 120b-1. The optical communication system 510 performs the processing of steps S109 to S114 in FIG. 3.

The subscriber device 120a-1 transmits a main signal of the wavelength λ1u. The optical SW 130a and the optical SW 130b relay the main signal transmitted from the subscriber device 120a-1 according to the set port connection relationship. The subscriber device 120b-1 receives the main signal transmitted from the subscriber device 120a-1 (step 3503). Similarly, the subscriber device 120b-1 transmits a main signal of the wavelength λ1d. The optical SW 130b and the optical SW 130a relay the main signal according to the set port connection relationship. The subscriber device 120a-1 receives the main signal transmitted from the subscriber device 120b-1 (step S504).

As described above, the optical signal transmitted from the subscriber device 120a-1 passes through the optical SW 130a, the optical amplifier 560-1, and the optical SW 130a in order, and then, the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

Further, the optical communication system 110 performs the same processing as described above between the subscriber device 120a-2 and the subscriber device 120b-2. As a result, the optical signal transmitted from the subscriber device 120a-2 passes through the optical SW 130a, the optical amplifier 560-2, and the optical SW 130a in order, and then, the optical signal is input to the optical transmission path 150-2 via the wavelength multiplexer/demultiplexer 140a-2. The optical signal input from the optical transmission path 150-2 to the optical SW 130b via the wavelength multiplexer/demultiplexer 140b-2 is output to the subscriber device 120b-2.

Further, the optical signal between the subscriber devices 120 may pass through a plurality of optical amplifiers 560. In this case, the combination of optical amplifiers 560 to be used is set in the dispersion compensator information of the second parameter table. Thus, for example, in step S501, the selector 174 selects the optical amplifier 560-1 and the optical amplifier 560-2 for the optical signal from the subscriber device 120a-1 to the subscriber device 120b-1. The selector 174 determines the order in which the selected optical amplifiers 560-1 and 560-2 are used according to a predetermined rule. Alternatively, the dispersion compensator information may include information on the order in which the optical amplifiers 560-1 and 560-2 are used. Here, the selector 174 determines that the optical amplifier 560-1 is to be used first.

In this case, in step S502, the port connection determiner 175 determines the port connection of the optical SW 130a so that the optical signal input from the input port 131 connected to the subscriber device 120a-1 is output to the output port 132 connected to the optical amplifier 560-1. Further, the port connection determiner 175 determines the port connection of the optical SW 130a so that the optical signal input from the input port 131 connected to the optical amplifier 560-1 is output to the output port 132 connected to the optical amplifier 560-2. Furthermore, the port connection determiner 175 determines the port connection relationship of the optical SW 130a so that the optical signal input from the input port 131 connected to the optical amplifier 560-2 is output to the output port 132 connected to the first port corresponding to the wavelength λ1u of the wavelength multiplexer/demultiplexer 140a-1.

As described above, the optical communication system 510 can select the optical amplifier 560 through which the optical signal passes. The optical communication system 510 may connect the input port 131 and the output port 132 of the optical SW 130a so as not to pass through the optical amplifier 560 depending on the state of the optical transmission path 150 and the signal parameter value.

The sequence of the present embodiment shown in FIG. 9 corresponds to the conventional sequence shown in FIG. 34 in which a process (step S501) of the selector 174 selecting the optical amplifier 560 is added before the management control device 170 notifies the optical SW 130 of the port connection relationship and the process of step S502 is performed instead of the process of step S907. The process of step S501 is executed with reference to the second parameter table shown in FIG. 8. Further, the optical communication system 510 may perform an operation in which the process of step S501 is added before the port connection relationship determination process (step S907) in the conventional sequence shown in FIGS. 35 and 36. The port connection determiner 175 performs the process of step S502 of determining the port connection relationship in the optical SW 130 connected to the selected optical amplifier 560 so as to pass through the optical amplifier 560 instead of the process of step S908.

The optical communication system 510 of the present embodiment selects the optical amplifier 560 according to the cumulative loss and an allowable loss in the optical path through which the optical signal is transmitted, controls the optical path in the optical SW 130 so as to pass through the selected optical amplifier 560. Thus, even in an optical communication system in which a plurality of types of optical transmission path states and signal parameter values can be selected, appropriate optical amplification can be performed to obtain desired reception sensitivity.

Sixth Embodiment

In the present embodiment, a wavelength multiplexer/demultiplexer is inserted between the optical SW and the optical amplifier. As a result, the optical communication system of the present embodiment collectively amplifies optical signals of different wavelengths. The present embodiment will be described focusing on differences from the above-described embodiments.

Figure 10:
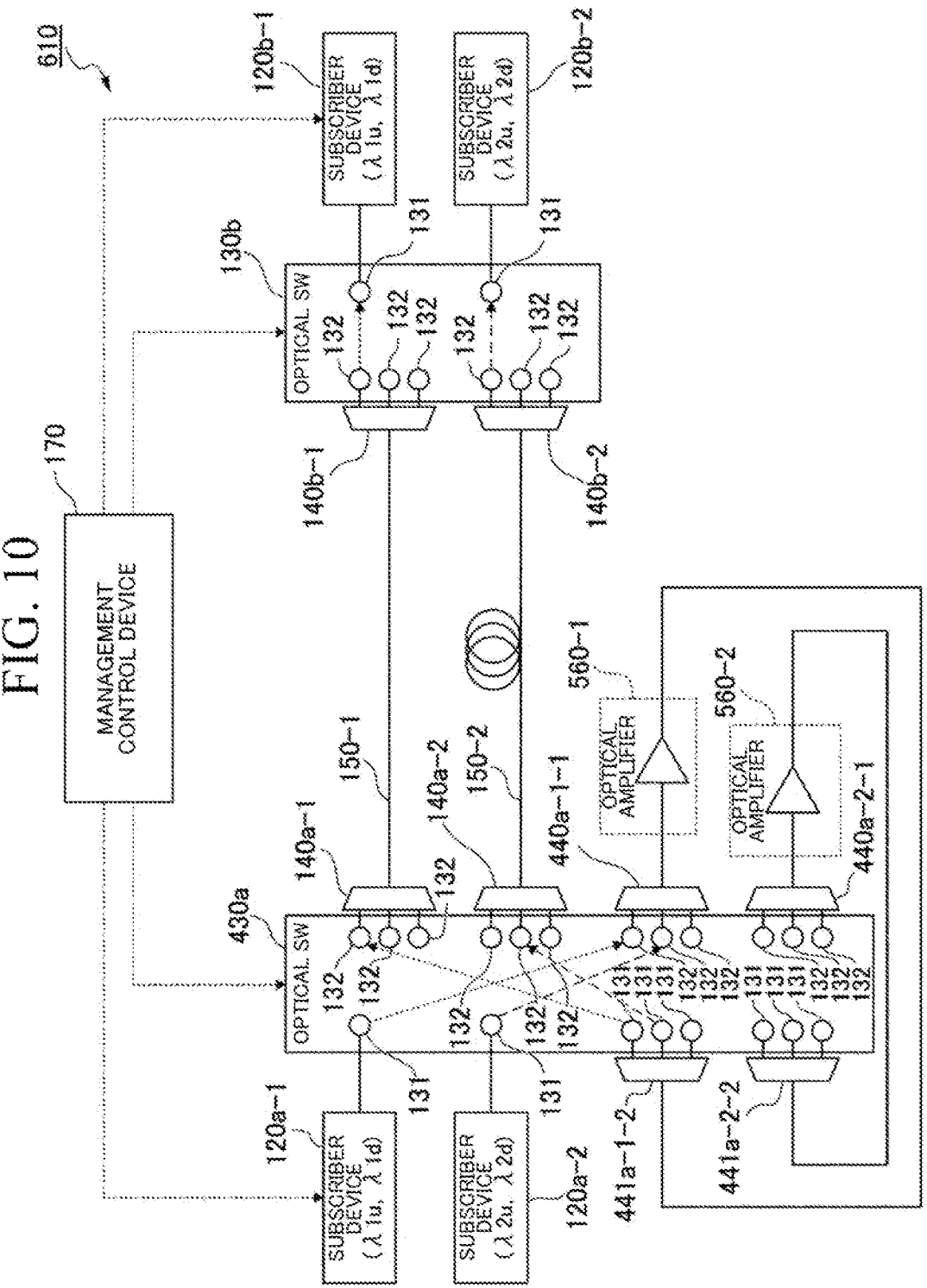
FIG. 10 is a diagram showing the configuration of an optical communication system according to a sixth embodiment.

FIG. 10 is a diagram showing the configuration of an optical communication system 610 according to the sixth embodiment. The optical communication system 610 shown in FIG. 10 is different from the optical communication system 410 of the fourth embodiment shown in FIG. 6 in that an optical amplifier 560 is provided in place of the dispersion compensator 160, and a storage 172 of the management control device 170 stores the second parameter table of the fifth embodiment shown in FIG. 8. The optical SW 130a of the present embodiment is connected to the optical amplifier 560 via the wavelength multiplexer/demultiplexer 440. The optical amplifier 560 connected to the wavelength multiplexer/demultiplexers 440a-k-1 and 440a-k-2 is described as an optical amplifier 560-k.

The optical communication system 610 performs the same processing as in the sequence diagram of the optical communication system 510 of the fifth embodiment shown in FIG. 9, except for the following.

That is, in step S502, the port connection determiner 175 of the management control device 170 determines that the optical amplifier 560-1 selected in step S501 is connected to the optical SW 130a via the wavelength multiplexer/demultiplexer 440a-1-1 and the wavelength multiplexer/demultiplexer 440a-1-2. The port connection determiner 175 determines the port connection relationship of the optical SW 130a so that the optical signal input from the input port 131 connected to the subscriber device 120a-1 is output to the output port 132 connected to the first port corresponding to the wavelength λ1u of the wavelength multiplexer/demultiplexer 440a-1-1. Furthermore, the port connection determiner 175 determines the port connection relationship of the optical SW 130a so that the optical signal input from the input port 131 connected to the first port corresponding to the wavelength λ1u of the wavelength multiplexer/demultiplexer 440a-1-2 is output to the output port 132 connected to the first port corresponding to the wavelength λ1u of the wavelength multiplexer/demultiplexer 140a-1.

As a result, the optical signal of the wavelength λ1u transmitted from the subscriber device 120a-1 passes through the optical SW 130a, the wavelength multiplexer/demultiplexer 440a-1-1, the optical amplifier 560-1, the wavelength multiplexer/demultiplexer 440a-1-2, and the optical SW 130a in order, and the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

On the other hand, by the same processing as above, it is assumed that the allocator 173 of the management control device 170 allocates the wavelength λ2u to the optical signal from the subscriber device 120a-2 to the subscriber device 120b-2, and the selector 174 determines that the optical amplifier 560-1 is to be used for the optical signal. In this case, the port connection determiner 175 determines the port connection relationship of the optical SW 130a so that the optical signal input from the input port 131 connected to the subscriber device 120a-2 is output to the output port 132 connected to the first port corresponding to the wavelength λ2u of the wavelength multiplexer/demultiplexer 440a-1-1. Further, the port connection determiner 175 determines the port connection relationship of the optical SW 130a so that the optical signal input from the input port 131 connected to the first port corresponding to the wavelength λ2u of the wavelength multiplexer/demultiplexer 440a-1-2 is output to the output port 132 connected to the first port corresponding to the wavelength λ2u of the wavelength multiplexer/demultiplexer 140a-2. As a result, the optical signal of the wavelength λ2u transmitted from the subscriber device 120a-2 passes through the optical SW 130a, the wavelength multiplexer/demultiplexer 440a-1-1, the optical amplifier 560-1, the wavelength multiplexer/demultiplexer 440a-1-2, and the optical SW 130a in order, and the optical signal is input to the optical transmission path 150-2 via the wavelength multiplexer/demultiplexer 140a-2. The optical signal input to the optical SW 130b from the optical transmission path 150-2 via the wavelength multiplexer/demultiplexer 140b-2 is output to the subscriber device 120b-2.

The wavelength multiplexer/demultiplexer 440a-1-1 multiplexes the optical signal of the wavelength λ1u and the optical signal of the wavelength λ2u input from the optical SW 130*a*, and outputs the optical signal to the optical amplifier 560-1, and the wavelength multiplexer/demultiplexer 440*a*-1-2 demultiplexes the optical signal of the wavelength λ1u and the optical signal of the wavelength λ2u from the optical signal dispersion-compensated by the optical amplifier 560-1, and outputs the optical signal to the optical SW 130*a*. In this way, the wavelength multiplexer/demultiplexer 440 multiplexes optical signals of a plurality of wavelengths and inputs the multiplexed optical signals to the optical amplifier 560, whereby optical signals of a plurality of wavelengths can be amplified collectively using the same optical amplifier 560. Therefore, the number of optical amplifiers 560 can be reduced.

The signal between the subscriber devices 120 may also pass through a plurality of optical amplifiers 560. For example, in step S501, the selector 174 selects the optical amplifier 560-1 and the optical amplifier 560-2 for the optical signal from the subscriber device 120*a*-1 to the subscriber device 120*b*-1, and determines that the optical amplifier 560-1 is to be used first. In this case, in step S502, the port connection determiner 175 determines the port connection relationship of the optical SW 130*a* as in the case of the fourth embodiment in which the dispersion compensator 160-1 and the dispersion compensator 160-2 are selected for the optical signal from the subscriber device 120*a*-1 to the subscriber device 120*b*-1. When optical signals pass through a plurality of optical amplifiers 560 in this way, the number of types of optical amplifiers 560 can be reduced, and the number of optical amplifiers 560 can be further reduced.

Seventh Embodiment

The optical communication system of the present embodiment has a plurality of dispersion compensators with different amounts of dispersion and a plurality of optical amplifiers with different gains. The present embodiment will be described focusing on differences from the above-described embodiments.

Figure 11:
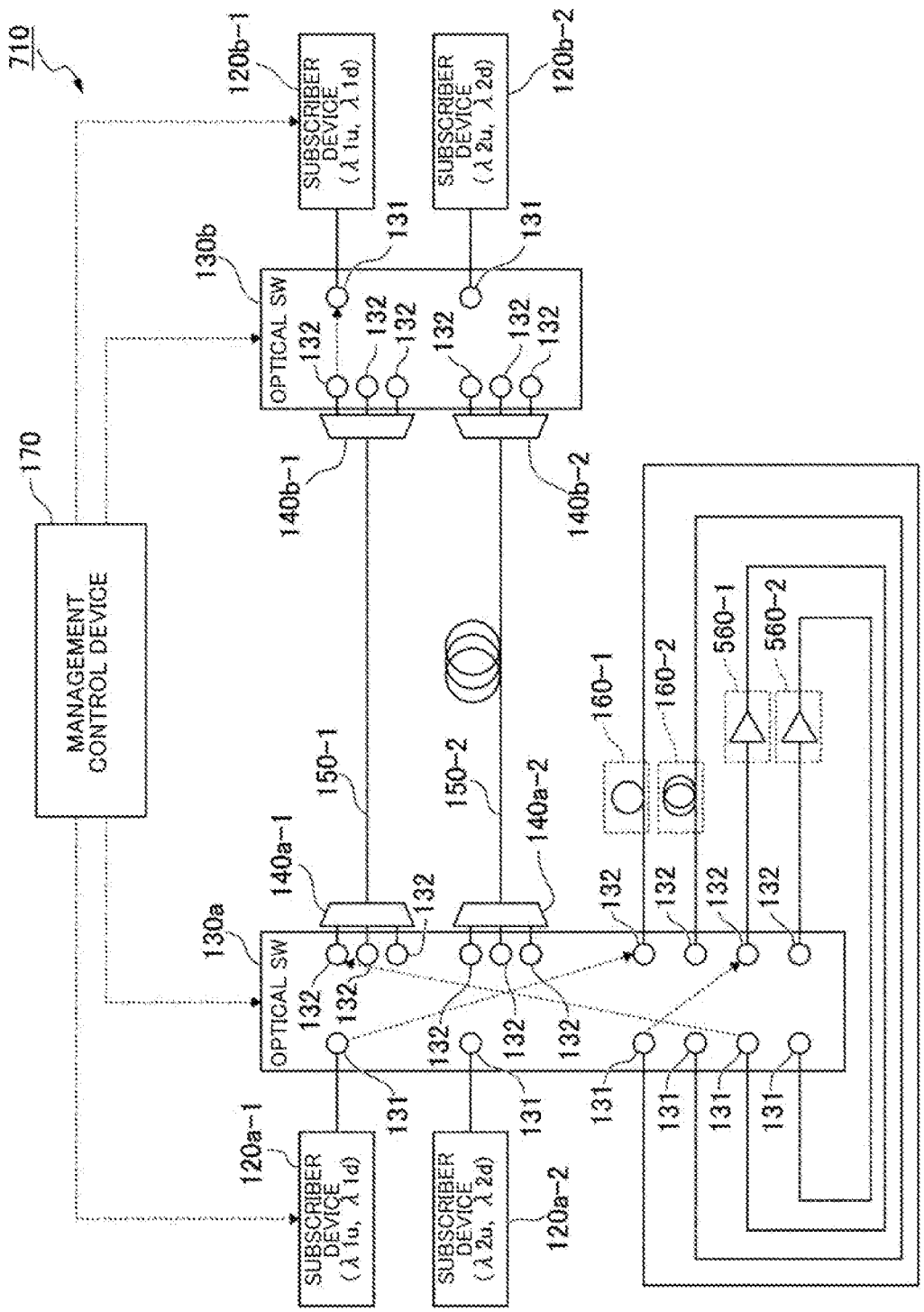
FIG. 11 is a diagram showing the configuration of an optical communication system according to a seventh embodiment.

FIG. 11 is a diagram showing the configuration of an optical communication system 710 according to the seventh embodiment. The optical communication system 710 shown in FIG. 11 is different from the optical communication system 110 shown in FIG. 1 in that it further includes the optical amplifier 560 of the fifth embodiment shown in FIG. 7. Some of the input ports 131 and some of the output ports 132 of the optical SW 130*a* are connected to the optical amplifiers 560-1 to 560-K via an optical transmission path. FIG. 11 shows the case of K=2 as an example.

The storage 172 of the management control device 170 stores the first parameter table shown in FIG. 2 and the second parameter table shown in FIG. 8. The storage 172 may store a parameter table obtained by integrating the first parameter table shown in FIG. 2 and the second parameter table shown in FIG. 8.

Figure 12:
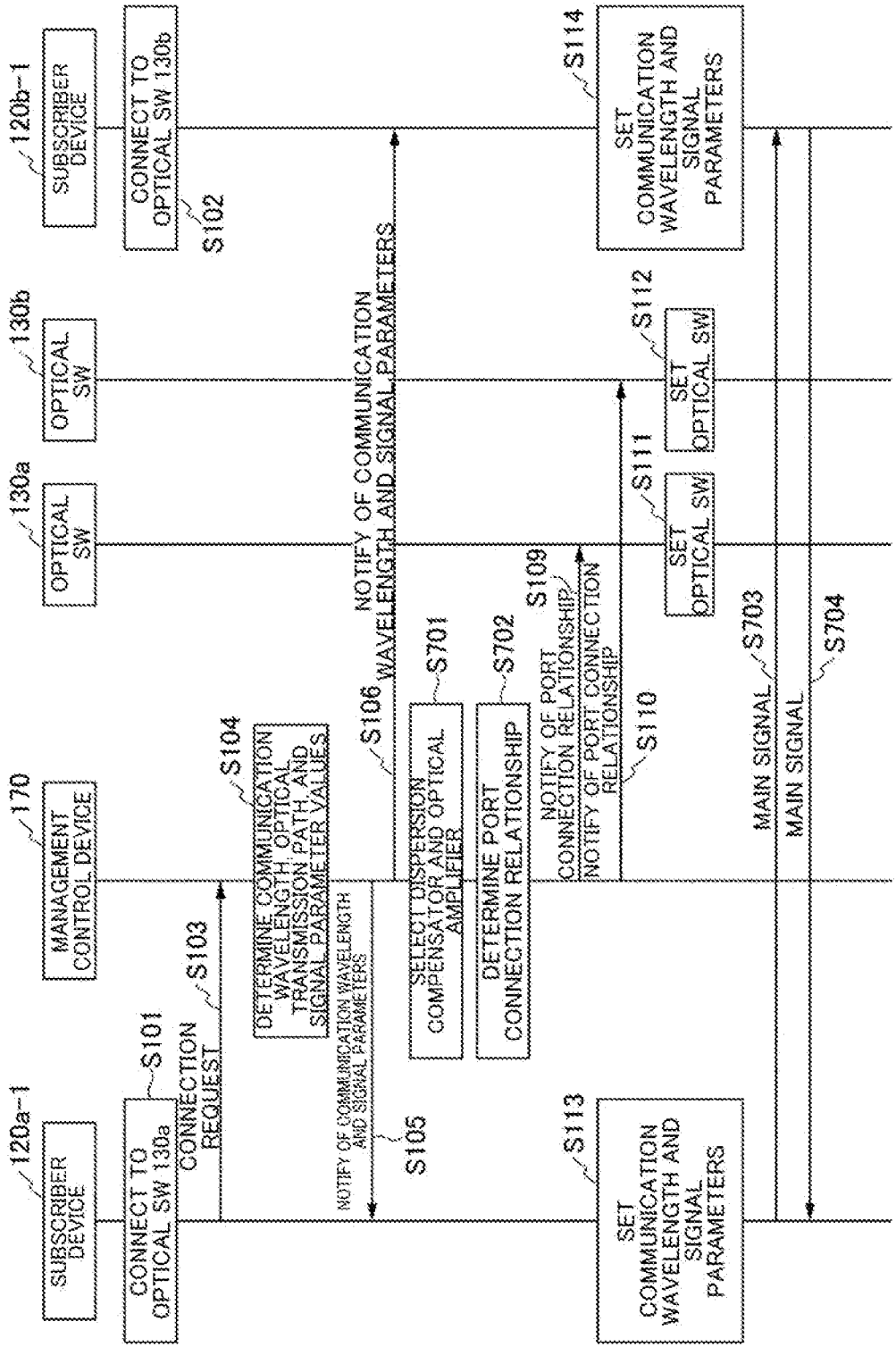
FIG. 12 is a sequence diagram showing the operation of the optical communication system according to the embodiment.

FIG. 12 is a sequence diagram showing operations up to main signal conduction in the optical communication system 710. Here, an example is shown in which the subscriber device 120*a*-1 communicates with the subscriber device 120*b*-1. In FIG. 12, the same reference numerals are assigned to the same processes as in the optical communication system 110 according to the first embodiment shown in FIG. 3.

The optical communication system 710 performs the same processing as steps S101 to S106 in FIG. 3. The selector 174 of the management control device 170 determines the dispersion compensator 160-1 to be used for the optical signal from the subscriber device 120*a*-1 to the subscriber device 120*b*-1, as in step S107 of the first embodiment. Further, the selector 174 selects the optical amplifier 560-1 to be used for the optical signal from the subscriber device 120*a*-1 to the subscriber device 120*b*-1 as in step S501 of the fifth embodiment shown in FIG. 9 (step S701).

The port connection determiner 175 determines the port connection relationship for connecting the input port 131 and the output port 132 so that the optical path between the subscriber device 120*a*-1 and the subscriber device 120*b*-1 passes through the dispersion compensator 160-1 and the optical amplifier 560-1 selected by the selector 174 (step S702).

Specifically, the port connection determiner 175 determines the port connection relationship of the optical SW 130*a* as follows. The port connection determiner 175 determines the port connection relationship so that the optical signal input from the input port 131 connected to the subscriber device 120*a*-1 is output to the output port 132 connected to the dispersion compensator 160-1. Further, the port connection determiner 175 determines the port connection relationship so that the optical signal input from the input port 131 connected to the dispersion compensator 160-1 is output to the output port 132 connected to the optical amplifier 560-1. Further, the port connection determiner 175 determines the port connection relationship so that the optical signal input from the input port 131 connected to the optical amplifier 560-1 is output to the output port 132 connected to the first port corresponding to the wavelength λ1u of the wavelength multiplexer/demultiplexer 140*a*-*l*. The optical communication system 710 performs the processes of steps S109 to S114 in FIG. 3.

The subscriber device 120*a*-1 transmits a main signal of the wavelength λ1u. The optical SW 130*a* and the optical SW 130*b* relay the main signal transmitted from the subscriber device 120*a*-1 according to the set port connection relationship. The subscriber device 120*b*-1 receives the main signal transmitted from the subscriber device 120*a*-1 (step S703). Similarly, the subscriber device 120*b*-1 transmits a main signal of the wavelength λ1d. The optical SW 130*b* and the optical SW 130*a* relay the main signal according to the set port connection relationship. The subscriber device 120*a*-1 receives the main signal transmitted from the subscriber device 120*b*-1 (step S704).

In step S703, the optical signal transmitted from the subscriber device 120*a*-1 passes through the optical SW 130*a*, the dispersion compensator 160-1, the optical SW 130*a*, the optical amplifier 560-1, and the optical SW 130*a* in order, and then, the optical signal is input to the optical transmission path 150-1 via the wavelength multiplexer/demultiplexer 140*a*-1. The optical signal input from the optical transmission path 150-1 to the optical SW 130*b* via the wavelength multiplexer/demultiplexer 140*b*-1 is output to the subscriber device 120*b*-1.

The signal between the subscriber devices 120 may pass through a plurality of dispersion compensators 160 and may pass through a plurality of optical amplifiers 560. The port connection determiner 175 determines the port connection relationship of the optical SW 130 so as to pass through one or more dispersion compensators 160 and one or more optical amplifiers 560 selected by the selector 174, as in the above-described embodiment.

As described above, the optical communication system 810 can select the dispersion compensator 160 and the optical amplifier 560 through which the optical signal passes. Depending on the state of the optical transmission path and signal parameter values, the optical communication system 810 may connect the input port and the output port of the optical SW 130*a* so as not to pass through one or both of the dispersion compensator 160 and the optical amplifier 560. As shown in FIG. 6 or 10, the optical communication system 810 may insert a wavelength multiplexer/demultiplexer 440*a*-*k*-1 and a wavelength multiplexer/demultiplexer 440*a*-*k*-2 between the optical SW 130*a* and the dispersion compensator 160-*k*, and may insert the wavelength multiplexer/demultiplexer 440*a*-*k*-1 and the wavelength multiplexer/demultiplexer 440*a*-*k*-2 between the optical SW 130*a* and the optical amplifier 560-K.

The sequence of the present embodiment shown in FIG. 12 corresponds to the sequence of the conventional sequence shown in FIG. 34 in which the process (step S701) of the selector 174 selecting the dispersion compensator 160 and the optical amplifier 560 before the management control device 170 notifies the optical SW 130 of the port connection relationship, and the process of step 3702 is performed instead of the processing of step S907. Similarly, the optical communication system 710 may perform an operation in which the process of step S701 is added before the port connection relationship determination process (step S907) in the conventional sequence shown in FIGS. 35 and 36. The port connection determiner 175 performs the process of step S702 instead of the process of step S908.

Eighth Embodiment

The optical communication system of the present embodiment has a plurality of quality compensators each including a dispersion compensator and an optical amplifier. The present embodiment will be described focusing on differences from the above-described embodiments.

Figure 13:
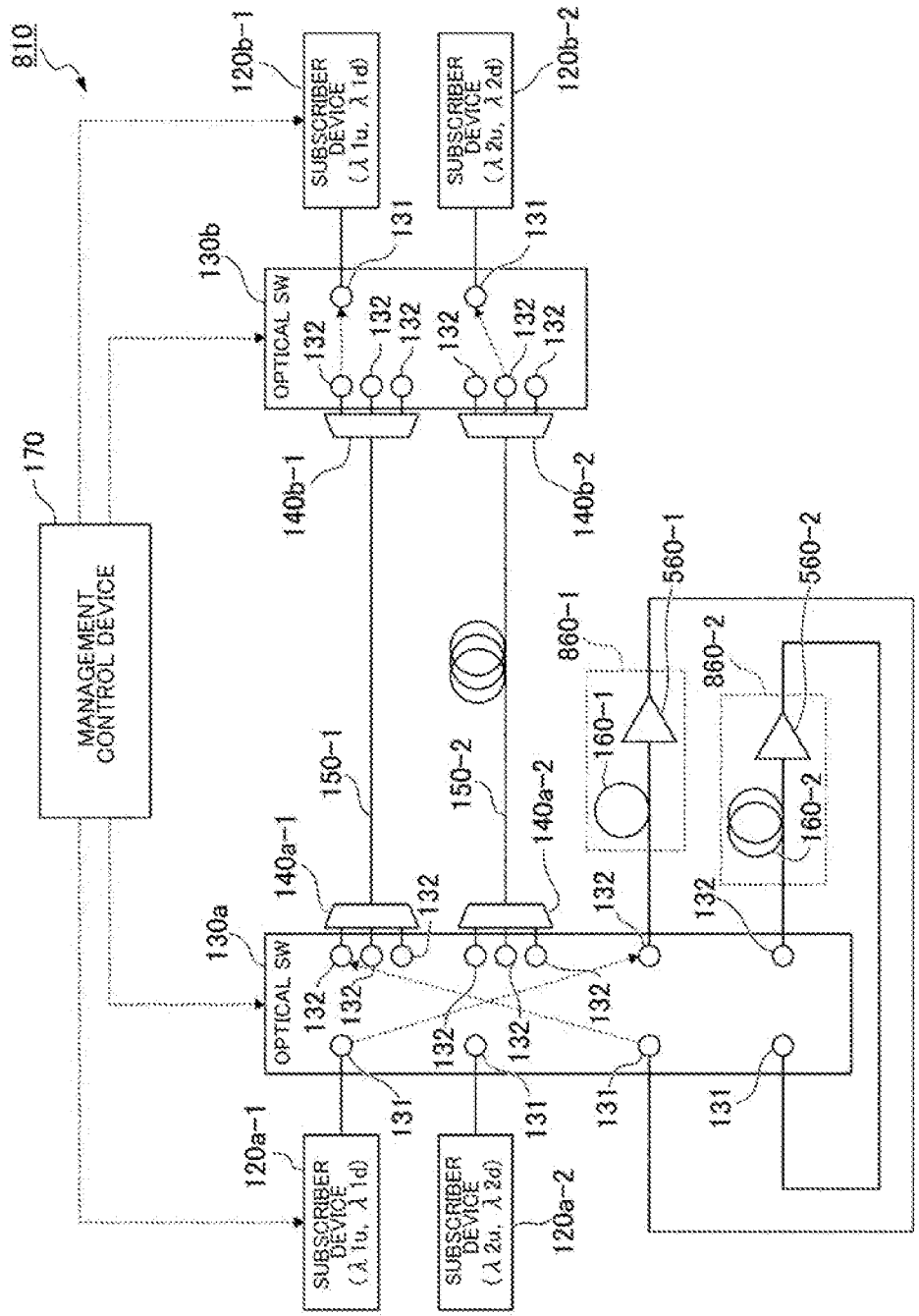
FIG. 13 is a diagram showing the configuration of an optical communication system according to an eighth embodiment.

FIG. 13 is a diagram showing the configuration of an optical communication system 810 according to the eighth embodiment. The optical communication system 810 shown in FIG. 13 is different from the optical communication system 110 shown in FIG. 1 in that a quality compensator 860 is provided instead of the dispersion compensator 160. K quality compensators 860 are described as quality compensators 860-1, . . . , 860-K. The quality compensator 860-*k* has a dispersion compensator 160-*k* and an optical amplifier 560-*k*. Some of the input ports 131 and some of the output ports 132 of the optical SW 130*a* are connected to the quality compensator 860 via an optical transmission path. FIG. 13 shows the case of K=2 as an example.

In addition, the storage 172 of the management control device 170 stores a parameter table obtained by integrating the first parameter table shown in FIG. 2 and the second parameter table shown in FIG. 8 using, as key information, common items such as an optical output subscriber device, an optical input subscriber device, an optical transmission path, a modulation method, and a baud rate. This parameter table includes quality compensator information instead of dispersion compensator information and optical amplifier information. The quality compensator information indicates available quality compensators 860. The selector 174 reads the quality compensator information that matches the search condition from the parameter table, and selects the quality compensator 860 to be used from the quality compensator information. The number of quality compensators 860 to be selected may be one, or two or more.

The operation of the optical communication system 810 is similar to the operation of the optical communication system 710 of the seventh embodiment shown in FIG. 12. However, in step S701, the selector 174 of the management control device 170 selects the quality compensator 860-1 to be used for the optical signal from the subscriber device 120*a*-1 to the subscriber device 120*b*-1.

In step S702, the port connection determiner 175 determines the port connection relationship for connecting the input port 131 and the output port 132 so that the optical path between the subscriber device 120*a*-1 and the subscriber device 120*b*-1 passes through the quality compensator 860-1 selected by the selector 174.

Specifically, the port connection determiner 175 determines the port connection relationship of the optical SW 130*a* so that the optical signal input from the input port 131 connected to the subscriber device 120*a*-1 is output to the output port 132 connected to quality compensator 860-1. Further, the port connection determiner 175 determines the port connection relationship of the optical SW 130*a* so that the optical signal input from the input port 131 connected to the quality compensator 860-1 is output to the output port 132 connected to the first port corresponding to the wavelength λ1u of the wavelength multiplexer/demultiplexer 140*a*-1.

As a result, the main signal of the wavelength λ1u transmitted from the subscriber device 120*a*-1 passes through the optical SW 130*a*, the quality compensator 860-1, and the optical SW 130*a* in this order, and then, the main signal is input to the optical transmission path 150-1 via the wavelength multiplexer/demultiplexer 140*a*-1. The optical signal input from the optical transmission path 150-1 to the optical SW 130*b* via the wavelength multiplexer/demultiplexer 140*b*-1 is output to the subscriber device 120*b*-1.

The signal between the subscriber devices 120 may pass through a plurality of quality compensators 860. The port connection determiner 175 determines the port connection relationship of the optical SW 130 in the same manner as in the above-described embodiment, so as to pass through one or more quality compensators 860 selected by the selector 174.

In the present embodiment, the dispersion compensator 160 and the optical amplifier 560 are combined to form a quality compensator 860. When a plurality of the subscriber devices 120 use the same signal parameters and pass through the same optical transmission path 150, the cumulative chromatic dispersion and cumulative loss may be determined according to the fiber length of the optical transmission path 150. Therefore, the present configuration can be achieved.

Ninth Embodiment

Figure 37:
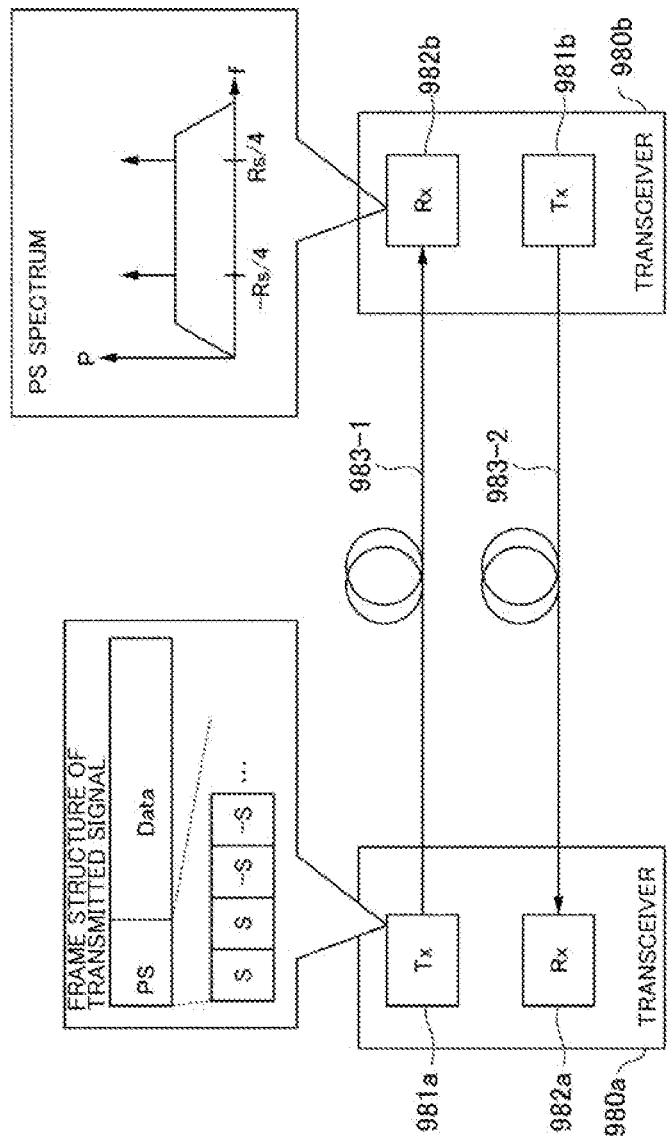
FIG. 37 is a diagram showing a conventional distance-adaptive optical transmission system.

In an APN that provides an end-to-end optical path, it is assumed that the subscriber device of the communication counterpart will change dynamically. To compensate for cumulative chromatic dispersion, it is necessary to measure the distance between opposing subscriber devices. As a conventional method, as in the conventional technique shown in FIG. 37, a method is known in which the subscriber device on the transmitting side creates a signal frame containing data and PS, and the subscriber device on the receiving side calculates the delay time difference between the PS spectra to estimate the value of chromatic dispersion. However, since it is required to insert PS into the signal, the throughput of the main signal decreases.

The optical communication system of the ninth embodiment measures the transmission distance between subscriber devices while preventing the throughput of the main signal from deteriorating, and selects the quality compensator for the main signal based on the measurement result. A low-rate management control signal (hereinafter also described as a "control signal") that is superimposed on a high-rate main signal and transmitted is used for the measurement. In the present embodiment, the quality compensator is a dispersion compensator. The subscriber device uses the management control signal to measure the transmission distance to the communication destination subscriber device. The management control device selects the dispersion compensator with the optimum dispersion compensation amount based on the measured transmission distance. The management control device sets the optical path between the subscriber devices so as to pass through the selected dispersion compensator, as in the above-described embodiment. According to the present embodiment, the subscriber device can obtain the desired reception sensitivity for the high-rate main signal while preventing the throughput of the main signal from deteriorating. The present embodiment will be described focusing on differences from the above-described embodiments.

Figure 14:
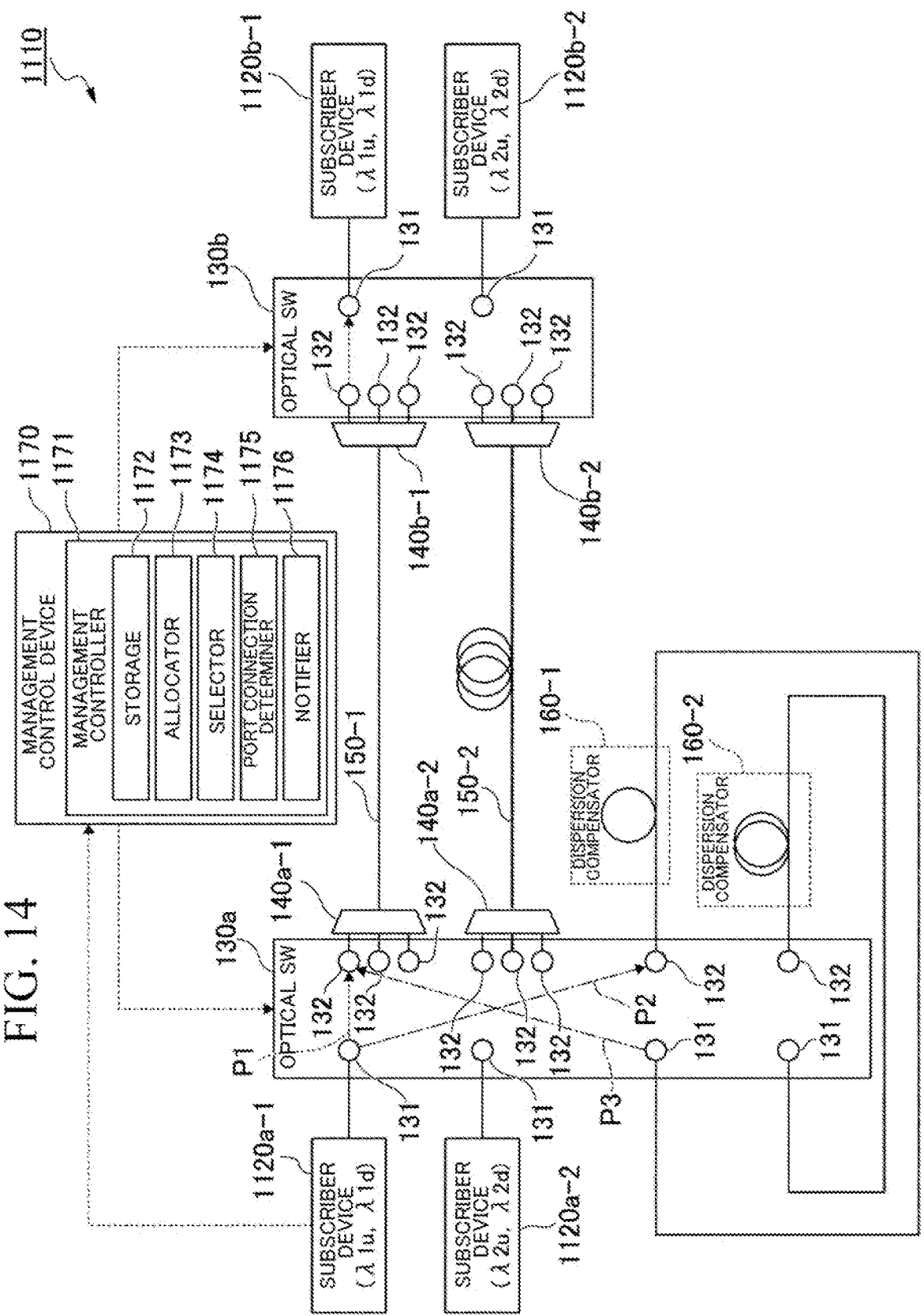
FIG. 14 is a diagram showing the configuration of an optical communication system according to a ninth embodiment.

FIG. 14 is a diagram showing the configuration of an optical communication system 1110 according to the ninth embodiment. In this figure, the same constituent elements as those of the optical communication system 110 of the first embodiment shown in FIG. 1 are designated by the same reference numerals, and the description thereof will be omitted. The optical communication system 1110 has a subscriber device 1120, an optical SW 130, a wavelength multiplexer/demultiplexer 140, an optical transmission path 150, a dispersion compensator 160 and a management control device 1170. That is, the optical communication system 1110 has a subscriber device 1120 and a management control device 1170 instead of the subscriber device 120 and the management control device 170 of the optical communication system 110 shown in FIG. 1.

A subscriber device 1120 connected to the optical SW 130x (x=a, b) is described as a subscriber device 1120x. N subscriber devices 1120a are described as subscriber devices 1120a-1, ..., 1120a-N, M subscriber devices 1120b are described as subscriber devices 1120b-1, ..., 1120b-M. FIG. 14 shows an example of N=2 and M=2.

In the following, a case where a subscriber device 1120a-n (n=1, 2) communicates with a subscriber device 1120b-n will be described as an example. The optical signal output by the subscriber device 1120a-n and received by the subscriber device 1120b-n uses the wavelength λnu, and the optical signal output by the subscriber device 1120b-n and received by the subscriber device 1120a-n uses the wavelength λnd. The opposing subscriber devices 1120a-n and 1120b-n are connected via the optical SWs 130a and 130b, the wavelength multiplexers/demultiplexers 140a-n and 140b-n, and the optical transmission path 150-n.

The management control device 1170 is an example of a control device that controls the optical path in the optical SW 130. The management control device 1170 has a management controller 1171. The management controller 1171 has a storage 1172, an allocator 1173, a selector 1174, a port connection determiner 1175 and a notifier 1176.

The storage 1172 stores the first selection information that associates the transmission distance with the dispersion compensation amount or dispersion compensator information. The dispersion compensator information is the same as the quality compensator information included in the first parameter table, and indicates available dispersion compensators 160. That is, the available dispersion compensator 160 is the dispersion compensator 160 that performs quality compensation according to the degree of quality deterioration of an optical signal when the optical signal is transmitted through the transmission path. The allocator 1173 allocates resources to be used for an optical path between the subscriber devices 1120 and determines signal parameter values by the same function as the allocator 173 of the management control device 170 of the embodiment described above. Another device connected to the management control device 1170 may have the allocator 1173.

The selector 1174 receives information on the transmission distance between the subscriber device 1120 that outputs the optical signal and the subscriber device 1120 that receives the optical signal from the subscriber device 1120. The selector 1174 reads the dispersion compensation amount or dispersion compensator information corresponding to the transmission distance from the first selection information stored in the storage 1172. When the dispersion compensation amount is read, the selector 1174 selects the dispersion compensator 160 that performs dispersion compensation for the dispersion compensation amount. When the dispersion compensator information is read, the selector 1174 selects the dispersion compensator 160 to be used among the dispersion compensators 160 indicated by the read dispersion compensator information. The number of dispersion compensators 160 to be selected may be one, or two or more.

The port connection determiner 1175 has the same function as the port connection determiner 175 of the management control device 170 of the embodiment described above. That is, the port connection determiner 1175 determines the port connection relationship within the optical SW 130 for passing through the dispersion compensator 160 selected by the selector 1174 in the optical path between the subscriber devices 1120.

The notifier 1176 has the same function as the notifier 176 of the management control device 170 of the embodiment described above. That is, the notifier 1176 notifies the subscriber device 1120 that outputs the optical signal and the subscriber device 1120 that receives the optical signal of the resource and signal parameter values determined by the allocator 1173. In addition, the notifier 1176 notifies the optical SW 130 of the port connection relationship determined by the port connection determiner 1175.

Figure 15:
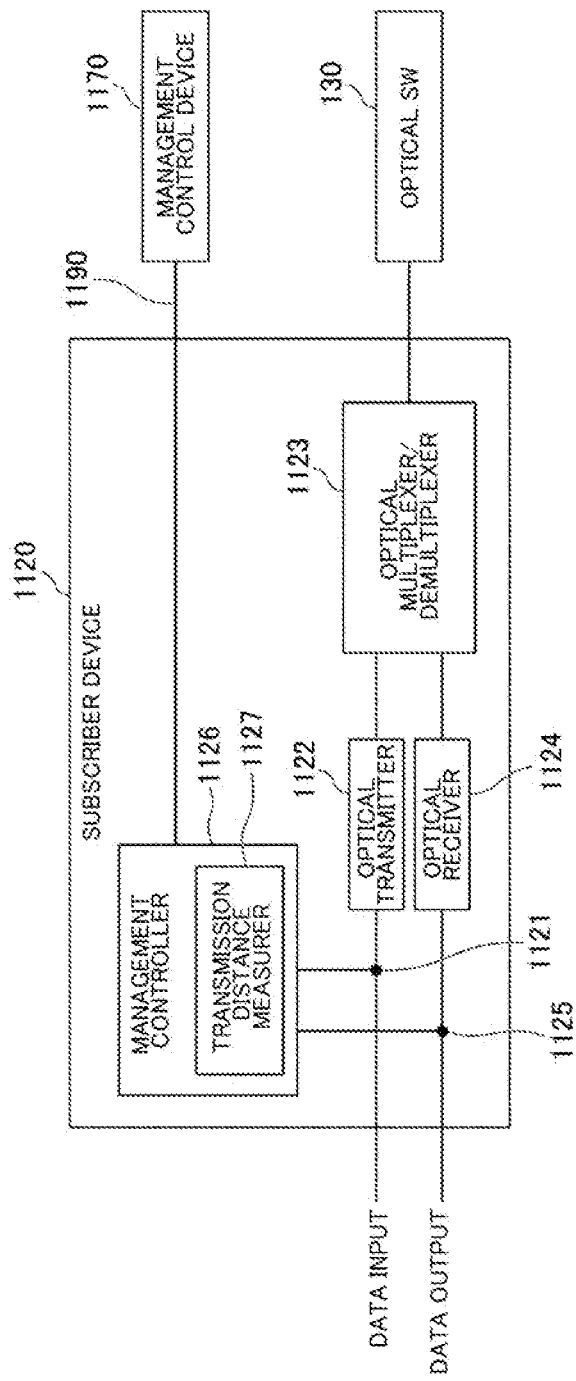
FIG. 15 is a diagram showing the configuration of a subscriber device according to the embodiment.

FIG. 15 is a diagram showing the configuration of the subscriber device 1120. The subscriber device 1120 includes a signal mixer 1121, an optical transmitter 1122, an optical multiplexer/demultiplexer 1123, an optical receiver 1124, a signal divider 1125 and a management controller 1126.

The signal mixer 1121 outputs a transmission signal in which a control signal of an electric signal output by the management controller 1126 is superimposed on the main signal, which is the input data of the electric signal, to the optical transmitter 1122. The control signal is AMCC with a lower frequency than the main signal. The optical transmitter 1122 converts the electric signal input from the signal mixer 1121 into an optical signal having the signal parameters and the transmission wavelength notified from the management control device 1170 and outputs the converted optical signal to the optical multiplexer/demultiplexer 1123. The optical transmitter 1122 may use preset signal parameters and the like.

The optical multiplexer/demultiplexer 1123 outputs the optical signal input from the optical transmitter 1122 to the optical transmission path between the optical multiplexer/demultiplexer 1123 and the optical SW 130. The optical multiplexer/demultiplexer 1123 receives an optical signal from the optical transmission path between the optical multiplexer/demultiplexer 1123 and the optical SW 130 and outputs an optical signal of the reception wavelength notified from the management control device 1170 to the optical receiving unit 1124.

The optical receiver 1124 converts the optical signal input from the optical multiplexer/demultiplexer 1123 into an electric signal using the signal parameter notified from the management control device 1170, and outputs the converted electric signal. The optical receiver 1124 may use preset signal parameters and the like. The signal divider 1125 separates the electric signal output from the optical receiver 1124 into the output data of the main signal and the control signal according to frequency.

The management controller 1126 outputs an electric control signal to the signal mixer 1121. The management controller 1126 receives the electric control signal separated by the signal divider 1125. The management controller 1126 includes a transmission distance measurer 1127. The transmission distance measurer 1127 calculates the transmission distance to the communication destination subscriber device 1120 based on the control signal transmitted/received to/from the communication destination subscriber device 1120. The transmission distance measurer 1127 notifies the management control device 1170 of the calculated transmission distance via a control signal communication path 1190.

Figure 16:
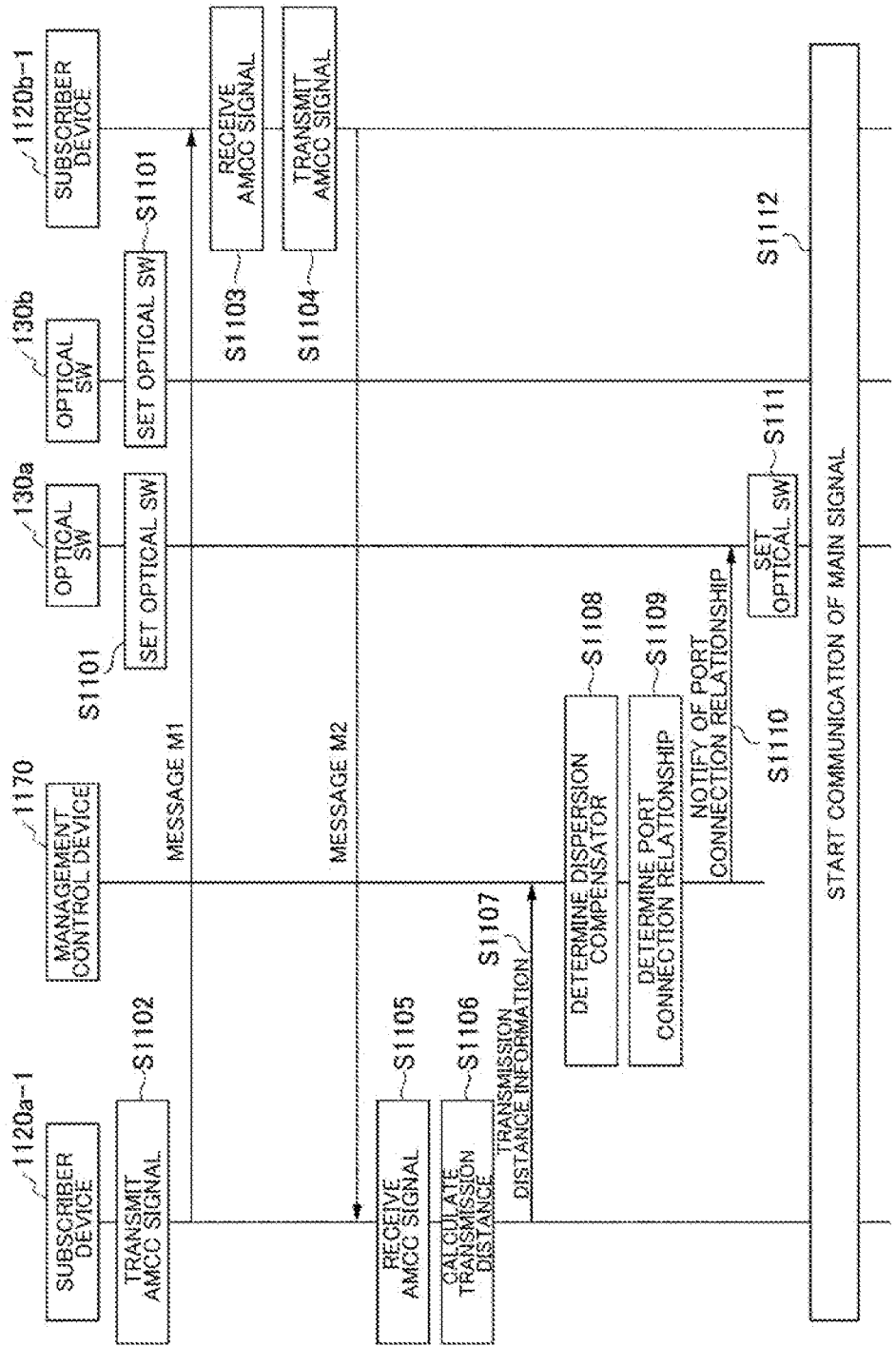
FIG. 16 is a sequence diagram showing the operation of selecting a dispersion compensator in the optical communication system according to the embodiment.

FIG. 16 is a sequence diagram showing the operation of selecting the dispersion compensator in the optical communication system 1110. FIG. 16 shows an example where the subscriber device 1120a-1 communicates with the subscriber device 1120b-1.

First, the optical SW 130a and the optical SW 130b connect the input port and the output port so that the subscriber device 1120a-1 and the subscriber device 1120b-1 are connected without via the dispersion compensator 160 (step S1101). For example, the optical communication system 1110 performs the processes of steps S101 to S106 and S108 to S114 of the first embodiment shown in FIG. 3. That is, the allocator 1173 of the management control device 1170 determines the optical path so that the optical signal transmitted from the subscriber device 1120a-1 is output to the subscriber device 1120b-1 via the optical SW 130a, the wavelength multiplexer/demultiplexer 140a-1, the optical transmission path 150-1, the wavelength multiplexer/demultiplexer 140b-1 and the optical SW 130b. The allocator 1173 allocates the wavelength λ1u to this optical path. Therefore, the determined optical path includes a path P1 of the optical SW 130a shown in FIG. 14. The path P1 is a path in the optical SW 130a from the input port 131 connected to the subscriber device 1120a-1 to the output port 132 connected to the first port corresponding to the wavelength λ1u of the wavelength multiplexer/demultiplexer 140a-1. Similarly, the allocator 1173 determines the optical path so that the optical signal transmitted from the subscriber device 1120b-1 is output to the subscriber device 1120a-1 via the optical SW 130b, the wavelength multiplexer/demultiplexer 140b-1, the optical transmission path 150-1, the wavelength multiplexer/demultiplexer 140a-1, and the optical SW 130a. The allocator 1173 allocates the wavelength λ1u to this optical path. Thus, the allocator 1173 determines that the optical path from the subscriber device 1120a-1 to the subscriber device 1120b-1 and the optical path from the subscriber device 1120b-1 to the subscriber device 1120a-1 use the same transmission path. The allocator 1173 determines signal parameter values to be used for these optical paths. The notifier 1176 notifies the subscriber device 1120a-1 and the subscriber device 1120b-1 of the communication wavelength and signal parameters. Further, the port connection determiner 1175 determines the port connection relationship of the optical SW 130a and the optical SW 130b, and notifies the optical SW 130a and the optical SW 130b of the determined port connection relationship. The optical SW 130a and the optical SW 130b connect the input port 131 and the output port 132 according to the notified port connection relationship.

The above is the same as the processing up to step S914 in FIG. 34. Note that the optical communication system 1110 may perform the processing up to step S914 in FIG. 35 or the processing up to step S913 in FIG. 46 to connect the input port 131 and the output port 132 of the optical SWs 130a and 130b.

The subscriber device 1120a-1 transmits a message M1 in which an AMCC signal is set (step S1102). That is, the signal mixer 1121 outputs a message M1 in which the AMCC signal output by the management controller 1126 is superimposed on the input data of an electric signal to the optical transmitter 1122. The optical transmitter 1122 converts the message M1 from an electric signal to an optical signal of the wavelength λ1u. The optical multiplexer/demultiplexer 1123 outputs the message M1 of an optical signal. The message M1 transmitted from the subscriber device 1120a-1 is input to the optical transmission path 150-1 via the path P1 of the optical SW 130a and the wavelength multiplexer/demultiplexer 140a-1. The message M1 input from the optical transmission path 150-1 to the optical SW 130b via the wavelength multiplexer/demultiplexer 140b-1 is output to the subscriber device 1120b-1.

The subscriber device 1120b-1 receives the AMCC signal superimposed on the message M1 (step S1103). That is, the optical multiplexer/demultiplexer 1123 of the subscriber device 1120b-1 outputs the message M1 to the optical receiver 1124. The optical receiver 1124 converts the message M1 from an optical signal to an electric signal. The management controller 1126 receives the AMCC signal separated from the message M1 of the electric signal by the signal divider 1125.

Subsequently, the subscriber device 1120b-1 performs the same processing as that of the subscriber device 1120a-1 in step S1102, and transmits a message M2 of the wavelength λ1d in which the AMCC signal is set (step S1104). The message M2 transmitted from the subscriber device 1120b-1 is input to the optical transmission path 150-1 via the optical SW 130b and the wavelength multiplexer/demultiplexer 140b-1. The message M2 input from the optical transmission path 150-1 to the optical SW 130a via the wavelength multiplexer/demultiplexer 140a-1 is output to the subscriber device 1120a-1. The subscriber device 1120a-1 performs processing similar to that of the subscriber device 1120b-1 in step S1103, and receives the AMCC signal superimposed on the message M2 (step S1105).

The transmission distance measurer 1127 of the subscriber device 1120a-1 measures RTT (Round Trip Time) between the subscriber device 1120a-1 and the subscriber device 1120b-1 using the received AMCC signal and calculates the transmission distance using the obtained RTT (step S1106). It is assumed that the refractive index in the fiber is 102 m/μs (see, for example, Reference 3). In this case, the fiber distance FDn between the subscriber device 1120a-1 and the subscriber device 1120b-1 is calculated by FDn=RTT[s]×102[m/μs]. The transmission distance measurer 1127 transmits transmission distance information indicating the calculated transmission distance to the management control device 1170 (step S1107).

(Reference 3) "40-Gigabit-capable passive optical networks (NG-PON2): Transmission convergence layer specification", ITU-T G.989.3 Series G: Transmission Systems and Media, Digital Systems and Networks, 2015

The selector 1174 of the management control device 1170 determines the dispersion compensator 160 to be used for the optical signal from the subscriber device 1120a-1 to the subscriber device 1120b-1 based on the transmission distance information (step S1108). Specifically, the selector 1174 reads the dispersion compensation amount corresponding to the transmission distance information from the first selection information, and selects the dispersion compensator 160 that performs dispersion compensation for the read dispersion compensation amount. When reading the dispersion compensator information corresponding to the transmission distance information from the first selection information, the selector 1174 selects the dispersion compensator 160 to be used from the dispersion compensators 160 indicated by the read dispersion compensator information. Here, it is assumed that the dispersion compensator 160-1 is selected.

The port connection determiner 1175 determines the port connection relationship between the input port 131 and the output port 132 in the optical SW 130a connected to the dispersion compensator 160-1 so that the optical path from the subscriber device 1120a-1 to the subscriber device 1120b-1 passes through the dispersion compensator 160-1 selected by the selector 1174 (step S1109). Specifically, the port connection determiner 1175 determines the port connection of the path P2 in the optical SW 130a so that the optical signal input from the input port 131 connected to the subscriber device 1120a-1 is output to the output port 132 connected to the dispersion compensator 160-1. Further, the port connection determiner 1175 determines the port connection relationship of the path P3 in the optical SW 130a so that the optical signal input from the input port 131 connected to the dispersion compensator 160-1 is output to the output port 132 connected to the first port corresponding to the wavelength λ1u of the wavelength multiplexer/demultiplexer 140a-1.

The notifier 1176 notifies the optical SW 130a of the port connection relationship of the optical SW 130a determined by the selector 1174 (step S1110). The optical SW 130a connects the input port 131 and the output port 132 according to the port connection relationship notified in step S1110 (step S1111). The subscriber device 1120a-1 and the subscriber device 1120b-1 start communication of the main signal (step S1112). The optical signal of the wavelength λ1u transmitted from the subscriber device 1120a-1 passes through the optical SW 130a, the dispersion compensator 160-1, and the optical SW 130a in order, and then, the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

Note that the optical SW 130a may transmit a setting completion notification to the subscriber device 1120a-1 and the subscriber device 1120b-1 via the management control device 170 after the port connection setting in step S1111 is completed. After receiving the setting completion notification, the subscriber device 1120a-1 and the subscriber device 1120b-1 start communication of the optical signal of the main signal.

The optical signal between the subscriber devices 1120 may also pass through a plurality of dispersion compensators 160. In this case, the combination of dispersion compensators 160 to be used is set in the dispersion compensator information. Thus, for example, in step S1108, the selector 1174 selects the dispersion compensators 160-1 and 160-2 for the optical signal from the subscriber device 1120a-1 to the subscriber device 1120b-1. In this case, the port connection determiner 1175 determines the port connection relationship of the optical SW 130a in the same manner as when the dispersion compensator 160-1 and the dispersion compensator 160-2 are selected in the first embodiment.

As shown in FIG. 6, the optical communication system 1110 may insert a wavelength multiplexer/demultiplexer 440a-k-1 and a wavelength multiplexer/demultiplexer 440a-k-2 between the optical SW 130a and the dispersion compensator 160-k. In this case, the port connection determiner 1175 of the management control device 1170 may determine the port connection relationship between the input port 131 and the output port 132 of the optical SW 130a so that the optical signal from the subscriber device 1120b-1 to the subscriber device 1120a-1 passes through the dispersion compensator 160-1. The notifier 1176 notifies the optical SW 130a of the port connection relationship of the optical SW 130a determined by the selector 1174.

A wavelength separation filter 280 similar to that of the second embodiment shown in FIG. 4 may be provided between the subscriber device 1120 and the optical SW 130. In the optical SW 130a and the optical SW 130b, the optical signal with the wavelength λ1d from the subscriber device 1120b-1 to the subscriber device 1120a-1 use the input port 131 and the output port 132 different from those of the optical signal from the subscriber device 1120a-1 to the subscriber device 1120b-1. In this case, in step S1109, the port connection determiner 175 may further determine the port connection relationship of the optical SW 130a so that the optical signal from the subscriber device 1120b-1 to the subscriber device 1120a-1 pass through the dispersion compensator 160-1 determined in step S1108. In other words, the port connection determiner 175 determines the port connection relationship of the optical SW 130a so that the optical signal input from the output port 132 connected to the first port of the wavelength λ1d of the wavelength multiplexer/demultiplexer 140a-1 is output to the input port 131 connected to the dispersion compensator 160-1, and the optical signal input from the output port 132 connected to the dispersion compensator 160-1 is output to the input port 131 connected to the subscriber device 120a-1. In step S1110, the notifier 1176 further notifies the optical SW 130a of the port connection relationship of the optical SW 130a determined for the optical signal from the subscriber device 1120b-1 to the subscriber device 1120a-1.

When the wavelength separation filter 280 is provided between the subscriber device 1120 and the optical SW 130 as in the second embodiment shown in FIG. 4, and the optical SW 130b includes the dispersion compensators 160-3 and 160-4, the selector 174 may determine that the optical signal from the subscriber device 1120b-1 to the subscriber device 1120a-1 uses the dispersion compensator 160-3 having the same dispersion compensation amount as the dispersion compensator 160-1 determined in step S1108. In this case, the port connection determiner 1175 determines the port connection relationship of the optical SW 130b, as in the second embodiment. This port connection relationship is the connection relationship between the input port 131 and the output port 132, so that the optical signal input from the input port 131 connected to the subscriber device 120b-1 passes through the dispersion compensator 160-3 until the optical signal is output from the output port 132 connected to the first port of the wavelength λ1d of the wavelength multiplexer/demultiplexer 140b-1. In step S1110, the notifier 1176 notifies the optical SW 130b of the port connection relationship of the optical SW 130b determined by the selector 1174. The optical SW 130b connects the input port 131 and the output port 132 according to the notified port connection relationship.

Figure 17:
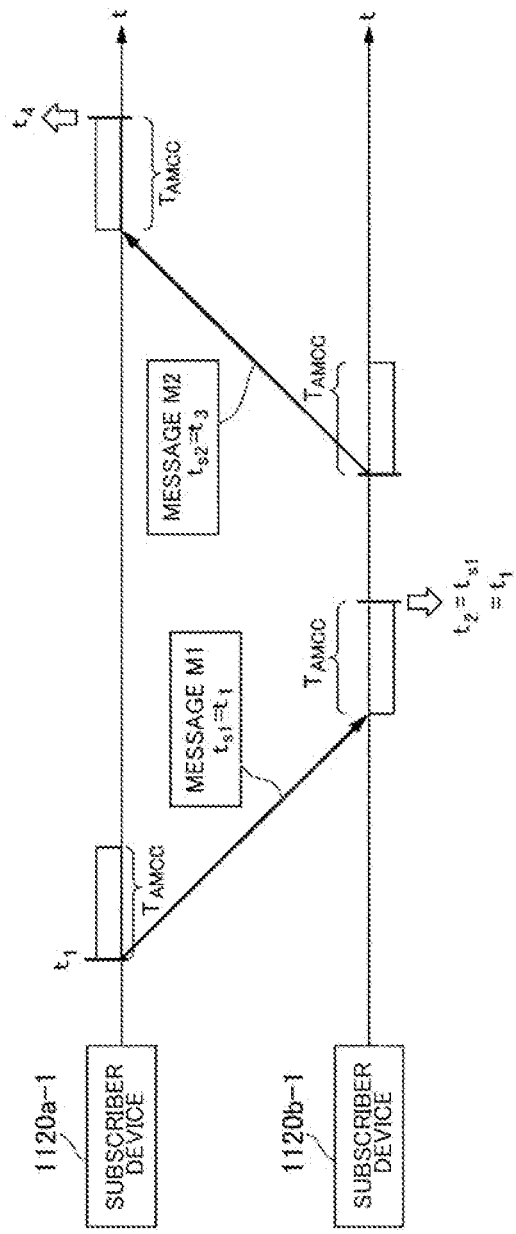
FIG. 17 is a diagram showing an RTT calculation method according to the embodiment.

FIG. 17 is a diagram showing a transmission distance calculation method. FIG. 17 corresponds to the processing of steps S1102 to S1106 in FIG. 16. In FIG. 17, a case of calculating the transmission distance between the subscriber device 1120a-1 and the subscriber device 1120b-1 will be described as an example. The transmission distance measurer 1127 of the subscriber device 1120a-1 and the transmission distance measurer 1127 of the subscriber device 1120b-1 each have a counter that indicates time. That is, the counter counts up at predetermined intervals. First, time synchronization must be established between the transmission distance measurer 1127 of the subscriber device 1120a-1 and the transmission distance measurer 1127 of the subscriber device 1120b-1. Therefore, the transmission distance measurer 1127 of the subscriber device 1120a-1 transmits the current value of the counter of the subject device to the subscriber device 1120b-1 as time stamp information. Transmission of the time stamp information is performed using an AMCC signal. The transmission distance measurer 1127 of the subscriber device 1120b-1 updates the counter value of the subject device according to the received time stamp value.

The subscriber device 1120a-1 then measures RTT, which is the frame round-trip time. $T_{AMCC}$ is the frame length of an AMCC signal. The frame length represents the time required from the start of transmission of a frame to the end of transmission. In FIG. 17, it is assumed that the transmission distance measurer 1127 of the subscriber device 1120a-1 completes reception of the message M2 from the subscriber device 1120b-1 when the counter of the subject device is $t_4$. This message M2 includes a time stamp $T_{s2}$ set by the transmission distance measurer 1127 of the subscriber device 1120b-1. The time stamp $t_{s2}$ describes the counter value $t_3$ of the subject device when the transmission distance measurer 1127 of the subscriber device 1120b-1 starts sending the message M2.

On the other hand, the message M1 received from the subscriber device 1120a-1 before the transmission distance measurer 1127 of the subscriber device 1120b-1 sends the message M2 includes the time stamp $t_{s1}$ set by the transmission distance measurer 1127 of the subscriber device 1120a-1. The time stamp $t_{s1}$ describes the counter value of the subject device when the transmission distance measurer 1127 of the subscriber device 1120a-1 starts sending the message M1. The most recent message among the messages M1 received from the subscriber device 1120a-1 before the subscriber device 1120b-1 sends the message 112 has the counter value $t_1$ described in the time stamp $t_{s1}$. Therefore, upon receiving the message M1, the transmission distance measurer 1127 of the subscriber device 1120b-1 updates the counter value of the subject device to the value of the time stamp $t_{s1}$ (=$t_1$) included in the message M1.

Here, it is assumed that the reference point for reading the counter value when the subscriber device 1120 transmits the time stamp is the beginning of the frame of the AMCC signal, and the reference point for reading the counter value described in the message when receiving the time stamp is the end point of the frame of the AMCC signal. In this case, the RTT between the subscriber device 1120a-1 and the subscriber device 1120b-1 is calculated by Equation (1) by correcting the time required for frame reception.

$$RTT=(t_4-t_1)-(t_3-t_2)-2T_{AMCC} \qquad (1)$$

For example, if the AMCC signal is 100 kbps (kilobits per second), it takes 10 μs to transmit one bit. If the AMCC frame consists of eight bits, the frame length is 80 μs. The RTT measurement includes an error of $2T_{AMCC}$, which is the reception time $T_{AMCC}$ for two frames. Since it takes 5 μs to propagate 1 km of fiber, a measurement error of $2T_{AMCC}÷5=2×80÷5=32$ km occurs. Therefore, it is necessary to correct the RTT equation as in the above equation.

The counter value $t_2$ of the subscriber device 1120b-1 is updated to $t_1$ by the value (=$t_1$) of the time stamp $t_{s1}$ described in the message M1 (therefore, $t_2$=$t_1$). Therefore, the RTT is given by Equation (2).

$$RTT=t_4-t_3-2T_{AMCC} \qquad (2)$$

Note that $t_3$ is the same as the value of the time stamp $t_{s2}$ of the message M2, so it can also be expressed as Equation (3) below.

$$RTT=t_4-t_{s2}-2T_{AMCC} \qquad (3)$$

In this way, the transmission distance measurer 1127 of the subscriber device 1120a-1 can obtain the RTT between the subscriber device 1120a-1 and the subscriber device 1120b-1 that sent the message M2 according to Equation (3) based on the counter value $t_4$ at the reception completion time of the message M2, which is an uplink control frame, and the time stamp $t_{s2}$ written in the message M2. This RTT calculation method is described as a first RTT calculation method.

Figure 18:
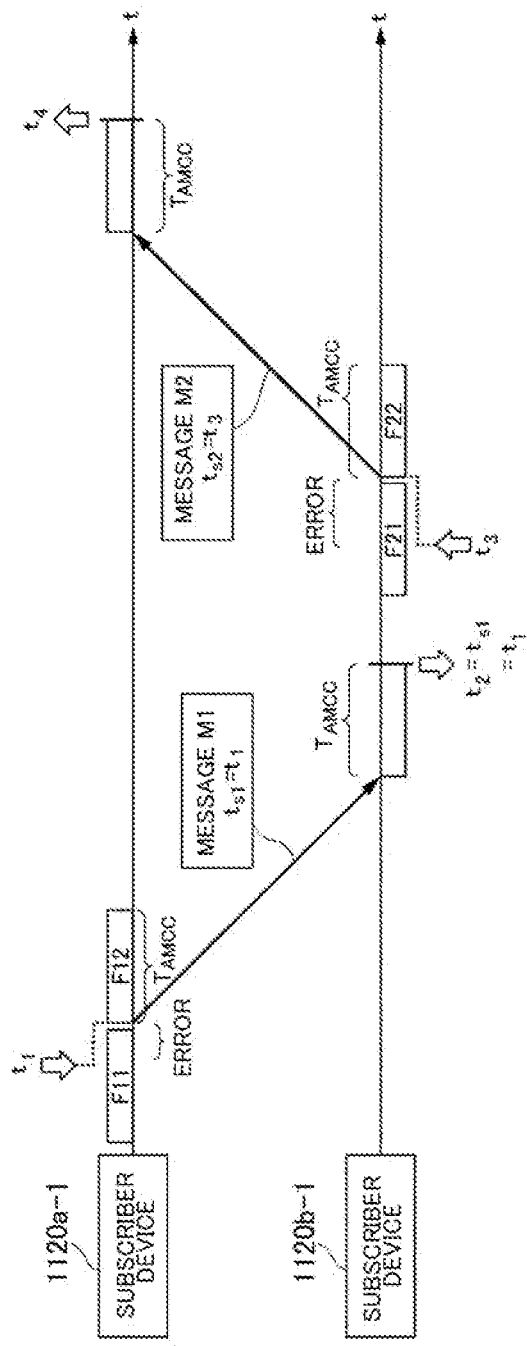
FIG. 18 is a diagram showing an example in which an error occurs in the RTT calculation method according to the embodiment.

FIG. 18 is a diagram showing an example in which an error occurs in the first RTT calculation method. This error occurs when the timing of reading the counter value of the subscriber device 1120a-1 on the transmitting side does not match the arrival timing of the frame. If the subscriber device 1120a-1 cannot transmit the message M1 including the time stamp $t_{s1}$ in which the counter value $t_1$ is set in the current frame F11, the subscriber device 1120a-1 transmits the message M1 in the next frame F12. Similarly, if the subscriber device 1120b-1 cannot transmit the message M2 including the time stamp $t_{s2}$ in which the counter value $t_3$ is set in the current frame F21, the subscriber device 1120b-1 transmits the message M2 in the next frame F22. Thus, if the subscriber device 1120 cannot transmit a signal in the current frame, it waits until the next frame and transmits the signal. In this case, the RTT measured by the subscriber device 1120a-1 ranges from $RTT+2T_{AMCC}$ to $RTT+4T_{AMCC}$. Therefore, an error of up to $2T_{AMCC}$ occurs.

Figure 19:
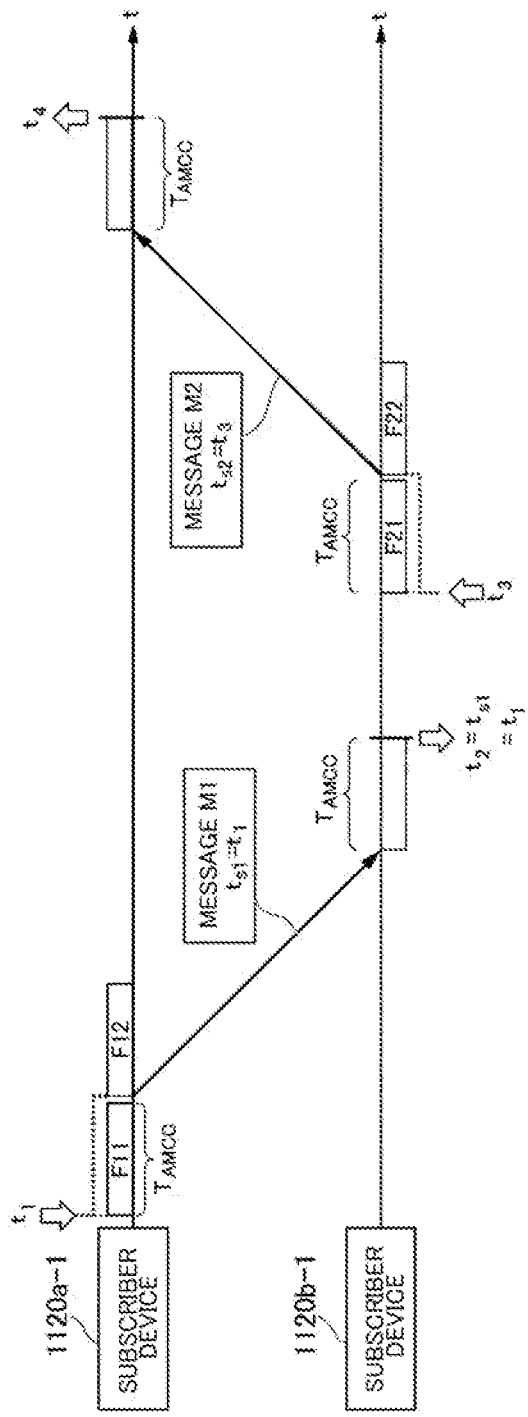
FIG. 19 is a diagram showing another RTT calculation method according to the embodiment.

FIG. 19 is a diagram showing a second RTT calculation method. First, the transmission distance measurer 1127 of the subscriber device 1120a-1 that transmits the AMCC detects the beginning of the frame F11 of AMCC, and reads the counter value $t_1$ at the timing of detecting the beginning. Subsequently, the transmission distance measurer 1127 writes the read counter value $t_1$ to the time stamp $t_{s1}$ of the frame F12 next to the frame F11 whose beginning has been detected. The subscriber device 1120a-1 transmits the frame F12 as the message M1. There is a difference of $2T_{AMCC}$ between the time when the counter value $t_1$ is detected by the subscriber device 1120a-1 and the time when the transmission of the frame F12 describing the counter value $t_1$ is completed.

The transmission distance measurer 1127 of the subscriber device 1120b-1 updates the value of its own counter to the value (=$t_1$) of the time stamp $t_{s1}$ of the message M1 at the reception completion time of the message M1.

The transmission distance measurer 1127 of the subscriber device 1120b-1 detects the beginning of the AMCC frame F21, and reads the counter value $t_3$ at the timing of detecting the beginning. The transmission distance measurer 1127 writes the read counter value $t_3$ to the time stamp $t_{s2}$ of the frame F22 next to the frame F21 whose beginning has been detected. The subscriber device 1120*b*-1 transmits the frame F22 as the message M2. There is a difference of $2T_{AMCC}$ between the time when the counter value $t_3$ is detected by the subscriber device 1120*b*-1 and the time when the transmission of the frame F22 describing the counter value $t_3$ is completed.

In this case, the RTT between the subscriber device 1120*a*-1 and the subscriber device 1120*b*-1 is calculated by Equation (4) by correcting the time required for frame transmission/reception.

$$\text{RTT}=(t_4-t_1)-(t_3-t_2)-4T_{AMCC}=t_4-t_{s2}-4T_{AMCC} \quad (4)$$

In the second RTT calculation method, the counter value at the beginning position of the previous frame is described as a time stamp, but the following third RTT calculation method may also be used. That is, the transmission distance measurer 1127 of the subscriber device 1120*a*-1 and the transmission distance measurer 1127 of the subscriber device 1120*b*-1 calculates the counter value at the beginning position of a frame F' describing the time stamp value based on the beginning position of the detected frame F and sets the calculated counter value to the time stamp of the frame F'. In that case, the RTT between the subscriber device 1120*a*-1 and the subscriber device 1120*b*-1 is calculated by Equation (5).

$$\text{RTT}=(t_4-t_1)-(t_3-t_2)-4T_{AMCC}=t_4-t_{s2}-4T_{AMCC} \quad (5)$$

The transmission distance measurer 1127 of the subscriber device 1120*a*-1 calculates the RTT by any one of the first to third RTT calculation methods, and calculates the transmission distance based on the calculated RTT.

It is common to use one byte of a determined location in an AMCC signal frame as the reference point for reading the counter value when sending a time stamp and the reference point for reading the counter value described in the message when receiving a time stamp. However, since the AMCC signal is a low-rate signal, the measured RTT value fluctuates greatly depending on which time in one byte is referenced. For example, if the AMCC signal is 100 kbps (kilobits per second), it takes 80 μs to transmit one byte. Therefore, the distance measurement using the AMCC signal described above may have low accuracy. Therefore, in step S1108, the selector 1174 of the management control device 1170 may extract a plurality of candidates for the available dispersion compensator 160 instead of selecting one dispersion compensator 160 to be used. Then, the selector 1174 selects one dispersion compensator 160 randomly or according to a predetermined rule among the extracted candidates for the dispersion compensator 160. After that, the optical communication system 1110 performs the processing after step S1109. Then, after the subscriber device 1120*a*-1 and the subscriber device 1120*b*-1 start communication of the main signal in step S1112, when the management controller 1126 of the subscriber device 1120*a*-1 or the management controller 1126 of the subscriber device 1120*b*-1 detects that the main signal cannot be correctly received due to the communication quality being lower than a predetermined value, the management controller 1126 notifies the management control device 1170 of reception abnormality. Upon receiving the reception abnormality, the selector 1174 of the management control device 1170 selects an unselected dispersion compensator 160 among the candidates for the dispersion compensator 160 extracted in step S1108. After that, the optical communication system 1110 performs the processing after step S1109.

For example, it is assumed that the transmission distance information received from the subscriber device 1120*a*-1 is "transmission distance 10 km to 20 km". Further, the first quality compensator information is set such that the transmission distance of 0 to 15 km corresponds to the dispersion compensator 160-1, and the transmission distance of 15 to 20 km corresponds to the dispersion compensator 160-2. In this case, the selector 1174 of the management control device 1170 selects dispersion compensator 160-1 and the dispersion compensator 160-2 as candidates. The selector 1174 first selects the dispersion compensator 160-1. The port connection determiner 1175 determines the port connection relationship between the input port 131 and the output port 132 in the optical SW 130*a* so as to pass through the dispersion compensator 160-1. After step S1112, upon receiving a notification that the main signal cannot be received normally, the selector 1174 selects the dispersion compensator 160-2. The port connection determiner 1175 determines the port connection relationship between the input port 131 and the output port 132 in the optical SW 130*a* so as to pass through the dispersion compensator 160-2 without passing through the dispersion compensator 160-1.

In the optical communication system 1110 shown in FIG. 14, the subscriber device 1120 transmits transmission distance information to the management control device 1170 via the control signal communication path 1190, but the subscriber device 1120 may transmit the transmission distance information by setting the same in the optical signal.

Figure 20:
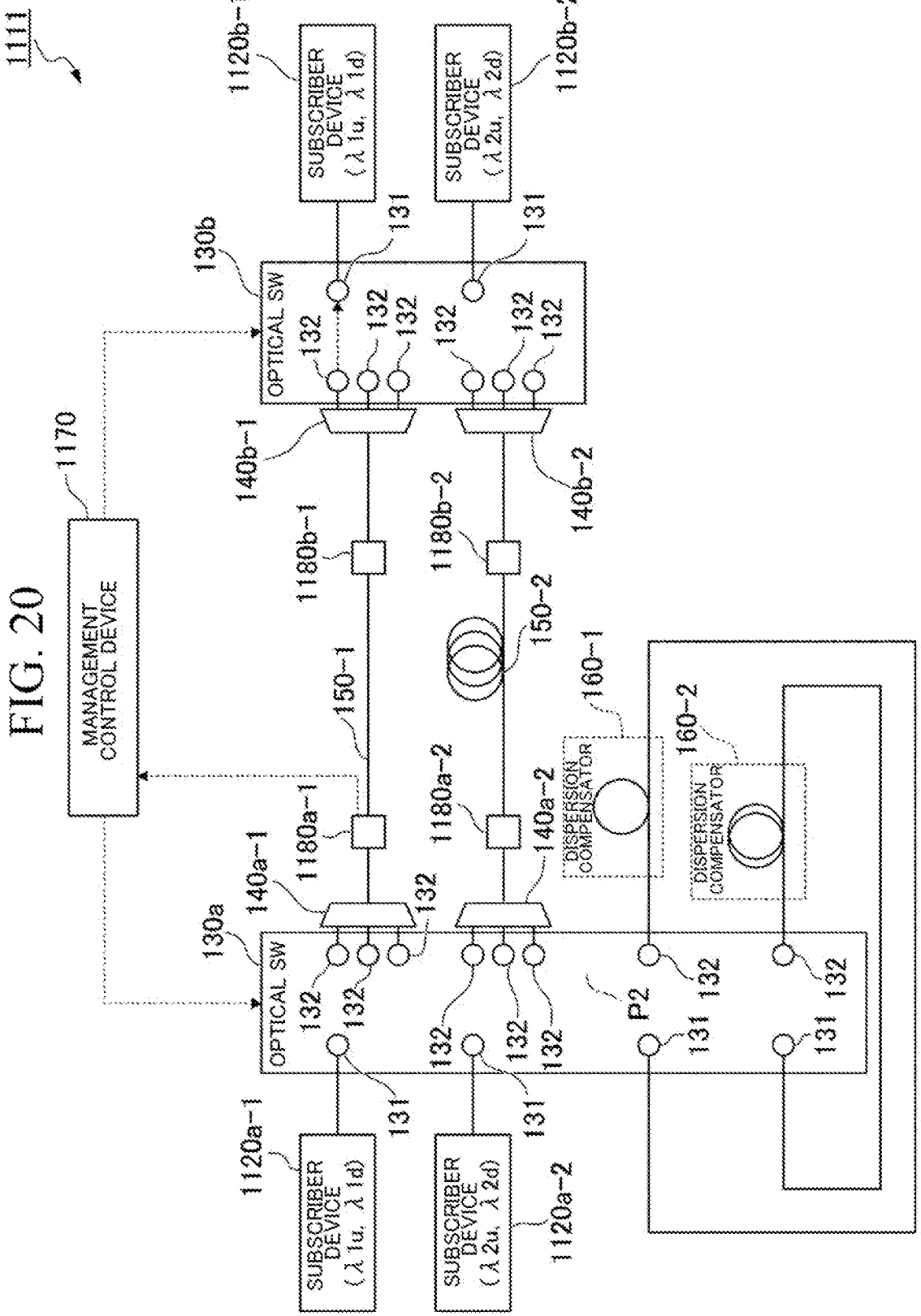
FIG. 20 is a diagram showing the configuration of a subscriber device according to the embodiment.

FIG. 20 is a diagram showing the configuration of the optical communication system 1111. In this figure, the same constituent elements as those of the optical communication system 1110 shown in FIG. 14 are designated by the same reference numerals, and the description thereof will be omitted. The optical communication system 1111 shown in FIG. 20 is different from the optical communication system 1110 shown in FIG. 14 in that a control signal extractor 1180 is provided near the wavelength multiplexers/demultiplexers 140 at both ends of the optical transmission path 150. The control signal extractor 1180 provided near the wavelength multiplexer/demultiplexer 140*x* (x=a, b) on the optical transmission path 150-*n* is described as a control signal extractor 1180*x*-*n*.

The subscriber device 1120 does not have to be connected to the management control device 1170 by the control signal communication path 1190. The subscriber device 1120, for example, transmits an optical signal in which transmission distance information is set. The subscriber device 1120 transmits a control signal in which transmission distance information is set by an optical signal. For the control signal, an out-band method in which the control signal of the AMCC signal is superimposed on the main signal and transmitted may be used, or an in-band method in which the control signal is set within the overhead of the protocol may be used. The management control device 1170 extracts the transmission distance information set in the optical signal by the subscriber device 1120 and notifies the management control device 1170 of the extracted transmission distance information.

Figure 21:
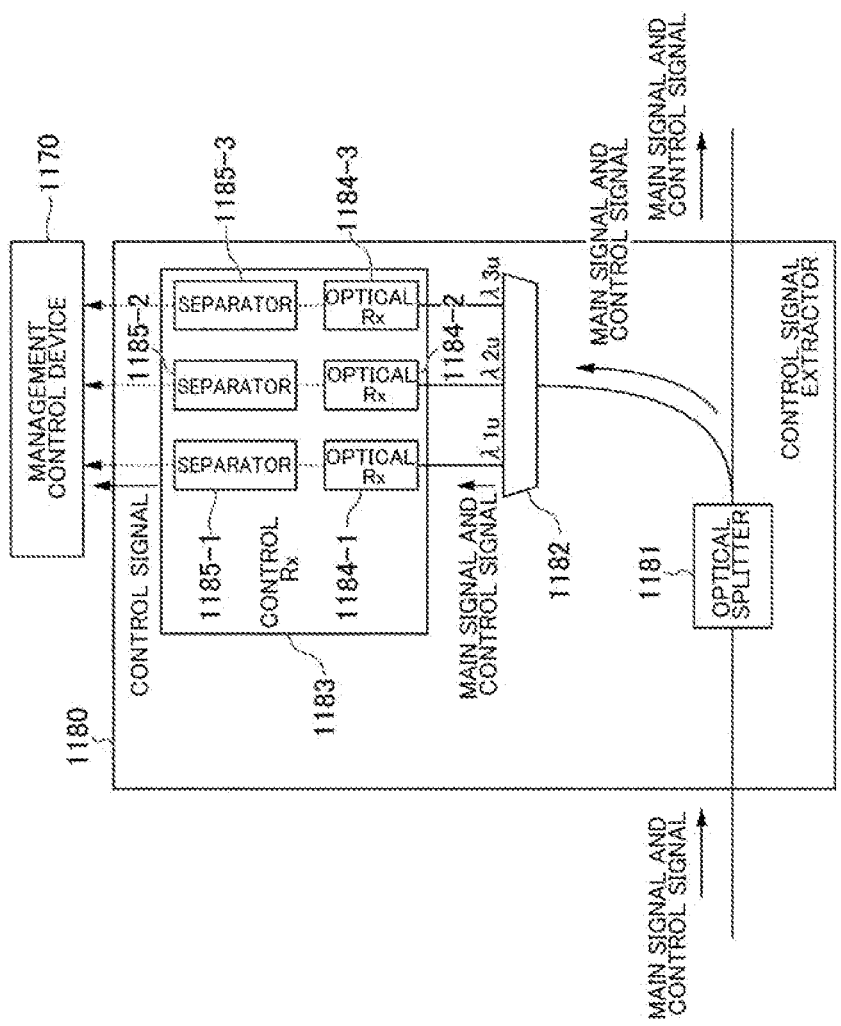
FIG. 21 is a diagram showing the configuration of a control signal extractor according to the embodiment.

FIG. 21 is a diagram showing the configuration of the control signal extractor 1180. The control signal extractor 1180 includes an optical splitter 1181, a wavelength multiplexer/demultiplexer 1182, and a control receiver (Rx) 1183. The optical splitter 1181 splits the optical signal transmitted through the optical transmission path 150. An optical signal transmitted through the optical transmission path 150 is an optical signal wavelength-multiplexed by the wavelength multiplexer/demultiplexer 140. The optical signal includes a main signal and a control signal. The optical splitter 1181 outputs the split optical signal to the wavelength multiplexer/demultiplexer 1182.

The wavelength multiplexer/demultiplexer 1182 has one input port (not shown) and H (H is an integer of 2 or more) output ports (not shown). FIG. 21 shows the case of H=3. The H output ports correspond to different wavelengths. The input port is connected to the optical splitter 1181. The H output ports are connected to the control receiver 1183. The wavelength multiplexer/demultiplexer 1182 demultiplexes the optical signal input from the optical branching unit 1181 through the input port into optical signals of different wavelengths, and outputs the demultiplexed optical signals from separate output ports. Each of the demultiplexed optical signals includes a main signal and a control signal.

The control receiver 1183 has optical receivers (Rx) 1184-1 to 1184-H and separators 1185-1 to 1185-H. The optical receiver 1184-$h$ (h is an integer of 1 or more and H or less) receives the optical signal demultiplexed by the optical splitter 1181, and converts the input optical signal into an electric signal. The optical receiver 1184-$h$ outputs the converted optical signal to the separator 1185-$h$. The separator 1185-$h$ separates the control signal from the electric signal input from the optical receiver 1184-$h$. The separator 1185-$h$ outputs the separated control signal to the management control device 1170.

For example, the subscriber device 1120$a$-1 transmits an optical signal of the wavelength λ1u in which a control signal in which transmission distance information is set and a main signal are superimposed. The wavelength multiplexer/demultiplexer 140$a$-1 multiplexes the optical signals with the wavelengths λ1u to λHu output from the optical SW 130$a$, and outputs the multiplexed signal to the optical transmission path 150-1. The optical splitter 1181 of the control signal extractor 1180 splits the optical signal transmitted through the optical transmission path 150. The wavelength multiplexer/demultiplexer 1182 demultiplexes the optical signal split by the optical splitter 1181 into optical signals of the wavelengths λ1u to λHu. and inputs the demultiplexed optical signal of the wavelength λhu to the optical receiver 1184-$h$. The optical receiver 1184-1 converts the optical signal of the wavelength λ1u into an electric signal. The separator 1185-1 separates the control signal from the electric signal input from optical receiver 1184-1 and outputs the separated control signal to the management control device 1170.

The first selection information may be information in which the transmission distance and the signal parameters are associated with the dispersion compensation amount or the dispersion compensator information. In this case, the selector 1174 selects the dispersion compensator 160 based on the dispersion compensation amount or the dispersion compensator information corresponding to the transmission distance and the signal parameter allocated to the subscriber device 1120.

Tenth Embodiment

In the ninth embodiment, the dispersion compensator is used as a quality compensator. In the tenth embodiment, the same processing as in the ninth embodiment is performed except that the optical amplifier is used as a quality compensator. The present embodiment will be described focusing on differences from the ninth embodiment.

Figure 22:
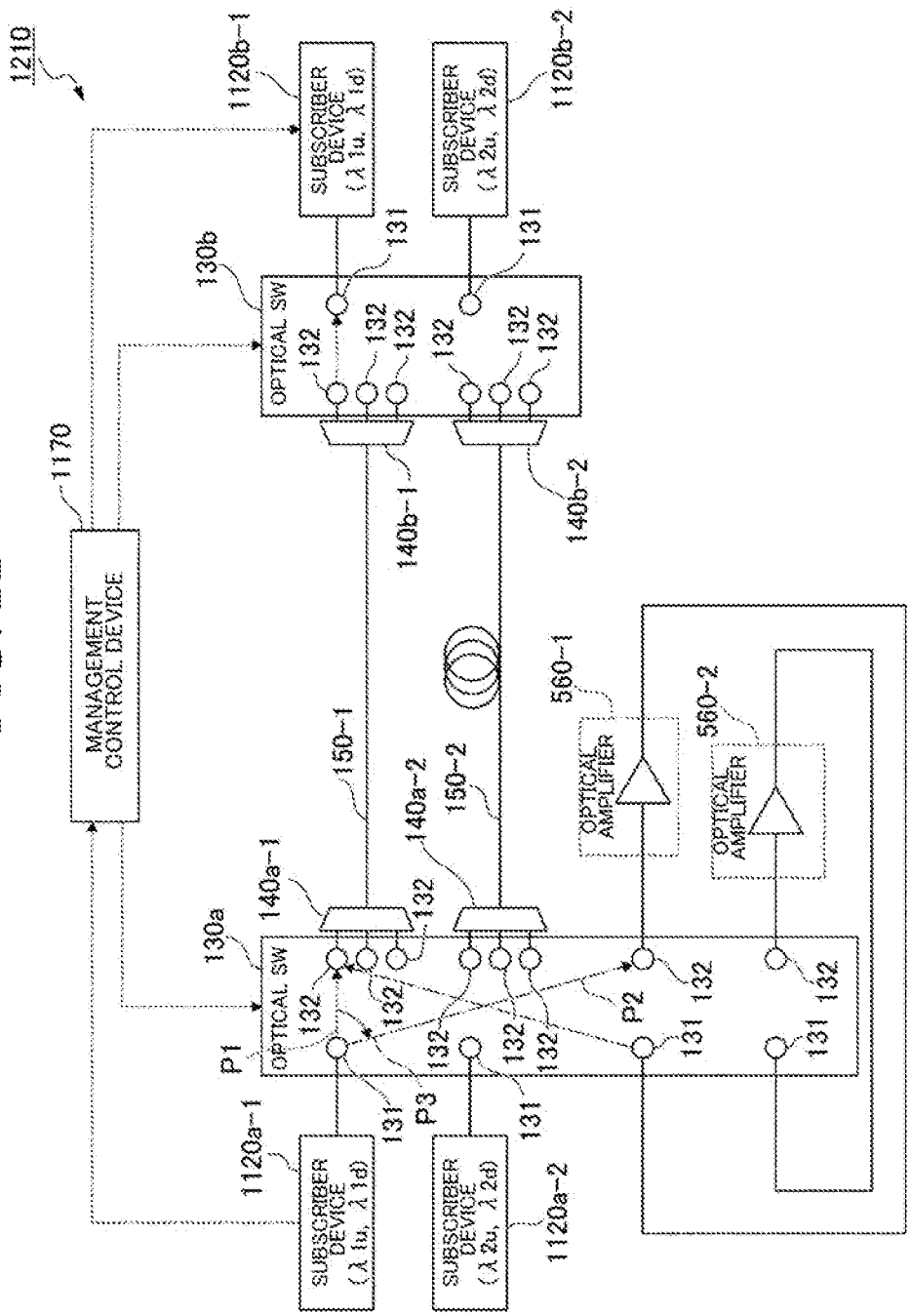
FIG. 22 is a diagram showing the configuration of an optical communication system according to a tenth embodiment.

FIG. 22 is a diagram showing the configuration of an optical communication system 1210 according to the tenth embodiment. The optical communication system 1210 shown in FIG. 22 is different from the optical communication system 1110 shown in FIG. 14 in that the optical amplifier 560 shown in FIG. 7 is provided instead of the dispersion compensator 160. The gains of K (K is an integer of 1 or more) optical amplifiers 560 are different. FIG. 22 shows the case of K=2. If K≥3, some of the plurality of optical amplifiers 560 may have the same gain. One optical signal may be amplified by any one of the optical amplifiers 560 or may be amplified by a plurality of optical amplifiers 560.

The storage 1172 of the management control device 1170 stores second selection information in which transmission distance is associated with an optical amplification gain or optical amplifier information. The optical amplifier information is the same as the optical amplifier information included in the second parameter table and indicates available optical amplifiers 560. The selector 1174 receives information on the transmission distance between the subscriber device 1120 that outputs the optical signal and the subscriber device 1120 that receives the optical signal from the subscriber device 1120. The selector 1174 reads the optical amplification gain or optical amplifier information corresponding to the transmission distance from the second selection information stored in the storage 1172. When the optical amplification gain is read, the selector 1174 selects the optical amplifier 560 with the optical amplification gain. When the optical amplifier information is read, the selector 1174 selects the optical amplifier 560 to be used among the optical amplifiers 560 indicated by the read optical amplifier information. The number of optical amplifiers 560 to be selected may be one, or two or more.

The optical communication system 1210 performs an operation similar to the operation of the optical communication system 1110 of the ninth embodiment shown in FIG. 16, except for the following points. That is, in step S1108, the selector 1174 of the management control device 1170 determines the optical amplifier 560 to be used for the optical signal from the subscriber device 1120$a$-1 to the subscriber device 1120$b$-1 based on the transmission distance information notified from the subscriber device 1120$a$-1. Specifically, the selector 1174 reads the optical amplification gain corresponding to the transmission distance information from the second selection information, and selects the optical amplifier 560 with the read optical amplification gain. When the selector 1174 reads the optical amplifier information corresponding to the transmission distance information from the second selection information, the selector 1174 selects the optical amplifier 560 to be used from the optical amplifiers 560 indicated by the read optical amplifier information. Here, it is assumed that the optical amplifier 560-1 is selected.

In step S1109, the port connection determiner 1175 determines the port connection relationship between the input port 131 and the output port 132 of the optical SW 130$a$ connected to the optical amplifier 560-1 so that the optical signal from the subscriber device 1120$a$-1 to the subscriber device 1120$b$-1 passes through the optical amplifier 560-1 selected by the selector 1174. In other words, the port connection determiner 1175 determines the port connection of the path P2 in the optical SW 130$a$ so that the optical signal input from the input port 131 connected to the subscriber device 1120$a$-1 is output to the output port 132 connected to the optical amplifier 560-1. Further, the port connection determiner 1175 determines the port connection relationship of the path P3 in the optical SW 130$a$ so that the optical signal input from the input port 131 connected to the optical amplifier 560-1 is output to the output port 132 connected to the first port corresponding to the wavelength λ1u of the wavelength multiplexer/demultiplexer 140a-1.

In step S1112, when the subscriber device 1120a-1 and the subscriber device 1120b-1 start communication of the main signal, the optical signal of the wavelength Au transmitted from the subscriber device 1120a-1 passes through the optical SW 130a, the optical amplifier 560-1 and the optical SW 130a in order, and then, the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

Further, the optical signal between the subscriber devices 1120 may pass through a plurality of optical amplifiers 560. In this case, the combination of optical amplifiers 560 to be used is set in the optical amplifier information. Thus, for example, in step S1108, the selector 1174 selects the optical amplifier 560-1 and the optical amplifier 560-2 for the optical signal from the subscriber device 1120a-1 to the subscriber device 1120b-1. In this case, the port connection determiner 1175 determines the port connection relationship of the optical SW 130a in the same manner as when the optical amplifiers 560-1 and 560-2 are selected in the fifth embodiment.

Further, as in the ninth embodiment, in step S1108, the selector 1174 of the management control device 1170 may extract a plurality of candidates for the available optical amplifier 560, and select the optical amplifier 560 among the candidates. When the selector 1174 receives a reception abnormality such as communication quality being lower than a predetermined value from the subscriber device 1120, the selector 1174 selects an unselected optical amplifier 560 among the candidates, and performs the processing after step S1109.

As shown in FIG. 10, the optical communication system 1210 may insert a wavelength multiplexer/demultiplexer 440a-k-1 and a wavelength multiplexer/demultiplexer 440a-k-2 between the optical SW 130a and the optical amplifier 560-k.

The optical communication system 1210 may include the quality compensator 860 of the eighth embodiment instead of the optical amplifier 560. In this case, the storage 1172 stores the third selection information that associates the transmission distance with available quality compensators 860. The selector 1174 of the management control device 1170 determines the quality compensator 860 to be used for the optical signal from the subscriber device 1120a-1 to the subscriber device 1120b-1 from the third selection information based on the transmission distance information notified from the subscriber device 1120a-1.

The second selection information may be information in which the transmission distance and signal parameters are associated with an amplification gain or optical amplifier information. In this case, the selector 1174 selects the optical amplifier 560 based on the amplification gain or optical amplifier information corresponding to the transmission distance and the signal parameters allocated to the subscriber device 1120. Similarly, the third selection information may be third selection information that associates the transmission distance and signal parameters with available quality compensators 860. The selector 1174 selects the quality compensator 860 set in the third selection information corresponding to the transmission distance and the signal parameter allocated to the subscriber device 1120.

Eleventh Embodiment

The optical communication system of the present embodiment has a plurality of dispersion compensators with different dispersion amounts and a plurality of optical amplifiers with different gains. The present embodiment will be described focusing on differences from the ninth and tenth embodiments.

Figure 23:
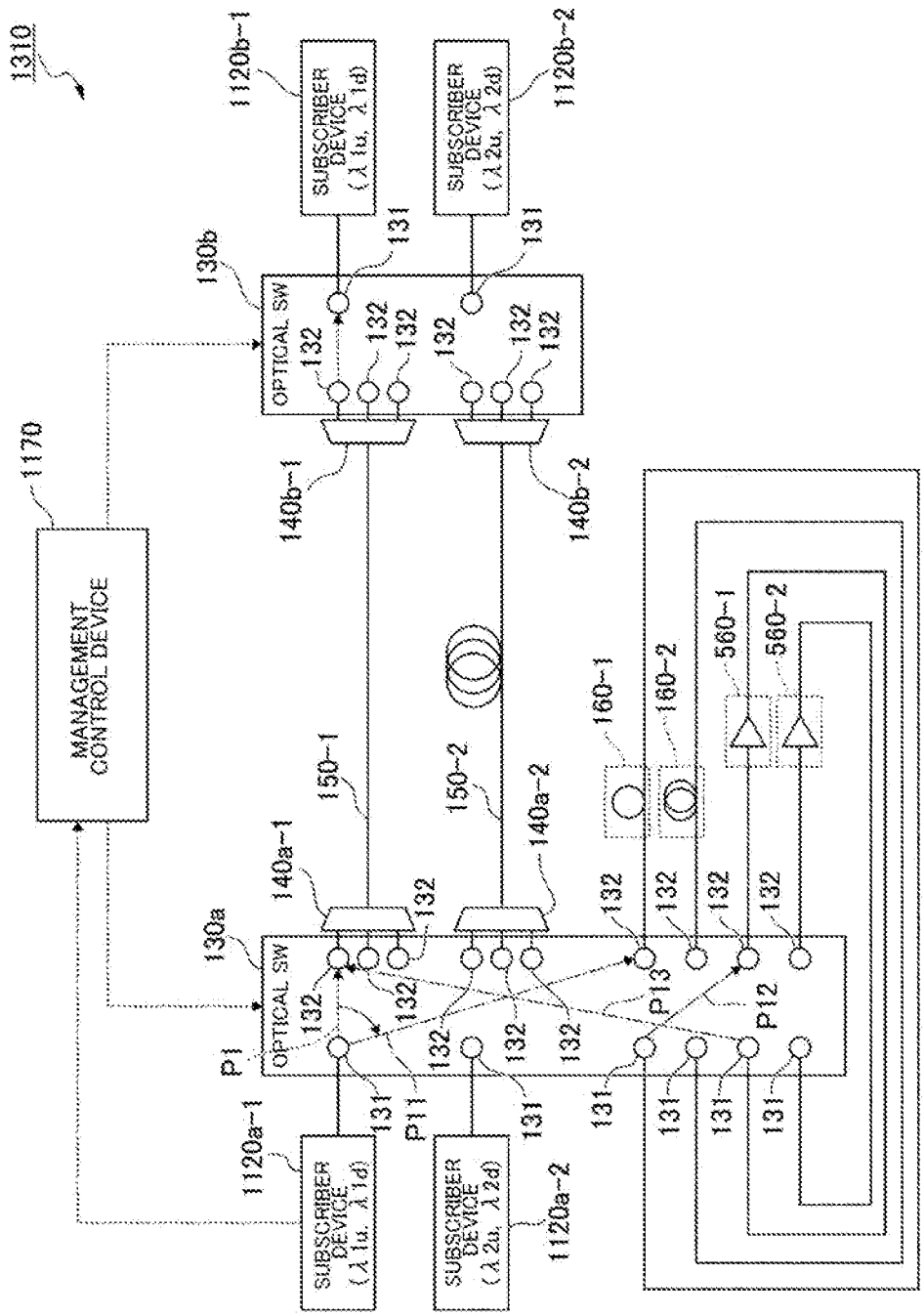
FIG. 23 is a diagram showing the configuration of an optical communication system according to an eleventh embodiment.

FIG. 23 is a diagram showing the configuration of an optical communication system 1310 according to the eleventh embodiment. The optical communication system 710 shown in FIG. 23 is different from the optical communication system 1110 shown in FIG. 14 in that it further includes the optical amplifier 560 of the tenth embodiment shown in FIG. 22. Some of the input ports 131 and some of the output ports 132 of the optical SW 130a are connected to the optical amplifiers 560-1 to 560-K via an optical transmission path. FIG. 23 shows the case of K=2 as an example.

The storage 1172 of the management control device 1170 stores the first selection information and the second selection information. The storage 1172 may store fourth selection information that integrates the first selection information and the second selection information.

The optical communication system 1310 operates similarly to the optical communication system 1110 of the ninth embodiment, except for the following points. That is, in step S1108 of FIG. 16, the selector 1174 of the management control device 1170 selects the dispersion compensator 160 to be used based on the transmission distance information notified from the subscriber device 1120a-1 and the first selection information stored in the storage 1172, as in the first embodiment. Furthermore, as in the tenth embodiment, the selector 1174 selects the optical amplifier 560 to be used based on the transmission distance information notified from the subscriber device 1120a-1 and the second selection information stored in the storage 1172. Note that the selector 1174 may use the fourth selection information instead of the first selection information and the second selection information. Here, it is assumed that the dispersion compensator 160-1 and the optical amplifier 560-1 are selected.

In step S1109, the port connection determiner 1175 determines the port connection relationship between the input port 131 and the output port 132 of the optical SW 130a connected to the optical amplifier 560-1 so that the optical path from the subscriber device 1120a-1 to the subscriber device 1120b-1 passes through the dispersion compensator 160-1 and the optical amplifier 560-1 selected by the selector 1174. In other words, the port connection determiner 1175 determines the port connection relationship of the path P11 so that the optical signal input from the input port 131 connected to the subscriber device 120a-1 is output to the output port 132 connected to the dispersion compensator 160-1. Further, the port connection determiner 1175 determines the port connection relationship of the path P12 so that the optical signal input from the input port 131 connected to the dispersion compensator 160-1 is output to the output port 132 connected to the optical amplifier 560-1. Furthermore, the port connection determiner 1175 determines the port connection relationship of the path P13 so that the optical signal input from the input port 131 connected to the optical amplifier 560-1 is output to the output port 132 connected to the first port corresponding to the wavelength λ1u of the wavelength multiplexer/demultiplexer 140a-1.

In step S1112, when the subscriber device 1120a-1 and the subscriber device 1120b-1 start communicating the main signal, the optical signal of the wavelength λ1u transmitted from the subscriber device 1120a-1 passes through the optical SW 130a, the dispersion compensator 160-1, the optical SW 130a, the optical amplifier 560-1, and the optical SW 130a in this order, and then, the optical signal is input to the optical transmission path 150-1 via the wavelength multiplexer/demultiplexer 140a-1. The optical signal input from the optical transmission path 150-1 to the optical SW 130b via the wavelength multiplexer/demultiplexer 140b-1 is output to the subscriber device 120b-1.

The signal between the subscriber devices 1120 may pass through a plurality of dispersion compensators 160 and may pass through a plurality of optical amplifiers 560. The port connection determiner 1175 determines the port connection relationship of the optical SW 130 so as to pass through the one or more dispersion compensators 160 and the one or more optical amplifiers 560 selected by the selector 1174, as in the above-described embodiment.

Depending on the transmission distance, the port connection determiner 1175 may connect the input port and the output port of the optical SW 130a so as not to pass through one or both of the dispersion compensator 160 and the optical amplifier 560. As shown in FIG. 6 or 10, the optical communication system 1310 may insert a wavelength multiplexer/demultiplexer 440a-k-1 and a wavelength multiplexer/demultiplexer 440a-k-2 between the optical SW 130a and the dispersion compensator 160-k, and may insert the wavelength multiplexer/demultiplexer 440a-k-1 and the wavelength multiplexer/demultiplexer 440a-k-2 between the optical SW 130a and the optical amplifier 560-K.

Twelfth Embodiment

In the twelfth embodiment, a subscriber device is provided with a dispersion compensator. The present embodiment will be described focusing on differences from the above-described ninth to eleventh embodiments.

Figure 24:
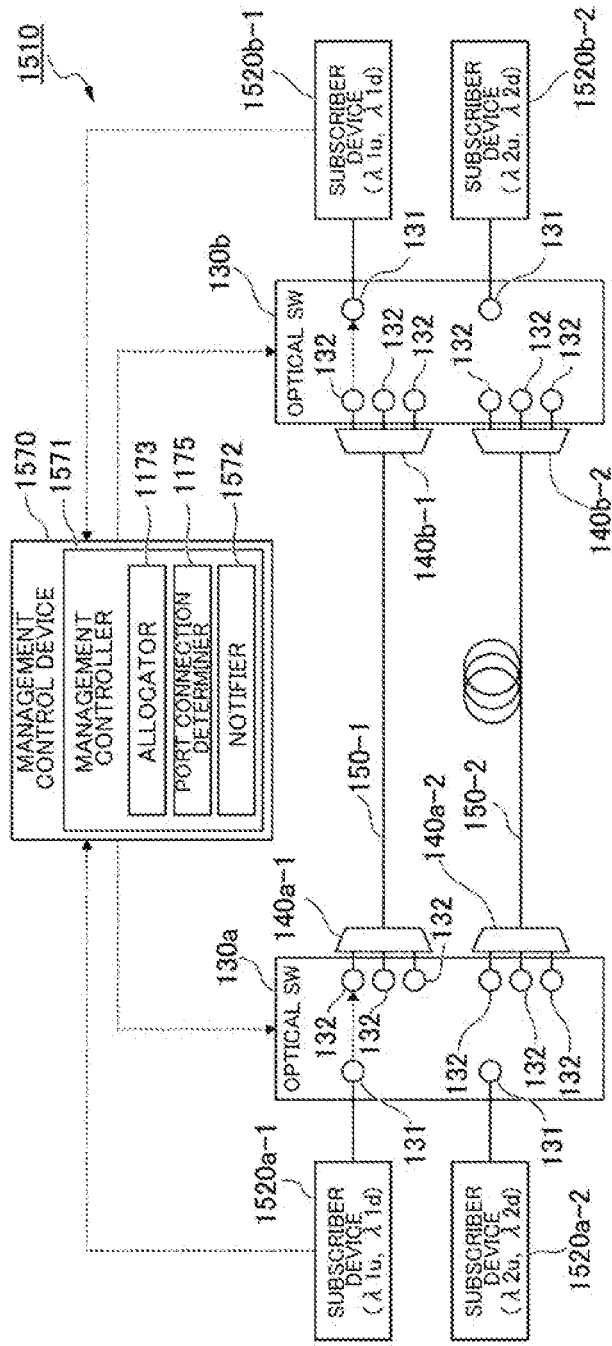
FIG. 24 is a diagram showing the configuration of an optical communication system according to a twelfth embodiment.

FIG. 24 is a diagram showing the configuration of an optical communication system 1510 according to the twelfth embodiment. The optical communication system 1510 shown in FIG. 24 is different from the optical communication system 1110 shown in FIG. 14 in that a subscriber device 1520 and a management control device 1570 are provided instead of the subscriber device 1120 and the management control device 1170, respectively, and the optical SW 130 is not connected to the dispersion compensator 160.

The management control device 1570 has a management controller 1571. The management controller 1571 has an allocator 1173, a port connection determiner 1175, and a notifier 1572. The notifier 1572 notifies the communication destination subscriber device 1520 of the notification source subscriber device 1520 of the transmission distance information notified from the subscriber device 1520 to. In addition, the notifier 1572 notifies the optical SW 130 of the port connection relationship determined by the port connection determiner 1175.

Figure 25:
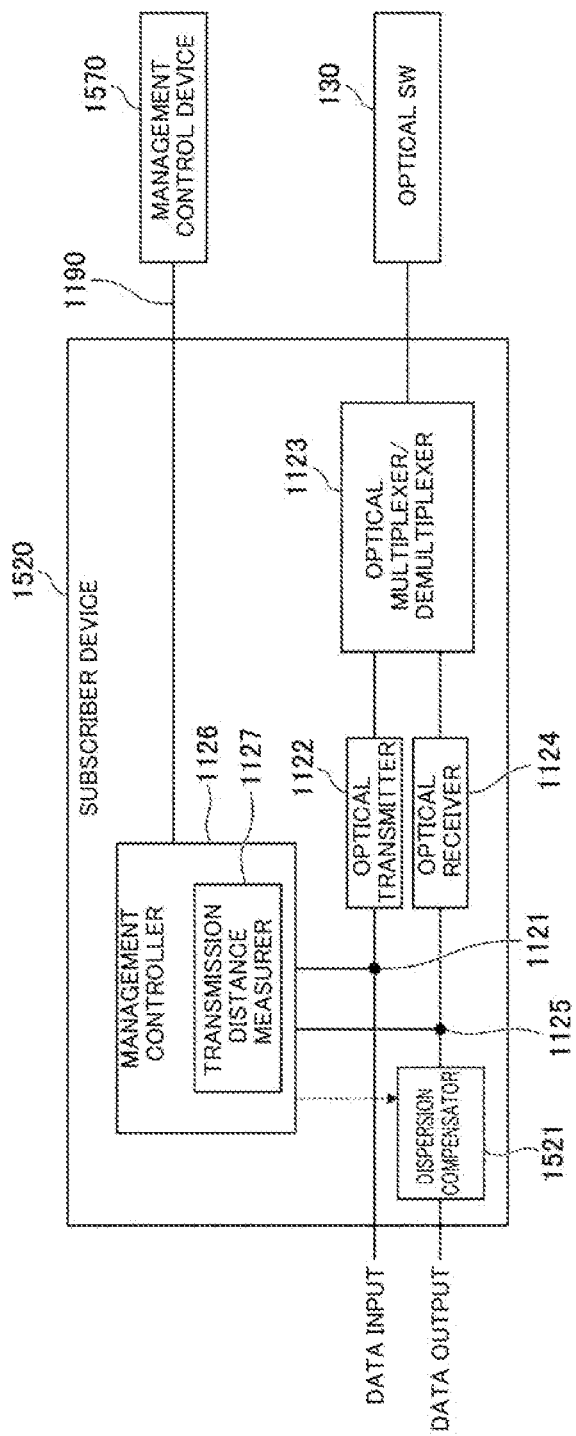
FIG. 25 is a diagram showing the configuration of a subscriber device according to the embodiment.
Figure 26:
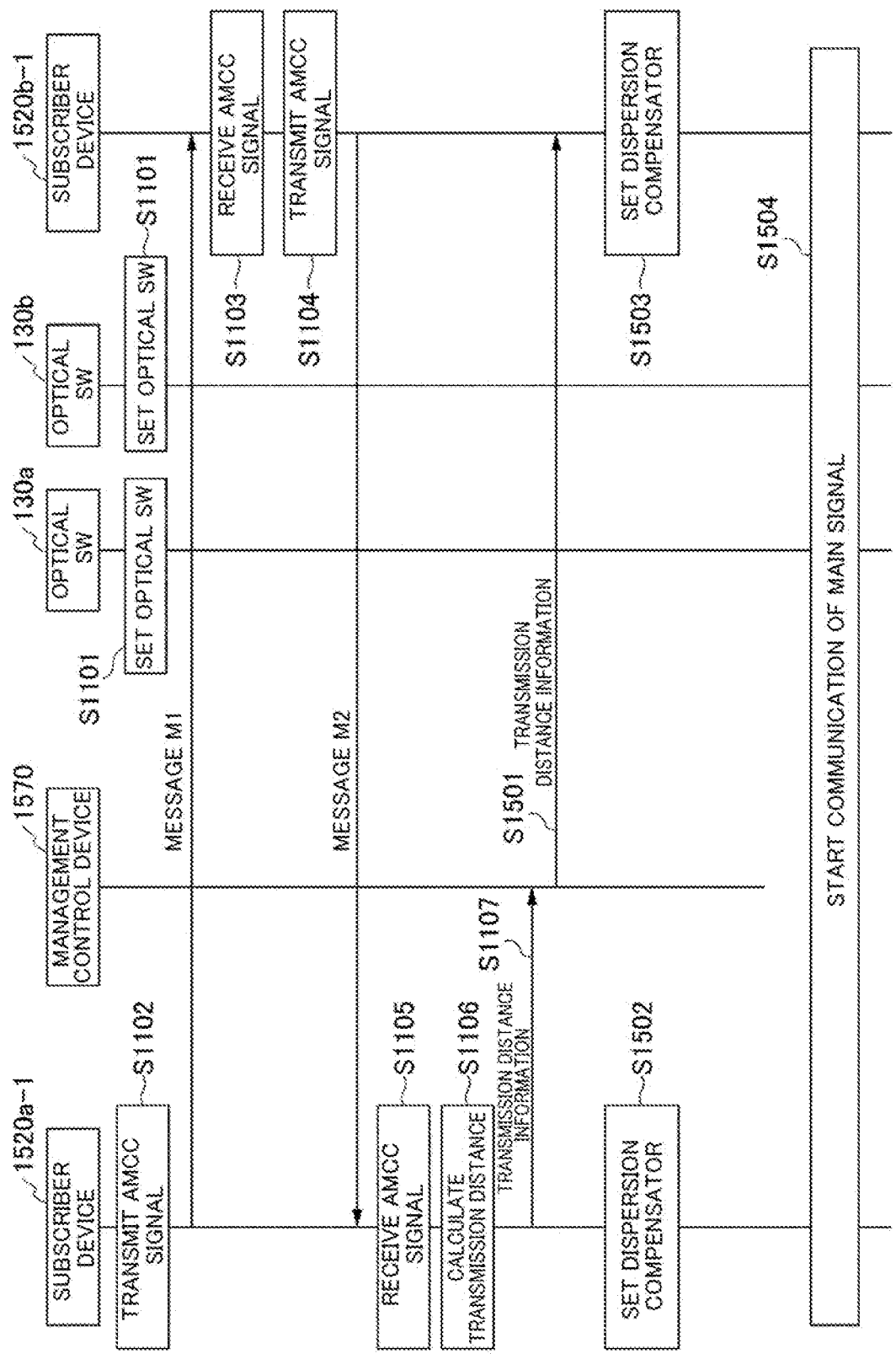
FIG. 26 is a sequence diagram showing the operation of setting a dispersion compensation function of the optical communication system according to the embodiment.

FIG. 25 is a diagram showing the configuration of the subscriber device 1520. The subscriber device 1520 shown in FIG. 26 is different from the subscriber device 1120 of the ninth embodiment shown in FIG. 15 in that it further includes a dispersion compensator 1521. The dispersion compensator 1521 performs dispersion compensation in the electric stage. The dispersion compensator 1521 is a time domain equalizer (TDE) or a frequency domain equalizer (FDE) implemented using digital signal processing (DSP). Both TDE and FDE implement dispersion compensation by using equalization coefficients obtained from the transfer function of chromatic dispersion.

FIG. 26 is a sequence diagram showing the dispersion compensation function setting operation of the optical communication system 1510. In this figure, the same reference numerals are assigned to the same operations as those of the optical communication system 1110 of the ninth embodiment shown in FIG. 16, and the detailed description thereof will be omitted.

First, the optical communication system 1510 performs the same processing as steps S1101 to S1107 in FIG. 16. That is, the optical communication system 1510 connects the input port and the output port of each of the optical SW 130a and the optical SW 130b so that an optical path between the subscriber device 1520a-1 and the subscriber device 1520b-1 is set. The subscriber device 1520a-1 transmits a message M1 in the AMCC signal. The subscriber device 1520b-1 receives the message M1 and transmits a message M2 of the AMCC signal. Upon receiving the message M2, the transmission distance measurer 1127 of the subscriber device 1520a-1 calculates the transmission distance between the subscriber device 1520a-1 and the subscriber device 1520b-1. The transmission distance measurer 1127 of the subscriber device 1520a-1 transmits the transmission distance information indicating the calculated transmission distance to the management control device 1570, and notifies the dispersion compensator 1521 of the electric stage of the transmission distance information.

The notifier 1572 of the management control device 1570 notifies the dispersion compensator 1521 of the electric stage of the subscriber device 1520b-1 of the received transmission distance information (step S1501). The dispersion compensator 1521 of the subscriber device 1520a-1 and the dispersion compensator 1521 of the subscriber device 1520b-1 set equalization coefficients so that the dispersion compensation amount required for the received transmission distance information is obtained (step S1502, step S1503). After setting of the dispersion compensator 1521 of the subscriber device 1520a-1 and the dispersion compensator 1521 of the subscriber device 1520b-1 is finished, the transmission/reception of the main signal is started between the subscriber device 1520a-1 and the subscriber device 1520b-1 (step S1504).

According to the present embodiment, the transmission distance can be calculated by the RTT measurement using the low-rate management control signal without lowering the throughput of the main signal. In addition, the optical communication system starts high-rate main signal communication after setting the dispersion compensator of the electric stage according to the transmission distance. This makes it possible to obtain desired reception sensitivity for high-rate main signals.

Thirteenth Embodiment

In the thirteenth embodiment, the quality of the transmission path between the subscriber device and the optical SW is compensated. The present embodiment will be described focusing on differences from the above-described embodiments.

Figure 27:
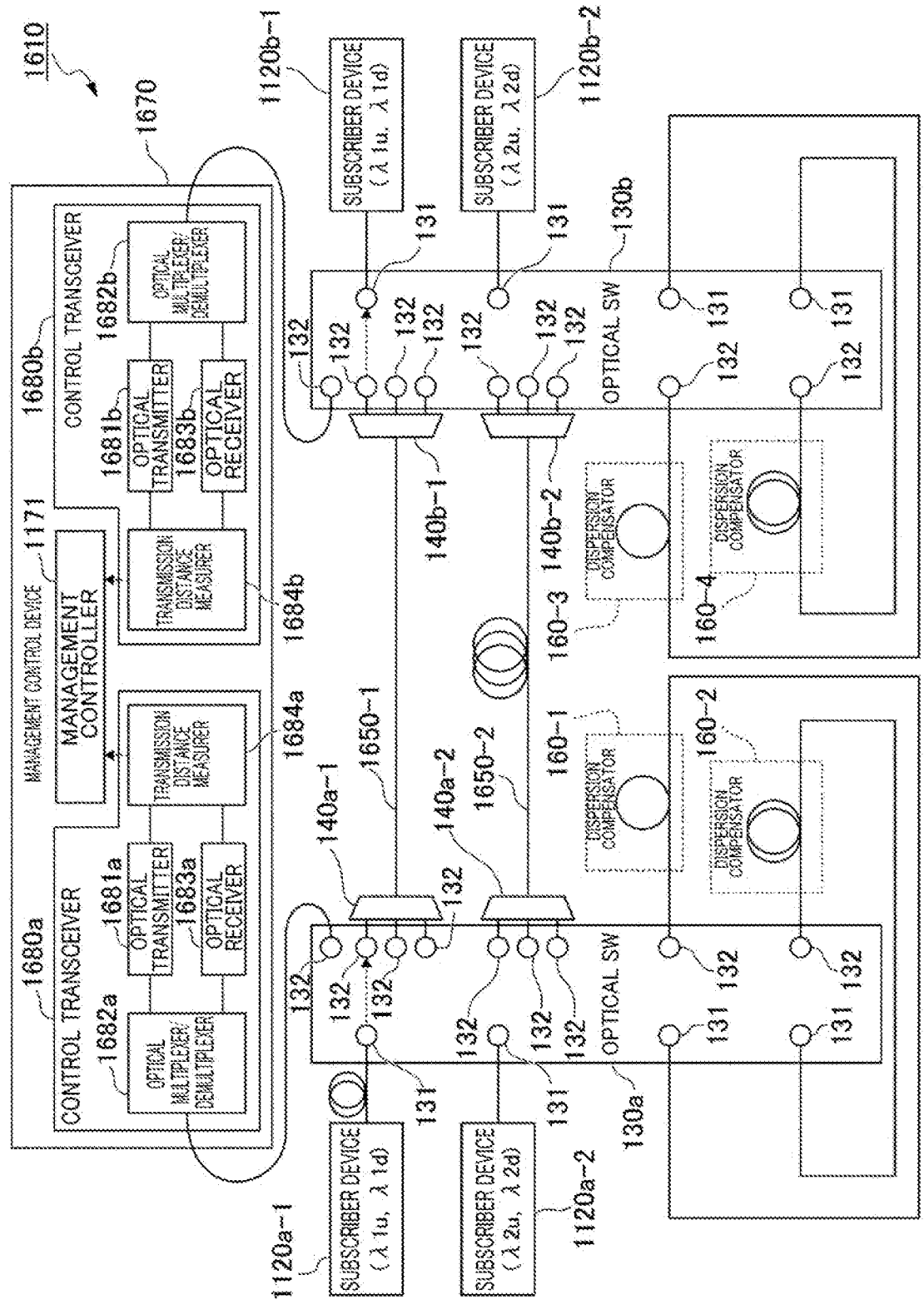
FIG. 27 is a diagram showing the configuration of an optical communication system according to a thirteenth embodiment.

FIG. 27 is a diagram showing the configuration of an optical communication system 1610 according to the thirteenth embodiment. The optical communication system 1610 shown in FIG. 27 is different from the optical communication system 1110 shown in FIG. 14 in that a management control device 1670 and an optical transmission path 1650-n are provided instead of the management control device 1170 and the optical transmission path 150-n, respectively, and the optical SW 130b is connected to the dispersion compensator 160. Each of the optical SW 130a and the optical SW 130b is connected to a plurality of types of dispersion compensators 160. Two dispersion compensators

160 connected to the optical SW 130*b* are described as dispersion compensators 160-3 and 160-4.

Since the optical transmission path 1650-*n* has a chromatic dispersion compensation function that makes the cumulative chromatic dispersion value zero, no dispersion compensation is required. Alternatively, it is assumed that the management controller 1171 knows in advance the transmission path length of the optical transmission path 1650-*n*.

The management control device 1670 has one or more control transceivers 1680 and a management controller 1171. The control transceivers 1680 are connected to the output ports 132 of the optical SWs 130. A subscriber device 1120 connects to the control transceiver 1680 before starting communication with the opposing subscriber device 1120. The control transceiver 1680 transmits/receives an AMCC signal to/from the subscriber device 1120 and measures the transmission path length between the subscriber device 1120 and the optical SW 130.

The control transceiver 1680 includes an optical transmitter 1681, an optical multiplexer/demultiplexer 1682, an optical receiver 1683, and a transmission distance measurer 1684. The optical transmitter 1681, the optical multiplexer/demultiplexer 1682, the optical receiver 1683, and the transmission distance measurer 1684 have the same functions as the optical transmitter 1122, the optical multiplexer/demultiplexer 1123, the optical receiver 1124, and the transmission distance measurer 1127 of the subscriber device 1120, respectively. The control transceiver 1680 connected to the output port 132 of the optical SW 130*x* is described as a control transceiver 1680*x*, and the optical transmitter 1681, the optical multiplexer/demultiplexer 1682, the optical receiver 1683, and the transmission distance measurer 1684 of the control transceiver 1680*x* are described as an optical transmitter 1681*x*, an optical multiplexer/demultiplexer 1682*x*, an optical receiver 1683*x*, and a transmission distance measurer 1684*x*, respectively.

Figure 28:
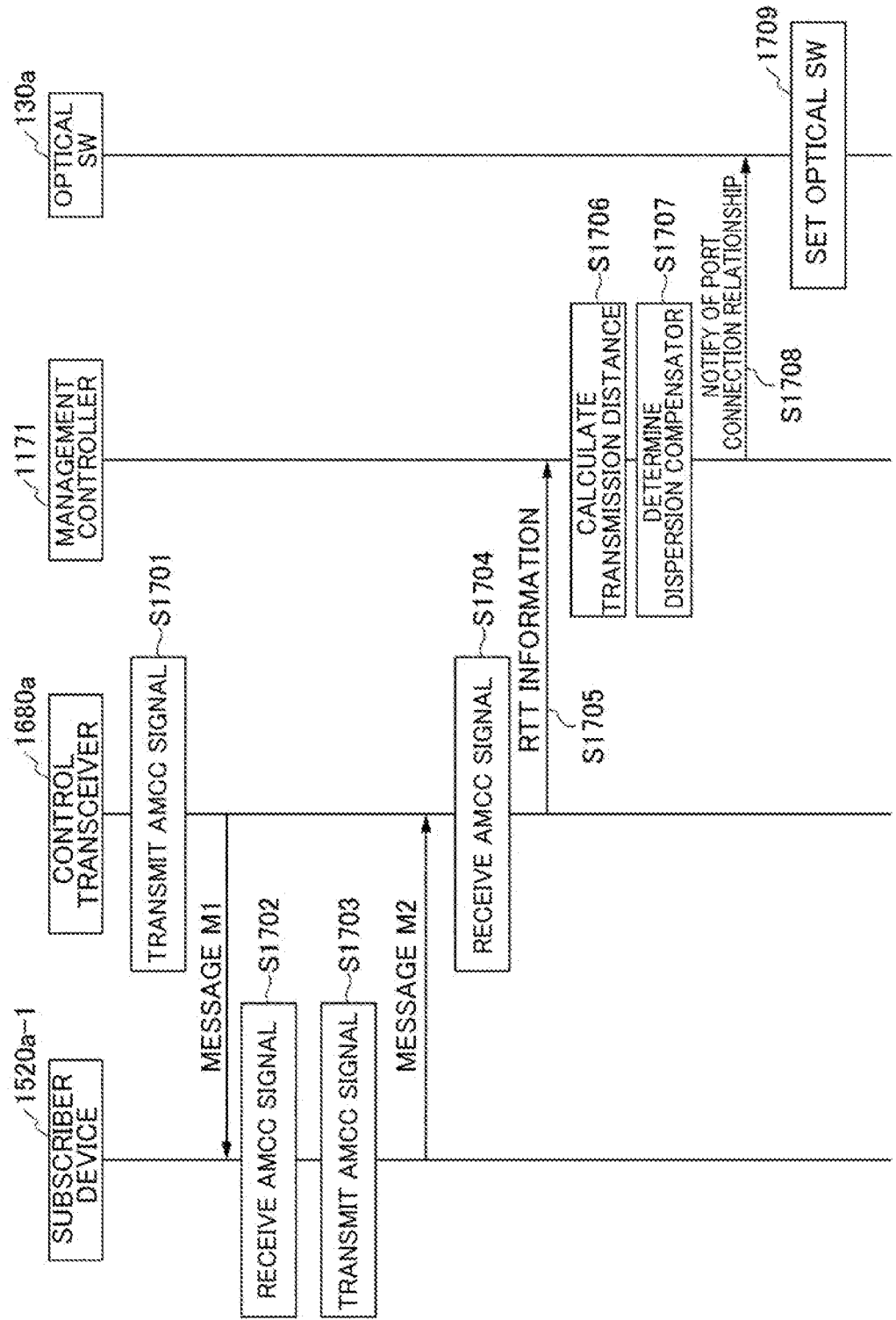
FIG. 28 is a sequence diagram showing the operation of selecting a dispersion compensator in the optical communication system according to the embodiment.

FIG. 28 is a sequence diagram showing the dispersion compensator selection operation of the optical communication system 1610. FIG. 28 shows the case of x=a as an example. In the optical SW 130*x*, the port connection relationship is set such that the optical signal of the reception wavelength of the subscriber device 1120*x*-1, input from the output port 132 connected to the control transceiver 1680*x* is output to the input port 131 connected to the subscriber device 1120*x*-1. Further, in the optical SW 130*x*, the port connection relationship is set such that the optical signal of the transmission wavelength of the subscriber device 1120*x*-1, input from the input port 131 connected to the subscriber device 1120*x*-1 is output to the output port 132 connected to the control transceiver 1680*x*.

The same processing as steps S1102 to S1106 shown in FIG. 16 is performed between the control transceiver 1680*x* and the subscriber device 1120*x*-1. That is, the control signal output by the transmission distance measurer 1684*x* of the control transceiver 1680*x* is superimposed on the optical signal of the reception wavelength of the subscriber device 1120*x*-1 as an AMCC signal by the optical transmitter 1681*x*. The optical multiplexer/demultiplexer 1682*x* transmits a message M1 in which an AMCC signal is set (step S1701). For x=a, the received wavelength is λ1d. The optical SW 130*x* outputs the message M1 transmitted from the control transceiver 1680*x* to the subscriber device 1120*x*-1.

The subscriber device 1120*x*-1 receives the AMCC signal superimposed on the message M1 (step S1702). The subscriber device 1120*x*-1 transmits a message M2 in which an AMCC signal is set (step S1703). The wavelength of the message M2 is the transmission wavelength of the subscriber device 1120*x*-1. For x=a, the transmission wavelength is λ1u. The optical SW 130*x* outputs the message M2 sent from the subscriber device 1120*x*-1 to the control transceiver 1680*x*. The optical multiplexer/demultiplexer 1682*x* of the control transceiver 1680*x* outputs the received message M2 to the optical receiver 1683*x*. The optical receiver 1683*x* converts the message M2 from an optical signal to an electric signal. The transmission distance measurer 1684*x* receives the AMCC signal superimposed on the electric signal message M2 (step S1704).

The transmission distance measurer 1684*x* of the control transceiver 1680*x* calculates the RTT between the subscriber device 1120*x*-1 and the control transceiver 1680*x* using the received AMCC signal, as in the ninth embodiment. The transmission distance measurer 1684*x* outputs RTT information indicating the calculated RTT to the management controller 1171 (step S1705). The selector 1174 of the management controller 1171 calculates the transmission distance between the subscriber device 1120*x*-1 and the control transceiver 1680*x* using the RTT indicated by the RTT information. If the distance between the control transceiver 1680*x* and the optical SW 130*x* is short, the selector 1174 sets the calculated transmission distance as the distance between the subscriber device 1120*x*-1 and the optical SW 130*x* (step S1706).

As in the ninth embodiment, the selector 1174 of the management controller 1171 calculates the dispersion compensation amount necessary for the transmission distance and determines the dispersion compensator 160 to be used (step S1707). The port connection determiner 1175 determines the port connection relationship between the input port 131 and the output port 132 of the optical SW 130*x* so that the optical signal from the subscriber device 1120*x*-1 to the communication destination subscriber device 1120*x'*-1 passes through the dispersion compensator 160 selected by the selector 1174. Note that x'=b when x=a and x'=a when x=b. The notifier 1176 notifies the optical SW 130*x* of the port connection relationship of the optical SW 130*x* determined by the selector 1174 (step S1708). The optical SW 130*x* connects the input port 131 and the output port 132 according to the port connection relationship notified in step S1708 (step S1709).

Figure 29:
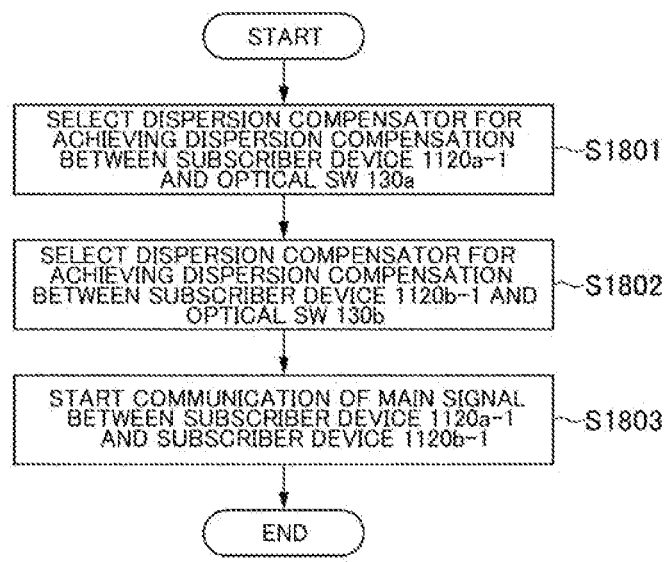
FIG. 29 is a flowchart showing processing up to main signal conduction between subscriber devices in the optical communication system according to the embodiment.

FIG. 29 is a flow diagram showing processing up to main signal conduction between the subscriber device 1120*a*-1 and the subscriber device 1120*b*-1 of the optical communication system 1610. First, the optical communication system 1610 to selects the dispersion compensator 160 for achieving dispersion compensation between the subscriber device 1120*a*-1 and the optical SW 130*a* using the sequence shown in FIG. 28 (step S1801). Subsequently, the optical communication system 1610 selects the dispersion compensator 160 for achieving dispersion compensation between the subscriber device 1120*b*-1 and the optical SW 130*b* using the sequence shown in FIG. 28 (step S1802). Finally, the optical communication system 1610 starts main signal communication between the subscriber device 1120*a*-1 and the subscriber device 1120*b*-1.

Figure 30:
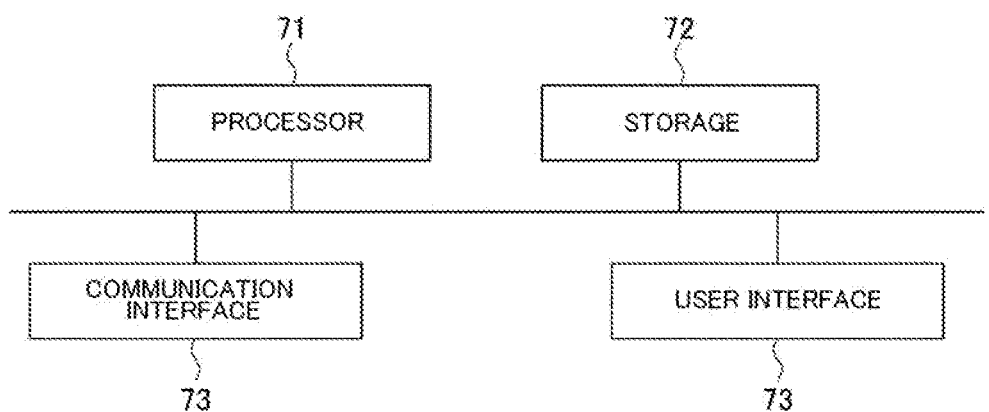
FIG. 30 is a diagram showing a hardware configuration of a management control device according to the first to eighth embodiments.
Figure 31:
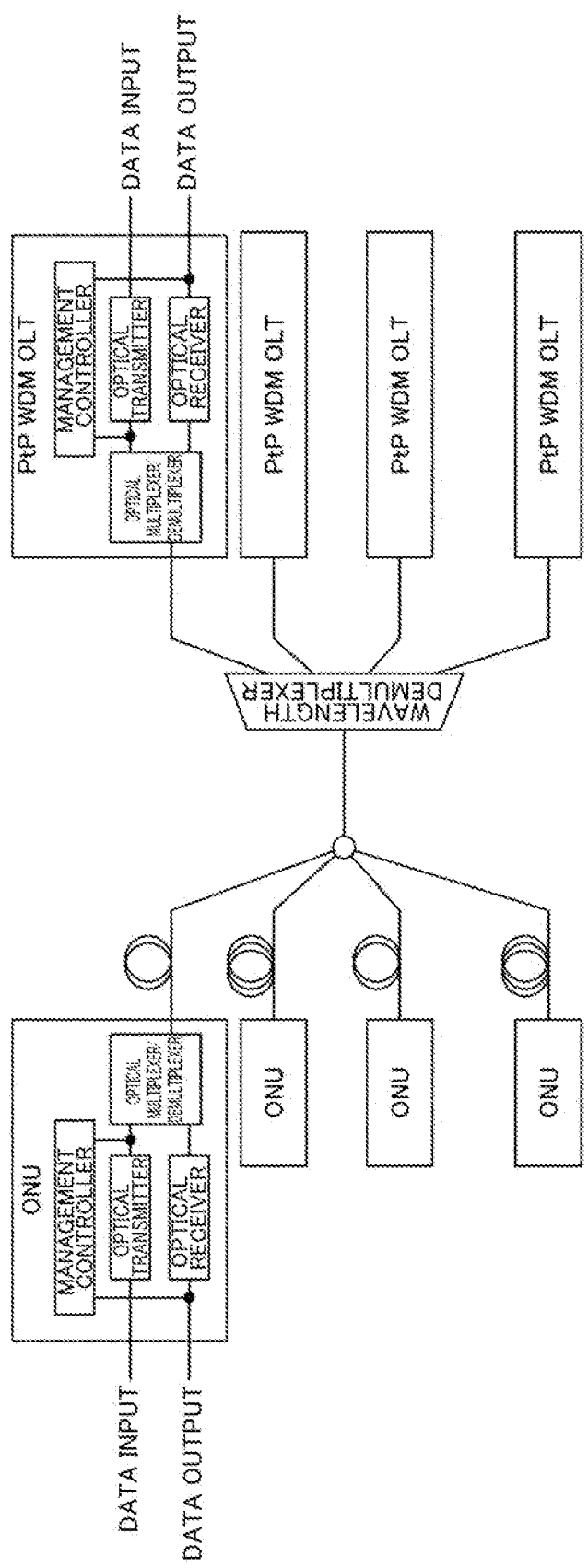
FIG. 31 is a diagram showing the configuration of a conventional PtP WDM-PON system.
Figure 32:
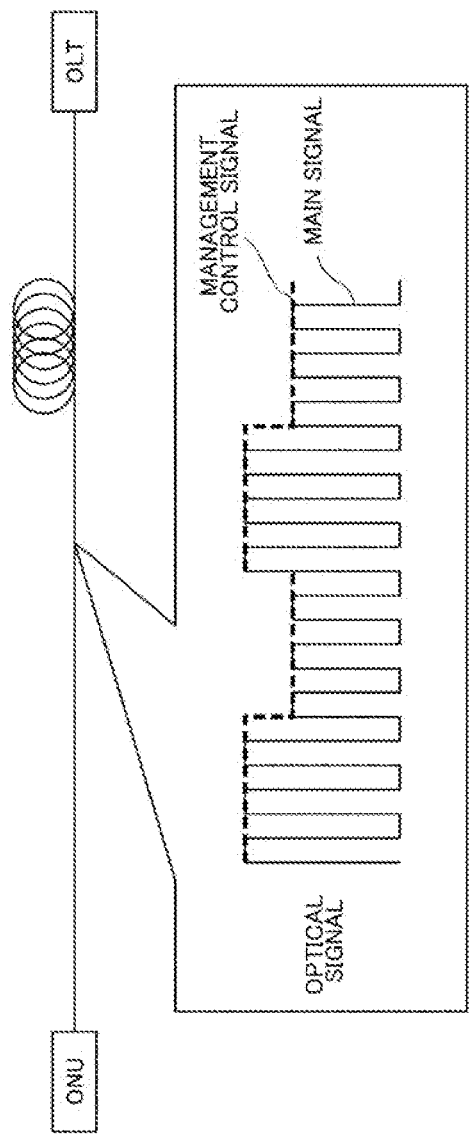
FIG. 32 is a diagram showing a conventional optical signal.

A hardware configuration example of the management controller 171 included in the management control device 170 will be described. FIG. 30 is a device configuration diagram showing a hardware configuration example of the management control device 170. The management control device 170 includes a processor 71, a storage 72, a communication interface 73 and a user interface 74.

The processor 71 is a central processing unit that performs calculations and controls. The processor 71 is, for example, a CPU. The processor 71 implements the function of the management controller 171 by reading the program from the storage 72 and executing the program. The storage 72 further has a work area and the like used when the processor 71 executes various programs. The communication interface 73 is for communicably connecting with other devices. The user interface 74 is an input device such as a keyboard, a pointing device (mouse, tablet, or the like), buttons, and a touch panel, and a display device such as a display. The user interface 74 is used to input an artificial operation.

All or some of the functions of the management control device 170 may be implemented using hardware such as an ASIC (Application Specific Integrated Circuit), a PLD (Programmable Logic Device), an FPGA (Field Programmable Gate Array), or the like.

The hardware configuration example of the management controller 1171 of the management control device 1170, the management control device 1571 of the management control device 1570, and the management controller 1171 of the management control device 1670 is the same as in FIG. 30. The processor 71 reads and executes the program from the storage 72 to realize the functions of the management controller 1171 of the management control device 1170, the management control device 1571 of the management control device 1570, and the management controller 1171 of the management control device 1670.

According to the first to eighth embodiments described above, even in an optical communication system in which a plurality of types of transmission path states and signal parameters can be selected, one or both of optimal dispersion compensation and optical amplification can be performed, and desired reception sensitivity can be obtained.

In the first to eighth embodiments, a parameter table in which information of the quality compensator corresponding to the signal parameter value is set is prepared in advance for each combination of transmitting and receiving subscriber devices. The optical communication system selects a quality compensator based on this parameter table. Therefore, it is possible to perform quality compensation that flexibly copes with a plurality of types of transmission path states. Quality compensation is performed by one or both of dispersion compensation and optical amplification. For example, the present invention is suitable for application to APNs in which an allowable dispersion value or loss is different for each subscriber device.

Further, according to the ninth to thirteenth embodiments described above, the transmission distance can be calculated by the RTT measurement using the low-rate management control signal without lowering the throughput of the main signal. In addition, by starting communication of the high-rate main signal after selecting the dispersion compensator and the optical amplifier according to the calculated transmission distance, it is possible to obtain desired reception sensitivity for the high-rate main signal.

According to the embodiments described above, the optical communication system includes an optical switch, a plurality of quality compensators, and a controller. The optical switch has a plurality of ports. The optical switch outputs an optical signal input from one of the ports from another port. The quality compensator compensates for the quality of the optical signal output from the optical switch, and inputs the quality-compensated optical signal to the optical switch. The controller has a selector and an instructor. The controller corresponds to the management controllers 171, 1171, and 1571 of the embodiment. The selector selects a quality compensator that performs quality compensation according to the degree of quality deterioration of the optical signal input from a predetermined port of the optical switch when the optical signal is transmitted through a transmission path among the plurality of quality compensators. The instructor instructs the optical switch so that the optical signal, in which quality is compensated by the selected quality compensator through the optical signal input from a predetermined port being output to the quality compensator selected by the selector, is output from a port corresponding to a transmission destination of the optical signal. The instructor corresponds to the port connection determiner 175 and the notifier 176, the port connection determiner 1175 and the notifier 1176, and the port connection determiner 1175 and the notifier 1572 of the embodiments.

The controller may further include an allocator that allocates a wavelength and a transmission paths used for an optical signal from the subscriber device to the transmission destination in response to a request from the subscriber device. The selector selects a quality compensator that performs compensation according to the degree of quality deterioration of the optical signal of an allocated wavelength when the optical signal is transmitted through the allocated transmission path among a plurality of quality compensators connected to the optical switch. The instructor outputs the optical signal of the allocated wavelength input from the port connected to the subscriber device to the quality compensator selected by the selector. The instructor instructs the optical switch so that the optical signal quality-compensated by the selected quality compensator is output from the port connected to the transmission path allocated by the allocator.

For example, the selector selects a quality compensator that performs quality compensation according to the degree of quality deterioration allowed for an optical signal input from a port connected to the subscriber device among a plurality of quality compensators connected to the optical switch. The degree of quality deterioration allowed for an optical signal is one or both of the resource used for transmission of the optical signal and the value of a signal parameter used in an optical signal transmitter to control the characteristics of the optical signal. The resource includes the optical transmission path 150, a wavelength, a device that relays optical signals, and the like. The device that relays optical signals is, for example, the optical SW 130, the wavelength multiplexer/demultiplexer 140, and the like. The optical signal transmitter is, for example, the subscriber device 120. The characteristics of the optical signal are, for example, a modulation method, a baud rate, and light intensity. The quality compensator performs one or both of dispersion compensation of the optical signal and amplification of the optical signal.

For example, the degree of quality deterioration of an optical signal when the optical signal is transmitted through a transmission path corresponds to the length of the transmission path. The instructor selects, among the plurality of quality compensators, a quality compensator that performs quality compensation of the optical signal based on the length of a transmission path through which the optical signal input from the predetermined port of the optical switch is transmitted. The length of the transmission path is estimated based on a round-trip time measured by transmitting and receiving an optical signal via a transmission path between the subscriber device and a communication destination device. The optical signal used for measuring the round-trip time is, for example, a control signal that is superimposed on the main signal and is slower than the main signal.

The instructor may select a plurality of candidates for the quality compensator that performs quality compensation of the optical signal based on the length of the transmission path through which the optical signal input from a predetermined port of the optical switch among a plurality of quality compensators and select the quality compensator that performs the quality compensation of the optical signal from the plurality of candidates. The instructor selects an unselected quality compensator among the plurality of candidates when the quality of the optical signal compensated by the selected quality compensator is lower than a predetermined value.

The selector may select two or more quality compensators for performing quality compensation among the plurality of quality compensators. The instructor controls the optical switch so that the optical signal, in which quality is compensated by all the selected quality compensators through the optical signal input from the predetermined port being sequentially output to the selected two or more quality compensators, is output from the port corresponding to the transmission destination of the optical signal.

Although the embodiments of the present invention have been described in detail with reference to the drawings, specific configurations are not limited to these embodiments, and design or the like made without departing from the gist of the present invention is also included in the scope of the present invention.

REFERENCE SIGNS LIST

71 Processor
72 Storage
73 Communication interface
74 User Interface
110 Optical communication system
120a-1 Subscriber device
120a-2 Subscriber device
120b-1 Subscriber device
120b-2 Subscriber device
131 Input port
132 Output port
140a-1 Wavelength multiplexer/demultiplexer
140a-2 Wavelength multiplexer/demultiplexer
140b-1 Wavelength multiplexer/demultiplexer
140b-2 Wavelength multiplexer/demultiplexer
150-1 Optical transmission path
150-2 Optical transmission path
160-1 Dispersion compensator
160-2 Dispersion compensator
160-3 Dispersion compensator
160-4 Dispersion compensator
170 Management control device
171 Management controller
172 Storage
173 Allocator
174 Selector
175 Port connection determiner
176 Notifier
210 Optical communication system
280a Wavelength separation filter
280b Wavelength separation filter
310 Optical communication system
380a Wavelength separation filter
380b Wavelength separation filter
410 Optical communication system
440a-1-1 Wavelength multiplexer/demultiplexer
440a-1-2 Wavelength multiplexer/demultiplexer
440a-2-1 Wavelength multiplexer/demultiplexer
440a-2-2 Wavelength multiplexer/demultiplexer
510 Optical communication system
560-1 Optical amplifier
560-2 Optical amplifier
610 Optical communication system
710 Optical communication system
810 Optical communication system
860-1 Quality compensator
860-2 Quality compensator
910 Optical communication system
920a-1 Subscriber device
920a-2 Subscriber device
920b-1 Subscriber device
920b-2 Subscriber device
921 Optical transmitter
922 Optical receiver
923 Optical multiplexer/demultiplexer
924 Management controller
931 Input port
932 Output port
940a-1 Wavelength multiplexer/demultiplexer
940a-2 Wavelength multiplexer/demultiplexer
940b-1 Wavelength multiplexer/demultiplexer
940b-2 Wavelength multiplexer/demultiplexer
950-1 Optical transmission path
950-2 Optical transmission path
970 Management control device
980a Transceiver
980b Transceiver
981a Transmitter
981b Transmitter
982a Receiver
982b Receiver
983-1 Fiber
983-2 Fiber
1110 Optical communication system
1111 Optical communication system
1120 Subscriber device
1120a-1 Subscriber device
1120a-2 Subscriber device
1120b-1 Subscriber device
1120b-2 Subscriber device
1121 Signal mixer
1122 Optical transmitter
1123 Optical multiplexer/demultiplexer
1124 Optical receiver
1125 Signal divider
1126 Management controller
1127 Transmission distance measurer
1170 Management control device
1171 Management controller
1172 Storage
1173 Allocator
1174 Selector
1175 Port connection determiner
1176 Notifier
1180 Control signal Extractor
1180a-1 Control signal extractor
1180a-2 Control signal extractor
1180b-1 Control signal extractor
1180b-2 Control signal extractor
1181 Optical splitter
1182 Wavelength multiplexer/demultiplexer 1183 Control receiver
1184-1 to 1184-3 Optical receiver
1185-1 to 1185-3 Separator
1190 Control signal communication path
1210 Optical communication system
1310 Optical communication system
1510 Optical communication system
1520 Subscriber device
1520a-1 Subscriber device
1520a-2 Subscriber device
1520b-1 Subscriber device
1520b-2 Subscriber device
1521 Dispersion compensator
1570 Management control device
1571 Management controller
1572 Notifier
1610 Optical communication system
1650-1 Optical transmission path
1650-2 Optical transmission path
1670 Management control device
1680a Control transceiver
1680b Control transceiver
1681a Optical transmitter
1681b Optical transmitter
1682a Optical multiplexer/demultiplexer
1682b Optical multiplexer/demultiplexer
1683a Optical receiver
1683b Optical receiver
1684a Transmission distance measurer
1684b Transmission distance measurer

The invention claimed is:

1. An optical communication system comprising:
an optical switch having a plurality of ports and outputting an optical signal, which is input from a port among the plurality of ports, from another port;
a plurality of quality compensators that perform quality compensation of the optical signal output from the optical switch and input the quality-compensated optical signal to the optical switch, the plurality of quality compensators being connected in parallel to the optical switch; and
when a plurality of subscriber devices, which are different, are separately connected to ports of the plurality of ports of the optical switch, a controller that performs, for each of the plurality of subscriber devices, processing of selecting, among the plurality of quality compensators, a quality compensator that performs quality compensation according to a degree of quality deterioration of the optical signal when the optical signal input from the port connected to a subscriber device is transmitted through a transmission path, and processing of controlling the optical switch so that the optical signal, in which quality is compensated by the selected quality compensator through the optical signal input from the port connected to the subscriber device being output to the quality compensator selected for the subscriber device, is output from a port corresponding to a transmission destination of the optical signal.

2. The optical communication system according to claim 1, wherein
the controller selects the quality compensator among the plurality of quality compensators, based on a combination of a cumulative chromatic dispersion amount of the transmission path assigned to the optical signal input from the port connected to the subscriber device and a degree of quality deterioration allowable for the optical signal based on characteristics of the optical signal.

3. The optical communication system according to claim 2, wherein
the controller acquires the cumulative chromatic dispersion amount of the transmission path based on a distance and chromatic dispersion of the transmission path, and the degree of quality deterioration allowable based on a value of a signal parameter that determines the characteristics of the optical signal including a wavelength of the optical signal, and selects the quality compensator based on the combination of the cumulative chromatic dispersion amount of the transmission path and the degree of quality deterioration allowable for the optical signal.

4. A control apparatus comprising:
a selector that selects, for each of a plurality of subscriber devices which are different, a quality compensator that performs quality compensation of an optical signal according to a degree of quality deterioration of the optical signal when the optical signal input from a port connected to a subscriber device is transmitted through a transmission path, among a plurality of quality compensators connected in parallel to a optical switch, when the plurality of subscriber devices are separately connected to ports of a plurality of ports of the optical switch, the optical switch having the plurality of ports and outputting the optical signal, which is input from the port among the plurality of ports, from another port; and
an instructor that instructs the optical switch so that the optical signal, in which quality is compensated by the selected quality compensator through the optical signal input from the port connected to the subscriber device being output to the quality compensator selected for the subscriber device, is output from a port corresponding to a transmission destination of the optical signal.

5. The control apparatus according to claim 4, further comprising:
an allocator that allocates a wavelength and a transmission path used for the optical signal from the subscriber device to the transmission destination in response to a request from the subscriber device, wherein
the selector selects for each of the plurality of subscriber devices, among the plurality of quality compensators, the quality compensator that performs compensation according to the degree of quality deterioration of the optical signal when the optical signal of the wavelength allocated by the allocator is transmitted through the transmission path allocated by the allocator, and
the instructor instructs the optical switch so that the optical signal, in which the quality is compensated by the selected quality compensator through the optical signal of the wavelength input from the port connected to the subscriber device begin output to the quality compensator selected by the selector, is output from the port connected to the transmission path allocated by the allocator.

6. The control apparatus according to claim 5, wherein
the selector selects, among the plurality of quality compensators, the quality compensator that performs quality compensation according to the degree of quality deterioration allowed for the optical signal input from the port connected to the subscriber device, and the degree of quality deterioration allowed for the optical signal corresponds to one or both of a resource used for transmission of the optical signal and a value of a signal parameter used in the optical signal transmitter to control characteristics of the optical signal.

7. The control apparatus according to claim 6, wherein the resource is one or both of the transmission path through which the optical signal is transmitted and a device that relays the optical signal.

8. The control apparatus according to claim 4, wherein the degree of quality deterioration of the optical signal when the optical signal is transmitted through the transmission path corresponds to a length of the transmission path, the instructor selects for each of the plurality of subscriber devices, among the plurality of quality compensators, the quality compensator that performs quality compensation of the optical signal based on the length of the transmission path through which the optical signal input from the port connected to the subscriber device is transmitted, and the length of the transmission path is estimated based on a round-trip time measured by transmitting and receiving an optical signal via the transmission path between the subscriber device and the transmission destination.

9. The control apparatus according to claim 8, wherein the optical signal used for measuring the round trip time is a control signal that is superimposed on a main signal and is slower than the main signal.

10. The control apparatus according to claim 8, wherein the instructor selects for each of the plurality of subscriber devices, among the plurality of quality compensators, a plurality of candidates for the quality compensator that performs quality compensation of the optical signal based on the length of the transmission path through which the optical signal input from the port connected to the subscriber device is transmitted, selects the quality compensator that performs quality compensation of the optical signal among the plurality of candidates, and selects the quality compensator which has not been selected among the plurality of candidates when quality of the optical signal that is compensated by the selected quality compensator is lower than a predetermined value.

11. The control apparatus according to claim 4, wherein the selector selects, for each of the plurality of subscriber devices, one or more quality compensators for performing quality compensation among the plurality of quality compensators, and the instructor controls the optical switch so that the optical signal input from the port connected to the subscriber device, in which two or more quality compensators are selected, being sequentially output to the two or more quality compensators selected for the subscriber device, and the optical signal, in which quality is compensated by all the selected quality compensators, is output from the port corresponding to the transmission destination of the optical signal.

12. The control apparatus according to claim 4, wherein the quality compensator performs one or both of dispersion compensation of an optical signal and amplification of the optical signal.

13. The control apparatus according to claim 4, wherein the selector selects the quality compensator among the plurality of quality compensators, based on a combination of a cumulative chromatic dispersion amount of the transmission path assigned to the optical signal input from the port connected to the subscriber device and a degree of quality deterioration allowable for the optical signal based on characteristics of the optical signal.

14. The control apparatus according to claim 13, wherein the selector acquires the cumulative chromatic dispersion amount of the transmission path based on a distance and chromatic dispersion of the transmission path, and the degree of quality deterioration allowable based on a value of a signal parameter that determines the characteristics of the optical signal including a wavelength of the optical signal, and selects the quality compensator based on the combination of the cumulative chromatic dispersion amount of the transmission path and the degree of quality deterioration allowable for the optical signal.

15. A quality compensation method comprising:

selecting, for each of a plurality of subscriber devices which are different a quality compensator that performs quality compensation of an optical signal when the optical signal input from a port connected to a subscriber device is transmitted through a transmission path among a plurality of quality compensators connected in parallel to a optical switch, when the plurality of subscriber devices are separately connected to ports of a plurality of ports of the optical switch, the optical switch having the plurality of ports and outputting the optical signal, which is input from the port among the plurality of ports, from another port; and instructing the optical switch so that the optical signal, in which quality is compensated by the selected quality compensator through the optical signal input from the port connected to the subscriber device being output to the quality compensator selected for the subscriber device, is output from a port corresponding to a transmission destination of the optical signal.

* * * * *